United States Patent
Yamamura

(10) Patent No.: US 10,610,937 B2
(45) Date of Patent: Apr. 7, 2020

(54) CUTTING DEVICE

(71) Applicant: MAKITA CORPORATION, Anjo-shi, Aichi (JP)

(72) Inventor: Goh Yamamura, Anjo (JP)

(73) Assignee: MAKITA CORPORATION, Anjo (JP)

( * ) Notice: Subject to any disclaimer, the term of this patent is extended or adjusted under 35 U.S.C. 154(b) by 138 days.

(21) Appl. No.: 15/804,637

(22) Filed: Nov. 6, 2017

(65) Prior Publication Data

US 2018/0133817 A1   May 17, 2018

(30) Foreign Application Priority Data

Nov. 11, 2016  (JP) ................... 2016-220813

(51) Int. Cl.
| | | |
|---|---|---|
| *B23D 47/02* | (2006.01) | |
| *B27B 5/29* | (2006.01) | |
| *B23D 45/04* | (2006.01) | |
| *B23D 47/12* | (2006.01) | |

(52) U.S. Cl.
CPC ......... *B23D 47/025* (2013.01); *B23D 45/048* (2013.01); *B27B 5/29* (2013.01); *B23D 47/126* (2013.01)

(58) Field of Classification Search
CPC .. B23D 45/048; B23D 47/025; B23D 47/126; B27B 5/29
See application file for complete search history.

(56) References Cited

U.S. PATENT DOCUMENTS

| | | |
|---|---|---|
| 5,445,056 A | 8/1995 | Folci |
| 2011/0041666 A1 | 2/2011 | Aoyama |
| 2011/0209593 A1 | 9/2011 | Kani et al. |
| 2012/0055311 A1* | 3/2012 | Shibata ................. B23D 47/02 83/648 |
| 2014/0202297 A1 | 7/2014 | Sasaki |

FOREIGN PATENT DOCUMENTS

| | | |
|---|---|---|
| JP | H05-318402 A | 12/1993 |
| JP | H06-210605 A | 8/1994 |
| JP | H09-131701 A | 5/1997 |
| JP | 2002-200602 A | 7/2002 |
| JP | 2010-58229 A | 3/2010 |
| JP | 2010-280013 A | 12/2010 |
| JP | 2011-41999 A | 3/2011 |
| JP | 2014-138961 A | 7/2014 |
| JP | 2015-150633 A | 8/2015 |

* cited by examiner

*Primary Examiner* — Stephen Choi
(74) *Attorney, Agent, or Firm* — Oliff PLC

(57) ABSTRACT

The first rotation lock mechanism 31 is configured such that a screw force produced by a rotation operation of an operation member 33 is transmitted to a lock member 42 via a transmission bracket 36 and a transmission rod 40. Through minimizing the length of the screw shaft 35, the transmission bracket 36, and the transmission rod 40, the position of a lock member which a screw shaft 35 is brought into contact with and the screw force is directly applied to is arranged to be closer to a user in comparison with conventional prior art. As a result, transmission loss of the screw force can be reduced, enhancing accuracy and consistency for the fixing force with respect to the table can be improved.

16 Claims, 36 Drawing Sheets

CUTTING DEVICE

CROSS-REFERENCE

This application claims priority to Japanese patent application serial number 2016-220813, filed on Nov. 11, 2016, the contents of which are incorporated herein by reference in their entirety.

TECHNICAL FIELD

The present invention generally relates to a tabletop cutting device, which is referred to as a sliding circular saw and/or a tabletop circular saw, used for cutting a material to be cut (workpiece), such as mainly a wooden material.

BACKGROUND ART

These types of tabletop cutting devices include a table on which the material to be cut (workpiece) is placed and a cutting device main body that is supported on a rear part of the table so as to be movable along an up-to-down direction. The cutting device main body includes a circular cutting blade (cutting edge) that can be rotated by an electric motor as a driving source. Cutting work can be performed by moving the cutting main body in a downward direction, causing the rotating cutting blade to cut the workpiece placed on the table.

In these types of the tabletop cutting devices, the table is supported on a base so as to be horizontally rotatable. By rotating the table, a cutting angle of the cutting blade with respect to the workpiece can be arbitrarily changed in order to perform a so-called oblique cutting.

A rotation position of the table can be fixed by a rotation lock mechanism (miter lock mechanism). The rotation lock mechanism includes a so-called positive-lock-type lock mechanism and a free-lock-type lock mechanism. In the positive-lock-type lock mechanism, the table can be locked at one of predetermined angle positions by inserting a lock pin etc. into one of lock holes that are provided on the base side at every fixed angle. In the free-lock-type mechanism, the table can be locked at an arbitrary angle position, at which the table cannot be locked in the former positive-lock-type lock mechanism, by pressing the lock pin etc. to the base side by a screw force or a spring force. Prior arts relating to the latter rotation lock mechanism, i.e., the free-lock-type mechanism, are disclosed in the following Japanese Patent Publications.

Japanese Laid-Open Patent Publication No. H05-318402 (patent document 1) discloses a configuration in which a rotation position of the table can be locked by directly pressing a tip end of a screw shaft to a wall portion provided on the base. Japanese Laid-Open Patent Publication No. H09-131701 (patent document 2) discloses a configuration in which a rotation position of the table can be locked by pressing a tip end of a screw shaft to the base side via a swing lock member. Japanese Laid-Open Patent Publication No. 2002-200602 (patent document 3) discloses a configuration in which a rotation position of the table can be locked by pressing a lock member to the base side with a spring force. Furthermore, Japanese Laid-Open Patent Publication No. 2010-58229 (patent document 4) discloses a configuration in which a rotation position of the table can be locked by holding a lock plate provided on the base side with a spring force.

With regard to the latter free-lock-type rotation lock mechanism, operability needs to be improved. As to an operation by which a rotation position of the table is locked at an arbitrary angle position, many users prefer, in terms of ease of use, an operation in which an operation portion is rotated to apply a screw force. Because of this user's preference, the configuration in which the rotation position of the table is locked by applying the spring force (patent document 4) has been producing a problem of impairing user's operation comfort.

Furthermore, in the configuration in which the rotation position of the table is achieved by applying the screw force (patent documents 1-3), friction and/or deflection may cause large transmission loss of the operation force and thus careful operation has been needed to obtain an adequate fixing force. In the prior art, operability has been impaired in this respect.

SUMMARY

Thus, as a result of the mentioned deficiencies in the art, there is a need in the art to obtain a sufficient operation comfort of the user by using a screw force instead of a spring force and by improving efficiency of transmission for operation power.

In one exemplary embodiment of the present disclosure, a cutting device includes a table on which a material to be cut is placed and a base that supports the table so as to be horizontally rotatable. Furthermore, the embodiment includes a rotation lock mechanism for locking a rotation position of the table with respect to the base is provided between the table and the base. The rotation lock mechanism includes an operation member having a screw shaft, a lock member for pressing a member to be locked provided on the base, and a transmission member that is interposed between the operation member and the lock member. Furthermore, in the rotation lock mechanism, a screw force of the screw shaft in an axial direction of the screw shaft that is produced by a rotation operation of the operation member around the axial direction is transferred to the lock member via the transmission member, and the lock member converts a direction of the force from the transmission member by rotation of the lock member, and further wherein the lock member presses the member to be locked by the converted force to lock a rotation position of the table with respect to the base.

According to the embodiment, the lock member is rotated by the screw force produced by the rotation operation of the operation member to cause the rotation position of the table to be locked. As a result, a sufficient operation comfort for the user can be obtained. Furthermore, the screw force produced by the rotation operation of the operation member is configured to be transferred to the lock member via the transmission member. Because of this configuration, a position of a member which the screw shaft is brought into contact with and the screw force is directly applied to (or a tip end portion of the screw shaft in the rearward direction) is arranged to be close to the user in comparison with conventional prior art devices, in terms of the length of the transmission member. As a result, due to the structural configuration and reduction in length of said member, transmission loss due to the screw force can be reduced. By reducing the transmission loss of the screw force generated by the rotation operation of the operation member, rotation operation force of the operation member can be more efficiently transferred to the lock member and a stable pressing force to the member to be locked can be applied.

In another exemplary embodiment of the disclosure, the lock member is configured to be displaced in a direction different from the axial direction of the screw shaft to press the member to be locked.

According to such an embodiment, a reaction from the member to be locked (base side) that is applied to the lock member by the pressing is dispersed in a plurality of directions and is not directly applied to the screw shaft and eventually the operation member. As a result, satisfactory operability of the operation member can be obtained.

In another exemplary embodiment of the disclosure, the member to be locked is configured to be a lock plate that is provided on the base. Furthermore, the screw shaft is displaced in the rearward direction far from the user by the rotation operation of the operation member in a lock direction, and the lock member is displaced in the upward direction by the screw force produced by the rearward displacement of the screw shaft to cause the lock plate to be held by the lock member.

According to such an embodiment, a displacement direction of the lock member (pressing direction with respect to the lock plate) is configured to be the upward direction. As a result, a lift of the table or an offset of the axis of the screw shaft may not occur. As a result, a cutting work with high accuracy can be performed.

In another exemplary embodiment of the disclosure, the lock member includes an input portion that extends in the upward direction and an output portion that extends in the forward direction, and the lock member is supported so as to be swung in the up-to-down direction via a support shaft that is disposed at an lower part of the input portion and at a rear part of the output portion. Furthermore, the input portion is pressed by the rearward displacement of the screw shaft to cause the output portion to be displaced in the upward direction, and the member to be locked is held by said upward displacement of the output portion.

According to such an embodiment, the input portion of the lock member is pressed in the rearward direction by the screw force produced by the rearward displacement of the screw shaft. When the input portion is pressed in the rearward direction, the lock member rotates around the support axis to swing in the upward direction and the output portion of the lock member is displaced in the upward direction. By displacing the output portion in the upward direction and pressing it from the lower surface of the member to be locked (lock plate), the member to be locked is held (sandwiched) between the output portion and the table in the up-to-down direction to cause the rotation position of the table to be locked. According to this embodiment, the rearward direction of the screw force is converted to an upward direction force via the lock member to be applied to the member to be locked and thus the rotation position of the table is locked. In this way, the screw force is applied in the rearward direction and the reaction from the base is applied in the downward direction, which is different from the screw force direction. As a result, an influence of the reaction with respect to the operation member can be reduced and satisfactory operation feeling of the operation member can be obtained. In addition to this, transmission loss of the screw force can be reduced and the rotation position of the table can be firmly locked.

In another exemplary embodiment of the disclosure, a positive-lock-type second rotation lock mechanism is provided in addition to a first rotation lock mechanism in which a rotation position of the table is locked by pressing the member to be locked by use of the lock member, and the second rotation lock mechanism is configured such that the table is locked by moving a protrusion in a radial direction of the table to engage with a recess provided in the base. Furthermore, the screw shaft of the first rotation lock mechanism is arranged to be matched with respect to the protrusion of the second rotation lock mechanism in the left-to-right direction when viewed from a direction perpendicular to the upper surface of the table, and the transmission member of the first rotation lock mechanism is arranged parallel to and offset in the left-to-right direction from the protrusion of the second rotation lock mechanism.

According to such an embodiment, the operation member of the first rotation lock mechanism and the operation member of the second rotation lock mechanism are vertically disposed, and also operability of the operation members is secured. Furthermore, the transmission rod and the lock member of the first rotation lock mechanism, which are members of the engagement side with respect to the base, are arranged offset in the leftward or rightward direction with respect to the protrusion of the second rotation lock mechanism 32. Because of this configuration, the first rotation lock mechanism and the second rotation lock mechanism can be mounted compactly in the up-to-down direction, and eventually the height of the upper surface of the table can be lowered, which can improve operability of the tabletop cutting device.

DETAILED DESCRIPTION

The detailed description set forth below, when considered with the appended drawings, is intended to be a description of exemplary embodiments of the present invention and is not intended to be restrictive and/or to represent the only embodiments in which the present invention can be practiced. The term "exemplary" used throughout this description means "serving as an example, instance, or illustration," and should not necessarily be construed as preferred or advantageous over other exemplary embodiments. The detailed description includes specific details for the purpose of providing a thorough understanding of the exemplary embodiments of the invention. It will be apparent to those skilled in the art that the exemplary embodiments of the invention may be practiced without these specific details. In some instances, these specific details refer to well-known structures, components and/or devices that are shown in block diagram form in order to avoid obscuring significant aspects of the exemplary embodiments presented herein.

Figure 1:
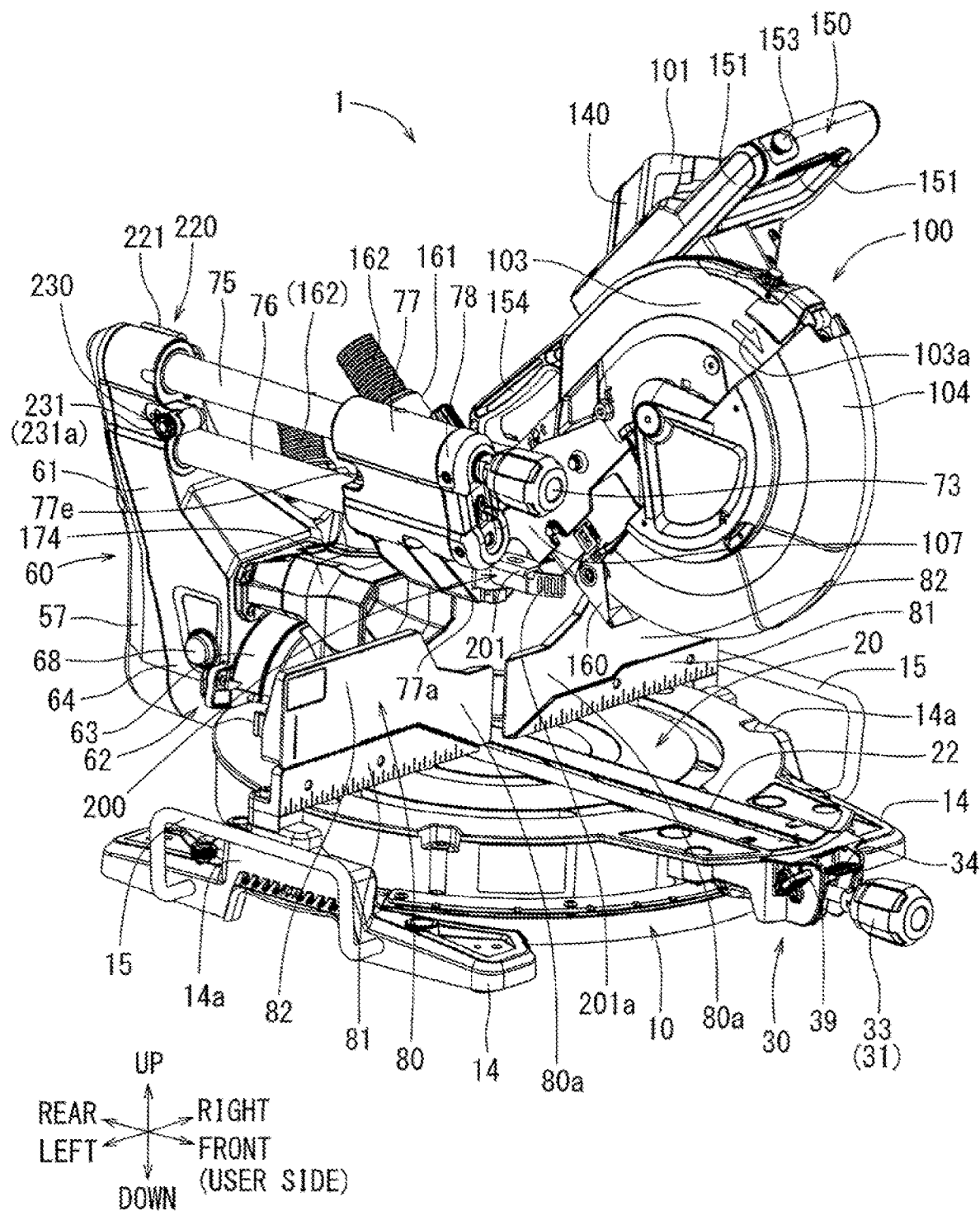
FIG. 1 is an overall perspective view of a tabletop cutting device according to an exemplary embodiment of the present disclosure, which is obliquely viewed from a forward left.
Figure 2:
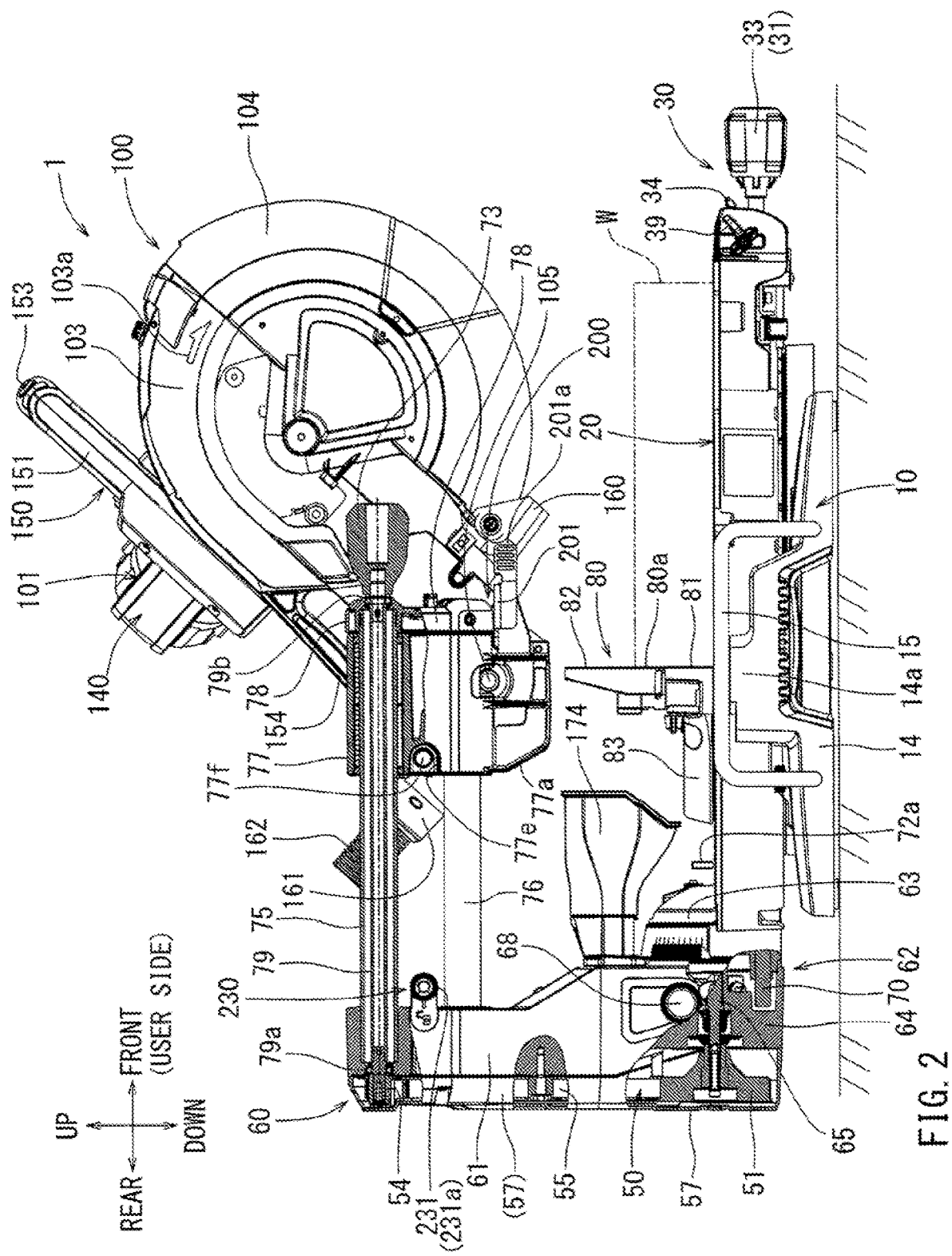
FIG. 2 is an overall side view of the tabletop cutting device according to the embodiment, which is viewed from a left side thereof.
Figure 3:
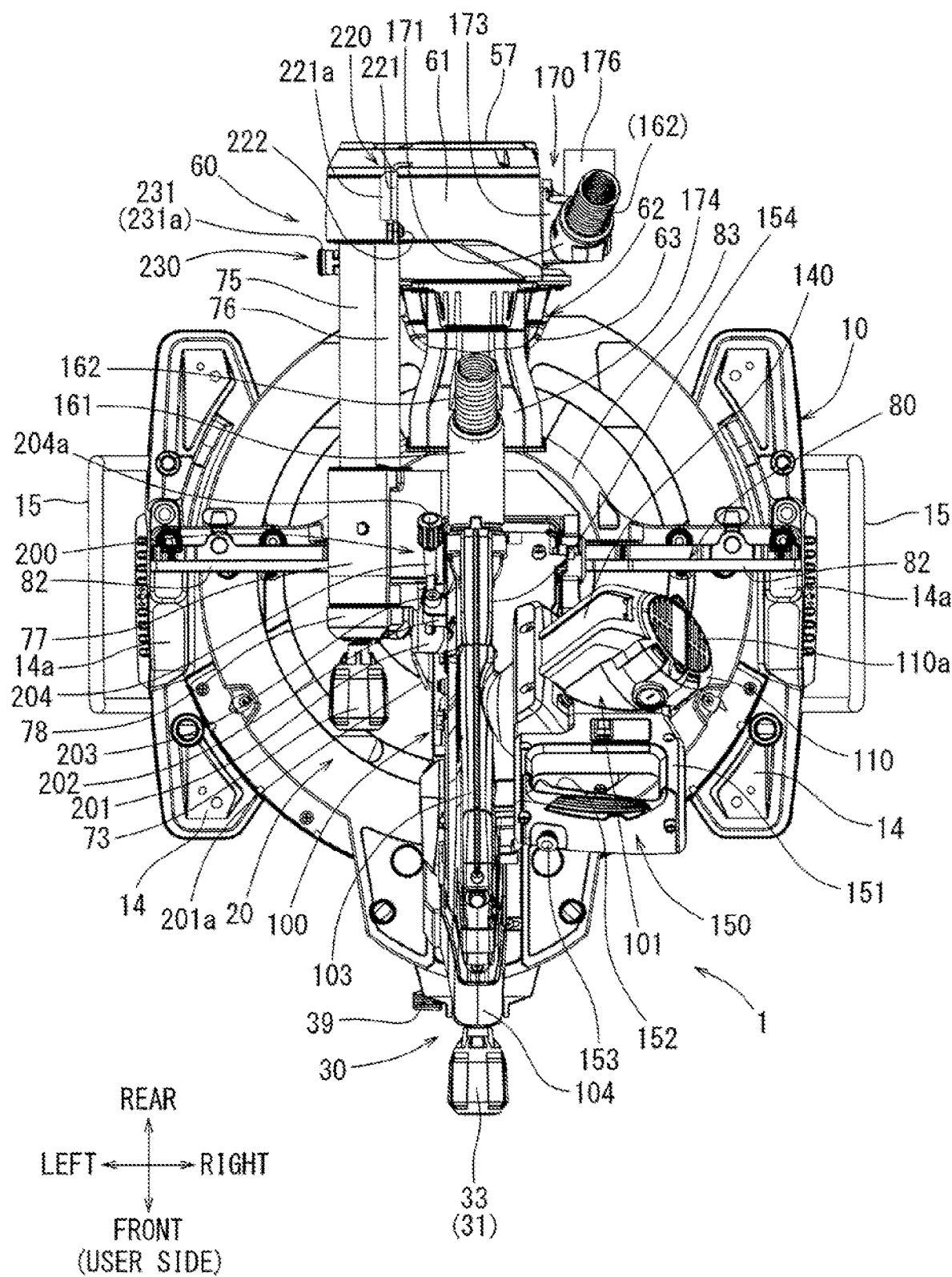
FIG. 3 is an overall plan view of the tabletop cutting device according to the embodiment.

Representative, non-limiting embodiments according to the present disclosure will be described with reference to FIGS. 1 to 41. FIGS. 1 to 6 show an overall view of a desktop cutting device 1 of the embodiment according to the present disclosure. In FIGS. 1 and 2, a user may be situated on a right side of the tabletop cutting device 1 in order to perform cutting work. In the following embodiments, the front, rear, leftward, rightward, upward, and downward directions of members and configurations may be based on the user's position. Furthermore, a near side to the user, depicting the user's point of view, is referred to as the front side (user side).

The desktop cutting device 1 may be referred to as a so-called sliding circular saw (miter saw), which may include a table 20 on which a material W to be cut (workpiece) is placed, a base 10 that supports the table 20 so as to be horizontally rotatable, and a cutting device main body 100 having a circular cutting blade 102. Although not shown in FIGS. 1 to 6, the table 20 may be horizontally rotatable via a vertical rotation support shaft 21 that is located approximately at the radial center on the upper surface of the base 10. The rotation support shaft 21 may be seen in FIG. 7, where it is shown below a cutting edge plate 22. The cutting edge plate 22 may be a band plate that includes a groove slot hole through which the circular cutting blade 102 is passed (which releases the circular cutting blade 102). The cutting edge plate 22 may be attached so as to be flush with the upper surface of the table 20. The groove slot hole of the cutting edge plate 22 may be provided extending a full diameter length in the radial direction passing through the rotation support shaft 21 (at the radial center of the table 20).

There may be provided on the upper side of the table 20, the cutting edge plate 22 and a positioning fence 80 for positioning the workpiece W on the surface direction of the table 20. A rotation lock operation portion 30 for locking a rotation position of the table 20 may be provided on the front side of the table 20. On the rear side of the table 20, the cutting device main body 100 may be supported via a main body supporting portion 60. The main body supporting portion 60 may be provided with a supporting mechanism in which the cutting device main body 100 can be supported so as to be swung in an up-to-down direction above the table 20, tilted in an left-to-right direction, and slid in a front-to-rear direction. By swinging the cutting device main body 100 in the downward direction, the workpiece W that is placed on the table 20 may be cut by the cutting blade 102. Furthermore, by sliding the cutting device main body 100 in the rearward direction while the cutting blade 102 cuts the workpiece W, cutting work of the workpiece W can be processed in the rearward direction to completely cut a workpiece with a wide width.

[Rotation Lock Mechanism of the Table 20]

Figure 7:
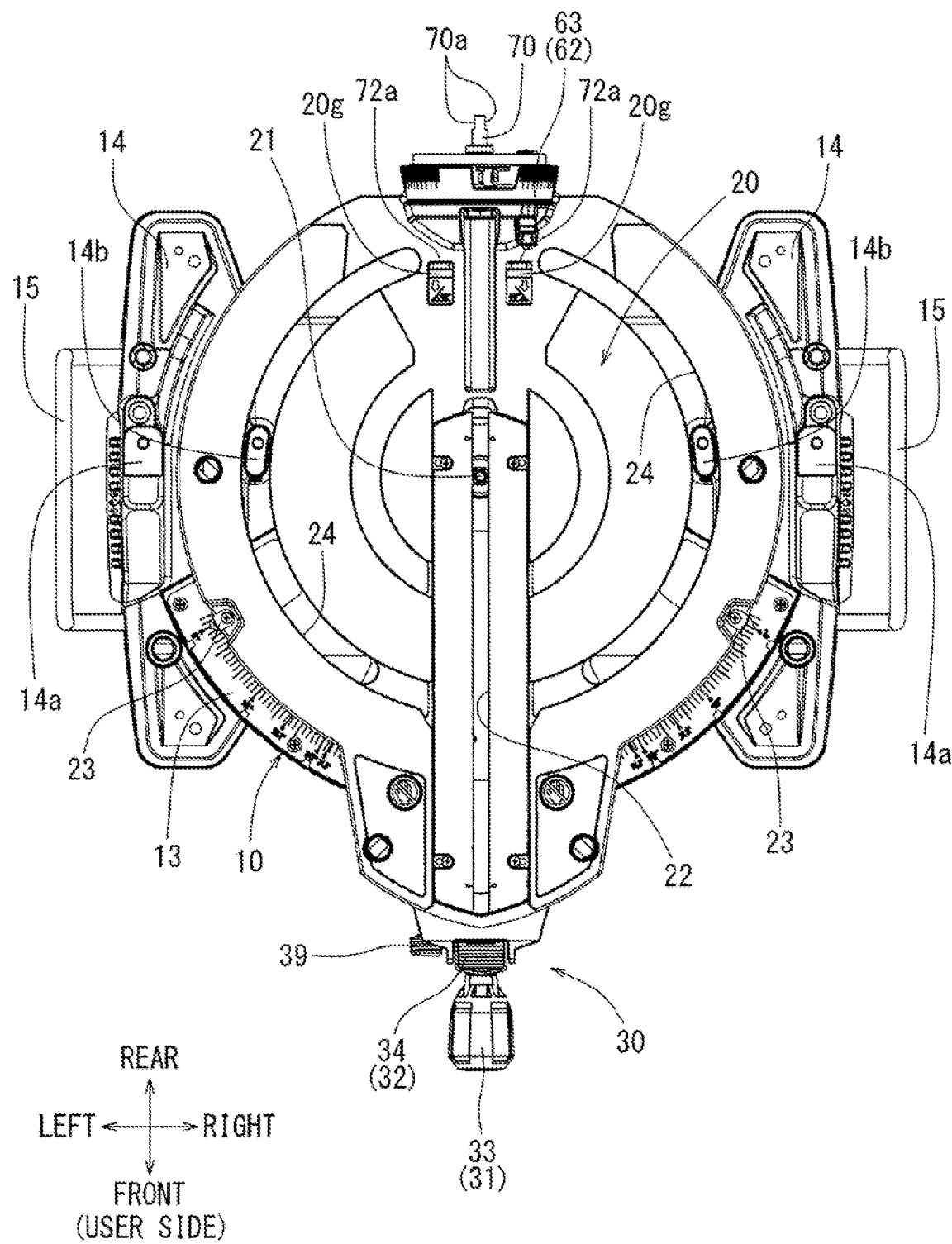
FIG. 7 is a plan view of a table and a base.
Figure 8:
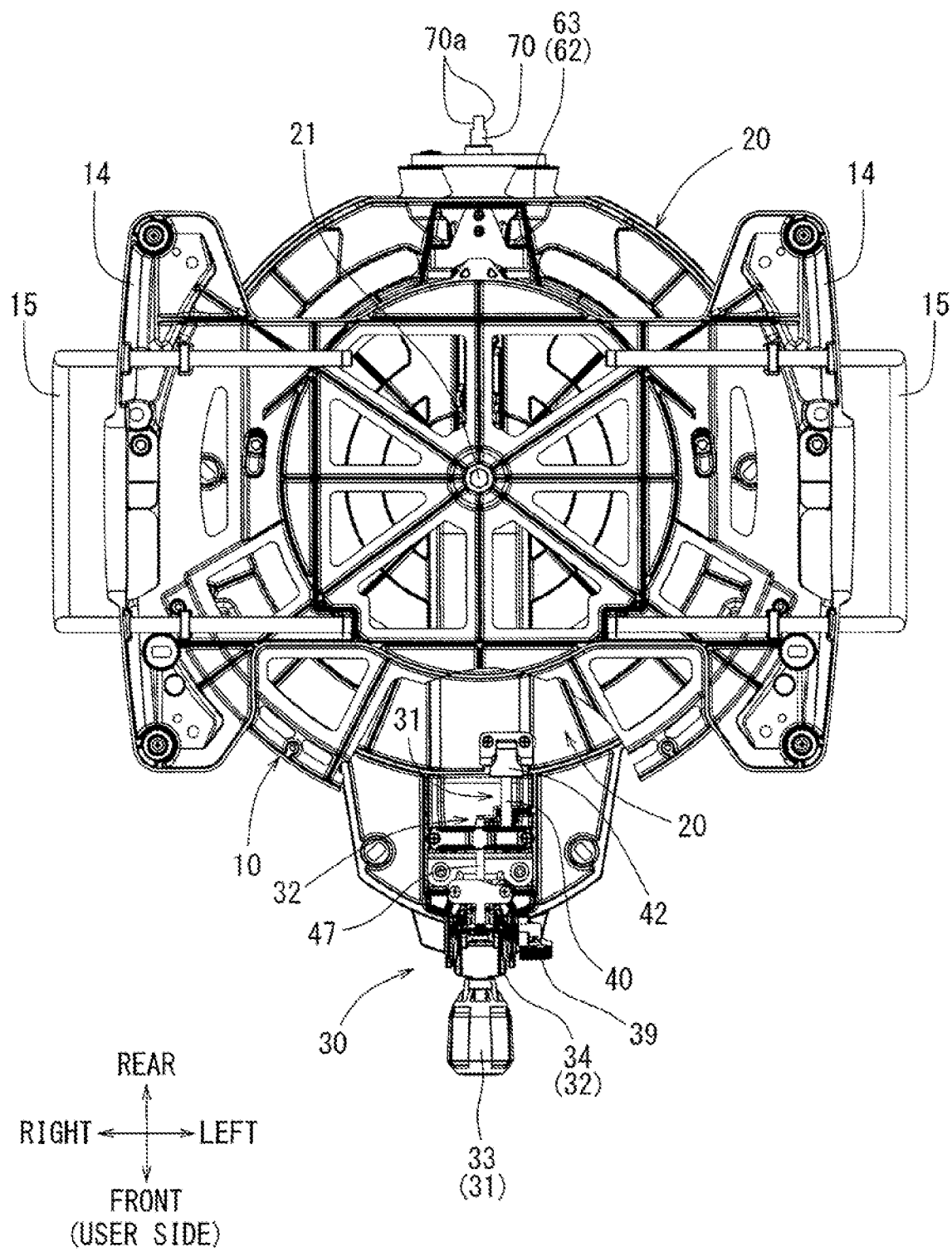
FIG. 8 is a bottom view of the table and the base.

A rotation position of the table 20 with respect to the base 10 can be locked at a definite (and/or desired) angle position by selecting and using either one of a first rotation lock mechanism 31 and a second rotation lock mechanism 32. As shown in FIGS. 7 and 8, operation portions of the first rotation lock mechanism 31 and the second rotation lock mechanism 32 may be comprised a rotation lock operation portion 30 that is provided on the front side of the table 20. The details of the first rotation lock mechanism 31 and the second rotation lock mechanism 32 are shown in, for example, FIG. 9. The first rotation lock mechanism 31 may include a function of locking the table 20 at an arbitrary angle position. In the first rotation lock mechanism 31, the table 20 can be locked and unlocked by rotating an operation member 33 that is arranged as part of the rotation lock operation portion 30. The second rotation lock mechanism 32 can be locked and unlocked by the swinging of operation member 34 in the up-to-down direction, which is arranged as part of the rotation lock operation member 30.

Figure 10:
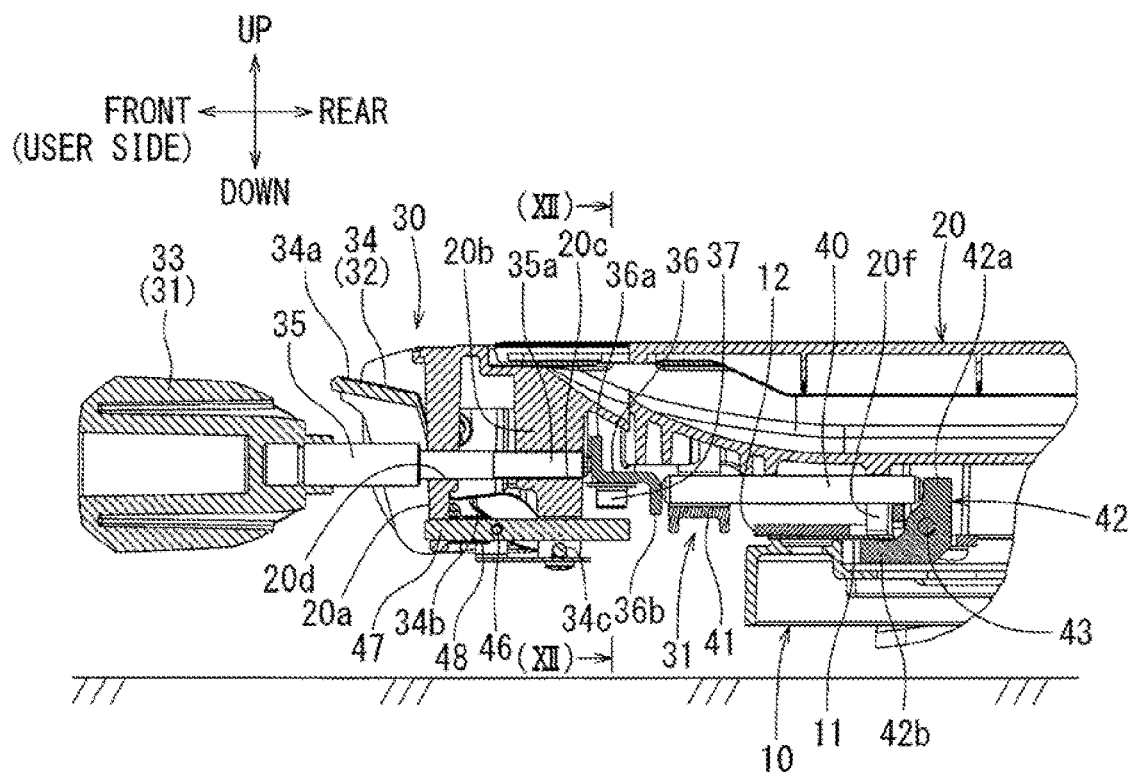
FIG. 10 is a cross-sectional view taken along line (X)-(X) of FIG. 9, showing a longitudinal cross-sectional view of mainly a front side of the table. This figure shows mainly a first rotation lock mechanism.
Figure 11:
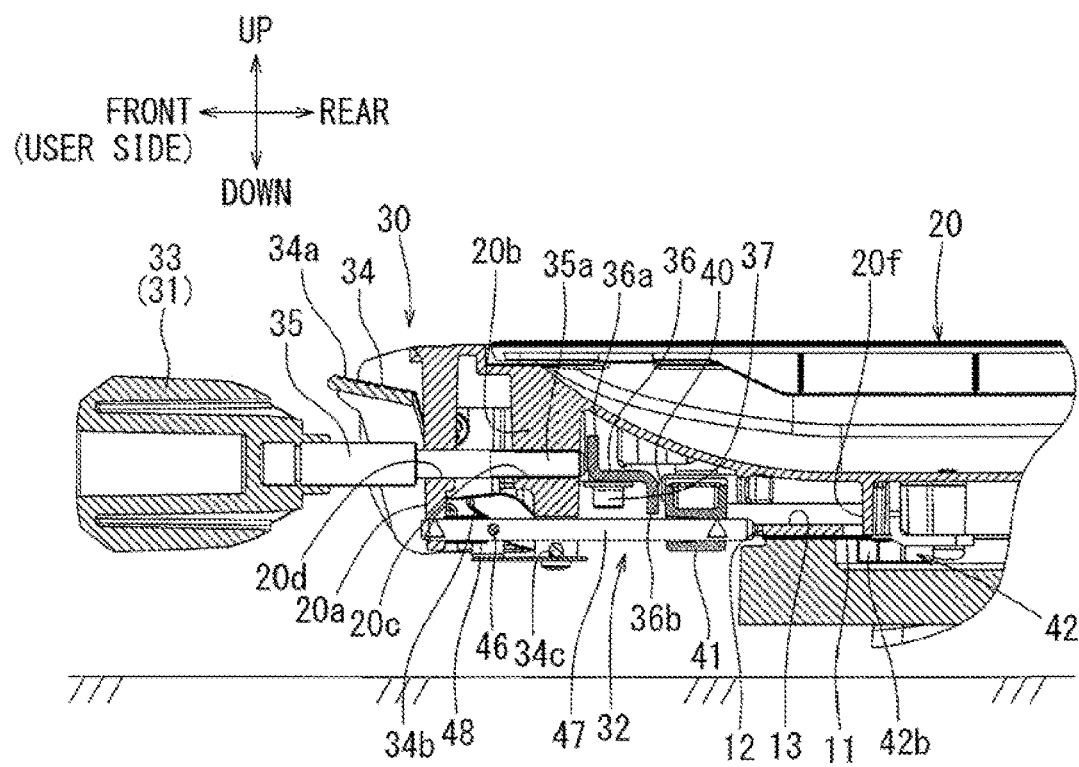
FIG. 11 is a cross-sectional view taken along line (XI)-(XI) of FIG. 9, showing a longitudinal cross-sectional view of mainly the front side of the table. This figure shows mainly a second rotation lock mechanism.

As shown in FIGS. 10 and 11, the operation member 33 of the first rotation lock mechanism 31 may be attached to a frontal end portion of the screw shaft 35. The screw shaft 35 may be supported straddling a supporting wall 20a as well as a supporting wall 20b, both of which are provided at the front side of the table 20. The screw shaft 35 may be passed through both the supporting wall 20a and the supporting wall 20b, and the screw shaft 35 may be supported so as to be rotatable about its longitudinal axis in the front-to-rear direction. Furthermore, the screw shaft 35 may pass through the supporting-hole 20d provided in the front-side supporting wall 20a in such a way so as to be un-displaceable (retained without rattling) in the radial direction, but displaceable in the front-to-rear axial direction. The screw shaft 35 may be comprised of a screw portion 35a at its rear. The screw portion 35a may be fastened to a screw hole 20c provided in the rear-side supporting wall 20b. Because of this configuration, when the operation member 33 rotates, the screw shaft 35 may advance or retreat along its axis (in the front-to-rear direction) by a screw engagement of the screw portion 35a with regard to the screw hole 20c. In particular, when the operation member 33 is rotated toward a lock side, the screw portion 35a may be fastened with respect to the screw hole 20c via threaded engagement of the screw hole 20c with the screw portion 35a, and as a result the screw shaft 35 may move toward the rear side. In contrast, when the operation member 33 is rotated to an unlock side, the screw portion 35a may be released from its threaded engagement with respect to the screw hole 20c, and as a result the screw shaft 35 may move toward the front side.

Figure 12:
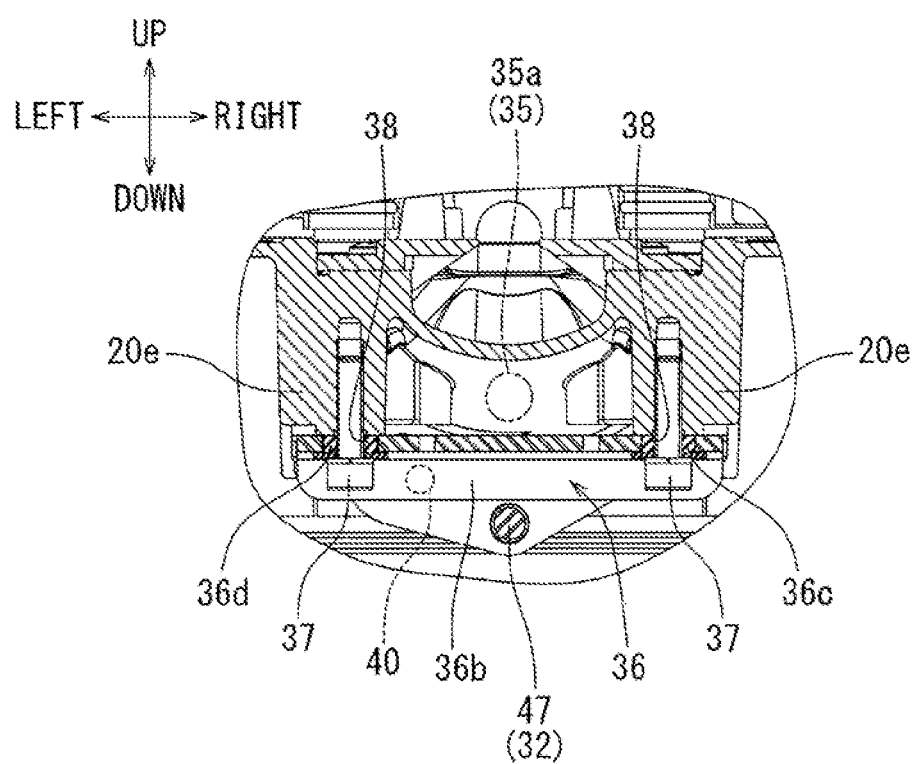
FIG. 12 is a cross-sectional view taken along line (XII)-(XII) of FIG. 10, showing a longitudinal sectional view of the rotation lock operation portion.

A transmission bracket 36 may be supported on the rear side of the screw shaft 35. The transmission bracket 36 may be a metal-made interposition member that is a band-like steel plate, which extends substantially in the left-to-right direction, approximately commensurate with the left-to-right extension of a lower front surface of table 20 as shown in FIG. 12, and bent in a crank shape forming an S-like cross section as shown in FIGS. 10 and 11. Furthermore, the transmission bracket 36 may include an upper contact portion 36a and a lower contact portion 36b. As shown in FIG. 12, the transmission bracket 36 may straddle a left seat portion 20e as well as a right seat portion 20e, both of which are provided on a lower surface of the table 20, where the transmission bracket 36 may be movably supported by both the seat portions 20e. The transmission bracket 36 may be attached to the seat portions 20e by two fixing screws 37. The transmission bracket 36 may include an insertion hole 36c on the right side and an insertion hole 36d on the left side. Furthermore, the right-side insertion hole 36c may be formed as a circular shape and the left-side insertion hole 36d may be formed as a groove shape that extends in the front-to-rear direction and curves around the insertion hole 36c. An annular sleeve ring member 38 that is made from steel may be attached to each of the right-side insertion hole 36c and the left-side insertion groove hole 36d. The fixing screw 37 may be inserted into an inner circumference of each of the two sleeve ring members 38. The transmission bracket 36 may be horizontally supported so as to be rotatable around the right-side sleeve member 38. A transmission rod 40 may be pushed in the rearward direction by the rotational movement of the transmission bracket 36.

A rear end of the screw shaft 35 may be brought into contact with a front surface of the upper contact portion 36a. Because of this configuration, when the operation member 33 rotates in the lock direction as described above, the screw shaft 35 may move toward the rear side through the threaded screw engagement and the transmission bracket 36 may thus be pushed in the rearward direction. The transmission of force by the pushing rearward of the screw shaft 35 may consequently rotate the transmission bracket 36 around the sleeve member 38 along the contour of groove hole 36d, moving it in the rearward direction by.

Figure 9:
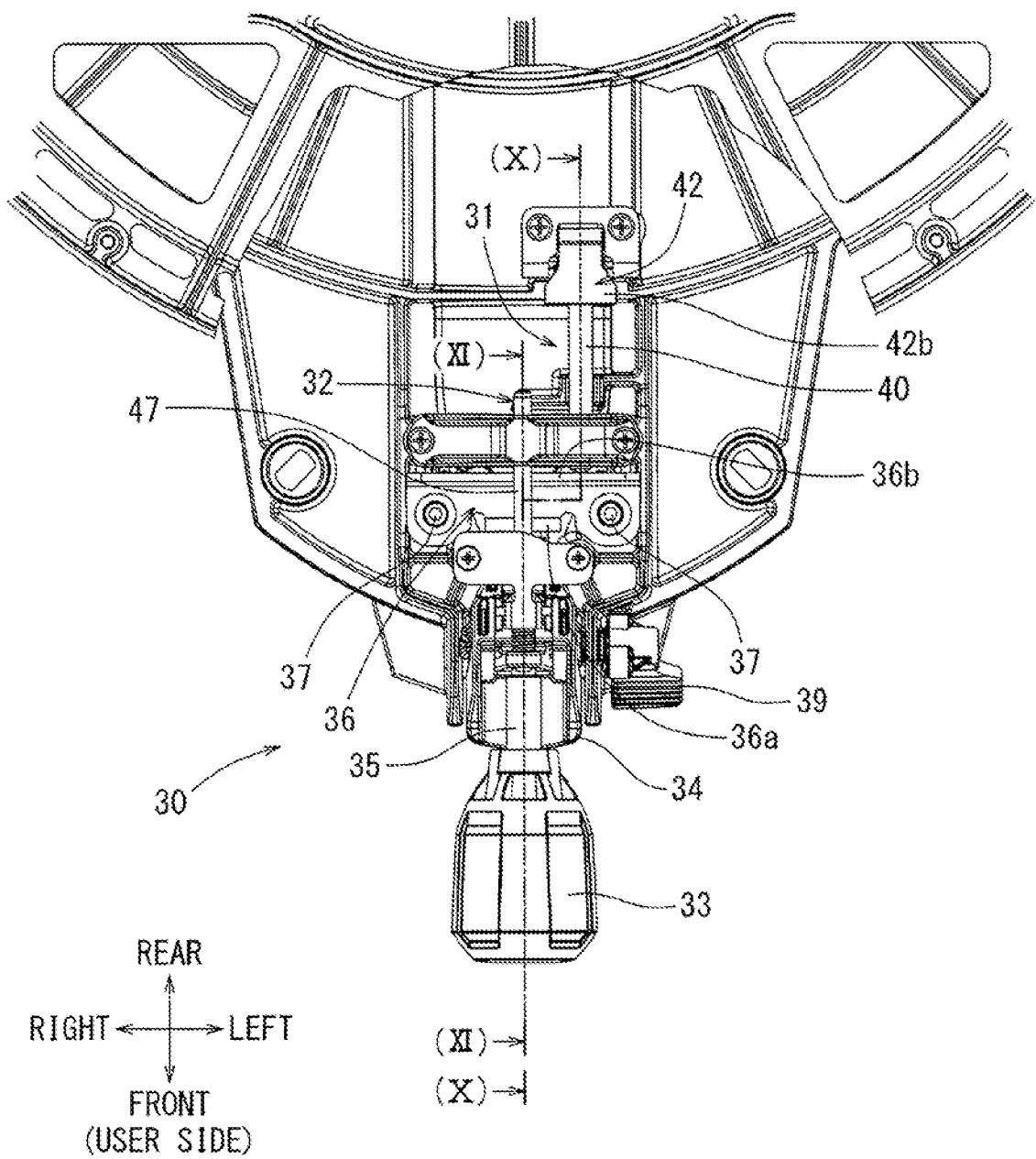
FIG. 9 is a bottom view of a rotation lock operation portion of the table, which is viewed from below the bottom thereof.

A rear surface of the lower contact portion 36b of the transmission bracket 36 may then be brought into contact with a front end of the transmission rod 40. The transmission rod 40 may be supported so as to be displaceable along its longitudinal axial direction (in the front-to-rear direction) via a rod-receiving portion 41 that is provided on the lower surface of the table 20. Furthermore, as shown in FIG. 9, the transmission rod 40 may be arranged in parallel with the screw shaft 35 of the operation member 33 and offset on the left side by a certain amount smaller than half of the width of the transmission bracket 36 in the left-to-right direction, with respect to the screw shaft 35. By rotating the transmission bracket 36 in the rearward direction, the transmission rod 40 may consequently move in the rearward direction.

As shown in FIG. 10, a lock member 42 provided on the lower surface of the table 20 may be supported on the rear side of the transmission rod 40. The lock member 42 may be supported so as to be rotatable in the up-to-down direction via a support shaft 43. The lock member 42 may include an input portion 42a that extends in the upward direction from the support shaft 43 and an output portion 42b that extends in the forward direction from the support shaft 43, where the input portion and output portion may collectively form in an L shape. A rear end of the transmission rod 40 may be brought into contact with a front surface of the input portion 42a. Because of this configuration, when the transmission rod 40 moves in the rearward direction, the input portion 42a may be pushed rearward. As a result, the lock member 42 may rotate to the lock side about the support shaft 43 (that is, the lock member 42 may rotate in a direction in which the input portion 42a moves simultaneously in the rearward and downward direction, which is a clockwise direction relative to FIG. 10). In this way, in the present embodiment, the transmission bracket 36 and the transmission rod 40 may collectively function as a transmission member for transmitting a spring force produced by the rotation of the operation member 33 to the lock member 42.

When the input portion 42a is pushed in the rearward direction and the lock member 42 rotates to the lock side, the output portion 42b may move in the upward and rearward direction. A locked portion provided in the base 10 may be positioned above the output portion 42b. In the present embodiment, the locked portion may comprise a lock plate 11 that is fixed to the base 10 side. A holding (pinching) rib 20f provided on the lower surface of the table 20 may be positioned above the lock plate 11. When the lock member 42 rotates to the lock side, the output portion 42b moves in the upward direction and the lock plate 11 may be held (pinched) between the output portion 42b and the holding rib 20f.

The rearward axial movement of the screw shaft 35 made by the rotation of the operation member 33 and consequently the threaded engagement of screw portion 35a with screw hole 20c may produce the screw force. The screw force may further be transmitted to the lock member 42 via the transmission bracket 36 and the transmission rod 40. By the rearward axial movement of the screw shaft 35, the output portion 42b of the lock member 42 moves in the upward direction, which may hold the lock plate 11 along with holding rib 20f, and thus a rotation position of the table 20 with respect to the base 10 may be locked. Because of this configuration in which the table 20 may be locked by holding the lock plate 11 between the output portion 42b and holding rib 20f, the table 20 may be locked at an arbitrary angle position within a predetermined angle range.

According to the above-described first rotation lock mechanism 31, the screw force may be transmitted to the lock member 42 via the transmission bracket 36 and the transmission rod 40 serving as the transmission member. In this configuration, because the relatively short length of the screw shaft, the screw shaft 35 may push the transmission bracket 36 at a position relatively near the user. In contrast, according to the prior art disclosed in, for example, Japanese Laid-Open Patent Publication No. H09-131701, a long screw shaft is configured to push a lock member. Because of this configuration, a displacement amount of a tip end of the screw shaft with respect to the lock member (offset of the pushed position) may be large, and accordingly a transmission loss may be large, which causes a fixing force of the lock member to be insufficient. However, in the aforementioned first rotation lock mechanism 31, the screw shaft 35 that is short in length may be configured to push the transmission member. Because of this configuration, a transmission loss of the screw force can be reduced compared to the prior art, and with a greater transmission of screw force, a large fixing force of the lock member 42 can consequently be produced so as to be sufficient in efficiently locking the position of the table 20.

As described, according to the first rotation lock mechanism 31, a rotational position of the table 20 in the horizontal front-to-rear and left-to-right plane may be configure to be locked by vertically holding the lock plate 11 of the base 10. Because of this configuration, displacement of the table 20 can be prevented when the table 20 is locked. On the contrary, in prior art such as, for example, Japanese Laid-Open Patent Publication No. H05-318402, Japanese Laid-Open Patent Publication No. H09-131701, Japanese Laid-Open Patent Publication No. 2002-200602, and Japanese Laid-Open Patent Publication No. 2010-58229, a rotational position of the table is locked by pressing the lock member to the (round) base (only in one direction). Because of this unstable configuration, a reaction caused by the push movement of the lock member may slightly raise (lift) the table, which can cause a problem of impairing cutting accuracy. In contrast, in the aforementioned first rotation lock mechanism 31, the table 20 may be configured to be locked by holding the lock plate 11 of the base 10 between the output portion 42b of the lock member 42 and the holding rib 20f of the table 20 from the up-to-down directions. Because of this stable configuration, even if there is a reaction caused by the push operation of the lock member 42, the presence of the holding rib 20f and plate 11 cancels the effects of such a reaction, and thus a positional offset, which can be caused by, for example, even a slight movement of the table 20 with regard to the base 10 in the upward direction (lift of the table 20) does not occur, improving cutting accuracy.

The tabletop cutting device 1 according to the present embodiment may further include the second lock mechanism 32 in addition to the first rotation lock mechanism 31. In the second rotation lock mechanism 32, the table 20 may be locked at a plurality of predetermined angular positions within a predetermined angle range, which is referred to as a so-called positive lock. An operation member 34 of the second rotation lock mechanism 32 may be arranged as part of the rotation lock operation portion 30. As shown in FIGS. 1 and 9, an operation knob 39 for retaining a pressed-down position (un-locked position) of the operation member 34 may be provided on the left side of the rotation lock operation portion 30. As shown in FIGS. 10 and 11, the operation member 34 may be supported in the rotation lock operation portion 30 so as to be swung along the up-to-down direction via a swing shaft 34c that is integrally formed on the rear side of the operation member 34. An operation portion 34a that the user presses down may be provided on the front side of the operation member 34.

The operation member 34 may be linked to a protrusion via an engagement shaft pin 46 in front of a swing shaft 34c. In the present embodiment, a lock pin 47 may be used as the protrusion. The engagement shaft pin 46 may be a pin with a diameter that is sufficiently thin compared to the lock pin 47, wherein the engagement shaft pin 46 may be inserted into the lock pin 47 in the radial direction of the lock pin 47 passing width-wise through the longitudinal axis of the lock pin 47 so as to protrude in the left-to-right direction of the lock pin 47. The engagement shaft 46 may be brought into contact with an inclined surface portion 34b of the operation member 34 from below thereof. The lock pin 47 may be supported via the supporting wall 20a and the rod-receiving portion 41 so as to be displaceable along the front-to-rear direction. The lock pin 47 may be arranged in parallel with the screw shaft 35 of the first rotation lock mechanism 31. Furthermore, in the planar view as shown in FIG. 9, the lock pin 47 may be arranged coaxially with the screw shaft 35 in the front-to-rear direction. Because of this configuration, the lock pin 47 may be arranged to be parallel to and offset with respect to the transmission rod 40 of the first rotation lock mechanism 31.

The operation member 34 causes the lock pin 47 to be biased in the rearward direction through insertion of a compression spring 48, interposed between the engagement shaft 46 and the supporting wall 20a. The operation member 34 is biased upward (in the lock direction) by the inclined surface portion 34b being pressed by the engagement shaft 46 from below thereof. By pushing the operation portion 34a down against the compression spring 48, the pushing of the engagement shaft 46 against the inclined surface portion 34b can be released with the inclined surface portion 34b moving downward, and hence the operation member 34 swings in the downward direction (in the unlocked direction). When the operation member 34 is moves downward in the up-to-down direction, the lock pin 47 correspondingly moves in the forward in the front-to-rear direction. Behind the lock pin 47, a plurality of lock recesses 12 may be provided on the front side of the base 10 within a predetermined angle range. The plurality of the lock recesses 12 may be provided at every predetermined angle interval.

In a state where the operation member 34 is disposed in the lock direction (in the upward direction) by the biasing force of the compression spring 48, this occurs firstly due to lock pin 47 moving in the rearward direction. It is when the lock pin 47 moves in the rearward direction and enters into any one of the lock recesses 12, that a rotation position of the table 20 may be locked. In this way, the lock position of the lock pin 47 is then retained by the biasing force of the compression spring 48. When the operation portion 34a of the operation member 34 is pressed down against the compression spring 48, the engagement shaft 46 may be pushed by the lower surface of the inclined surface portion 34b, which moves downward, and the lock pin 47 consequently then moves in the forward direction. When the lock pin 47 moves in the forward direction, a rear portion of the lock pin 47 may be extracted from the lock recess 12. By moving the lock pin 47 in the forward direction and extracting it from the lock recess 12, the table 20 may be unlocked to be rotatable via the second rotation lock mechanism 32.

The pressed-down state of the operation member 34 (unlocked state) may be facilitated by a user operating the operation knob 39 that is provided on the left side of the rotation lock operation portion 30. By putting the operation member 34 in the pressed-down position through turning the operation knob 39, the lock pin 47 may be retained in an extracted state from the lock recess 12. In the aforementioned first rotation lock mechanism 31, in terms of horizontal rotation, the table 20 may be positioned at any arbitrary angle position in a state where the lock pin 47 is extracted from the lock recess 12. When a rotation position of the table 20 is positioned by using the first rotation lock mechanism 31, the operation member 34 of the second rotation lock mechanism 32 may be retained in an unlocked state by turning of the operation knob 39, which causes a positioning of the table 20 by the first rotation lock mechanism 32 to be performed rapidly and reliably. When positioning of the table 20 is not performed by the first rotation lock mechanism 31, the locked state of the operation member 34 may be retained by turning the operation knob 39 upward, which retains a locked state of the pressed-down operation of the operation member 34 with spring compression. Because of this operation, the operation member 34 may return to a lock position (in the upward direction) by the biasing force of the compression spring 48, which occurs due to the turning of the knob. By returning the operation member 34 in the lock position (in the upward direction), the inclined surface 34b of 34 also moves upward, and consequently the lock pin 47 retreats (moving in the rearward direction) and the rear end portion of the lock pin 47 may thus be inserted to the lock recess 12, which causes the table 20 to be positioned rotationally in one of the predetermined angle positions which are spaced apart at equal angular intervals.

As shown in FIG. 7, an angle scale 13 for indicating the horizontal rotational position of the table 20 may be attached on the front side of the base 10. An indicator (pointer) may be provided at a left-to-right symmetric position of the table 20. An angle position of the table 20 can be confirmed by reading the angle scale 13 at the region indicated by the indicator 23. FIG. 7 shows a state where the table 20 is locked at an angle position of 0°. In the present embodiment, the rotational position of the table 20 can be changed within an angle range of approximately 60° in the left-to-right direction. According to the first rotation lock mechanism 31, a rotation position of the table 20 can be locked at an arbitrary angle position within the angle range of approximately 60° in the left-to-right direction. According to the second rotation lock mechanism 32, the rotational position of the table 20 can be locked at equally spaced intervals of, for example, 10° within the angle range of approximately 60° in the left-to-right direction with excellent repeating accuracy. An angle position which cannot be locked by the second rotation lock mechanism 32, may be locked by the first rotation lock mechanism 31.

[Inclination Positioning Mechanism 62 of the Cutting Device Main Body 100]

As shown in FIGS. 1 and 2, the cutting device main body 100 may be supported at the rear of the table 20 via the main body supporting portion 60. The cutting device main body 100 may be supported so as to be swung along the up-to-down direction with respect to the upper surface of the table 20, to be slid along the front-to-rear direction, and to be tilted along the left-to-right direction. The main body supporting portion 60 may be provided with a main body supporting arm 61 that extends in the upward direction from the rear of the table 20. Furthermore, as shown in FIG. 14, a right-angled positioning mechanism 90 and an inclination positioning mechanism (oblique positioning mechanism) 62 may be provided between a lower portion of the main body supporting arm 61 and the rear portion of the table 20.

Figure 17:
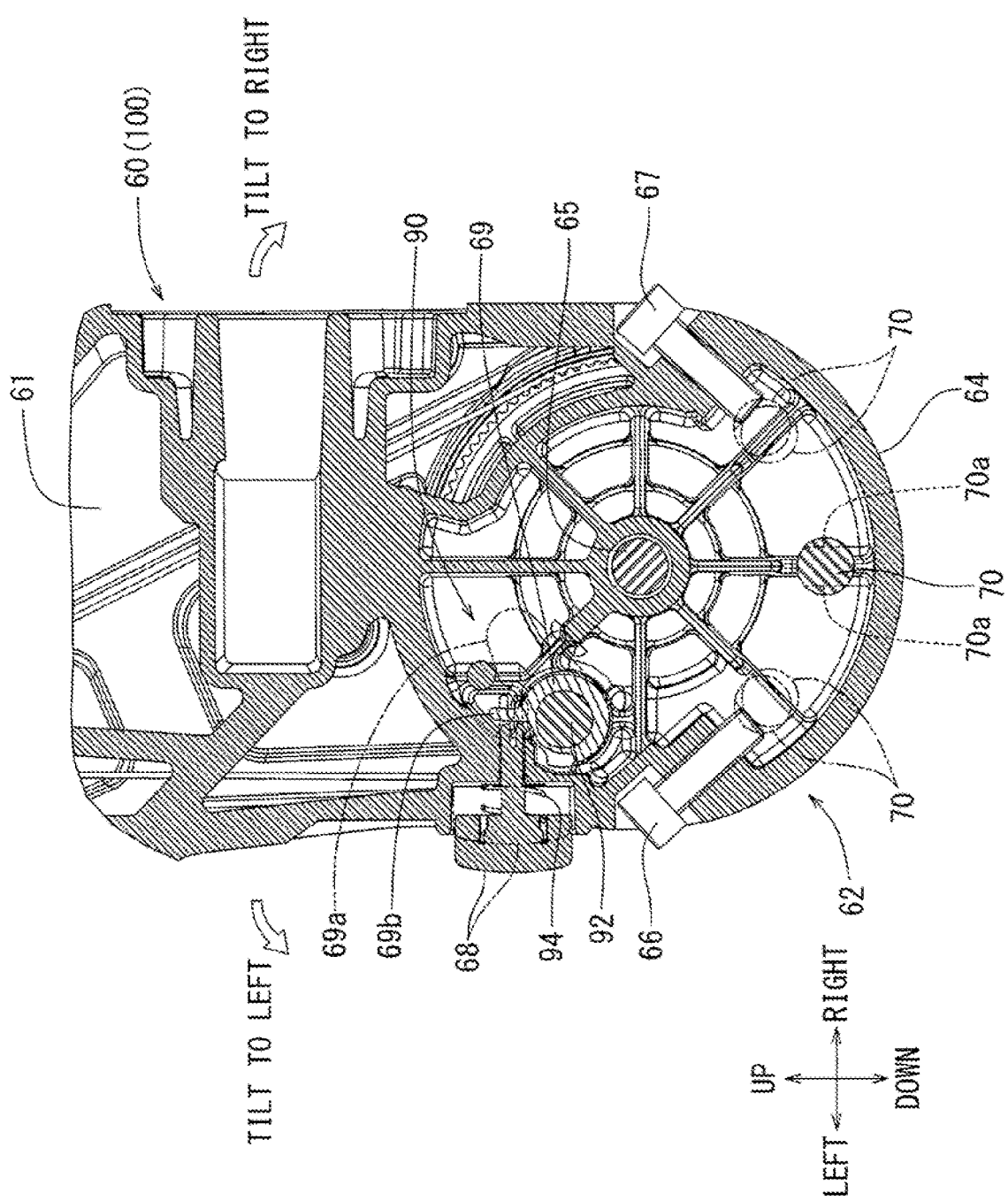
FIG. 17 is a cross-sectional view taken along line (XVII)-(XVII) of FIG. 15, showing a longitudinal cross-sectional view of the inclination positioning mechanism. This figure shows a longitudinal sectional view of an inclination-supporting portion.
Figure 19:
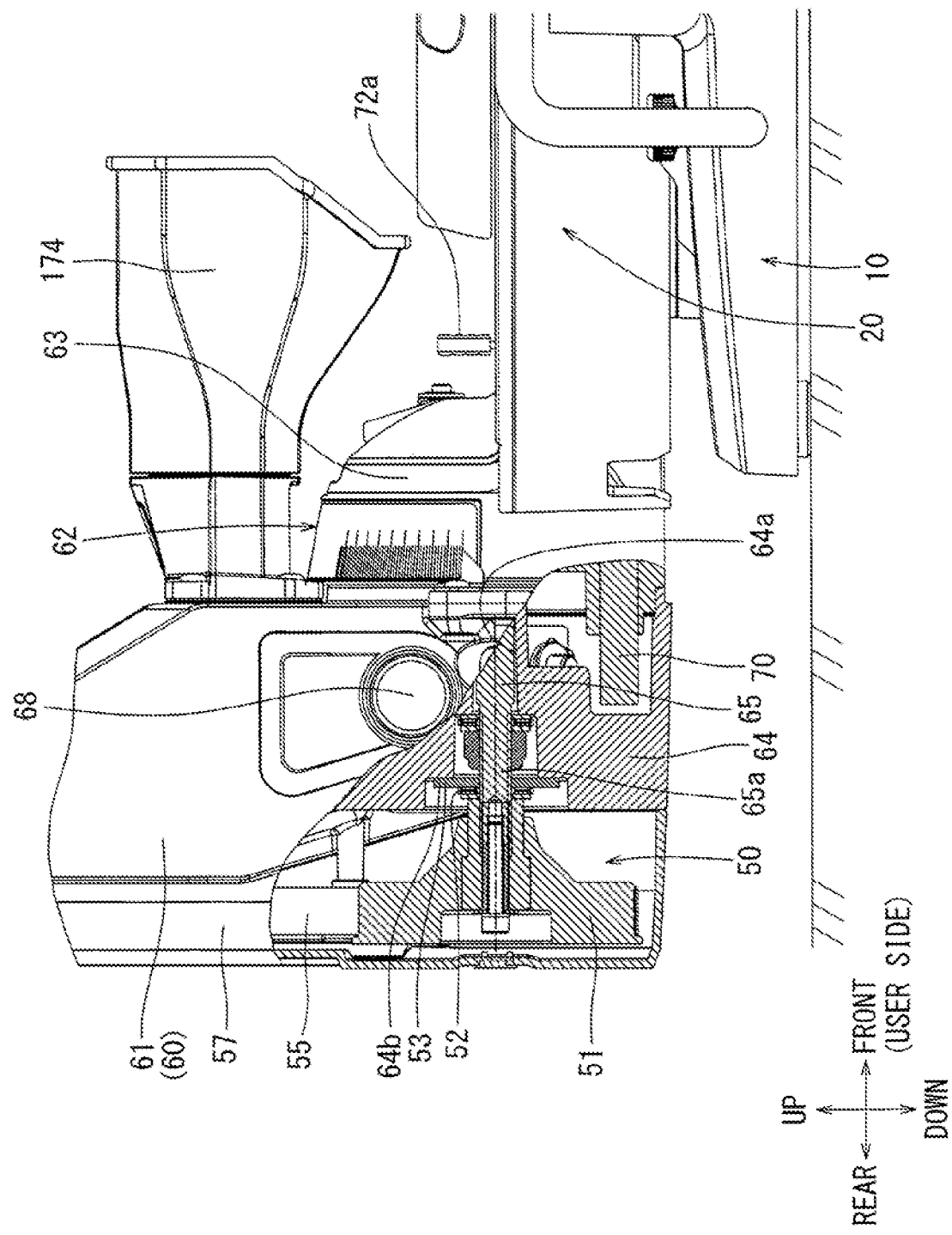
FIG. 19 is a longitudinal sectional view of an inclination fixing mechanism.
Figure 20:
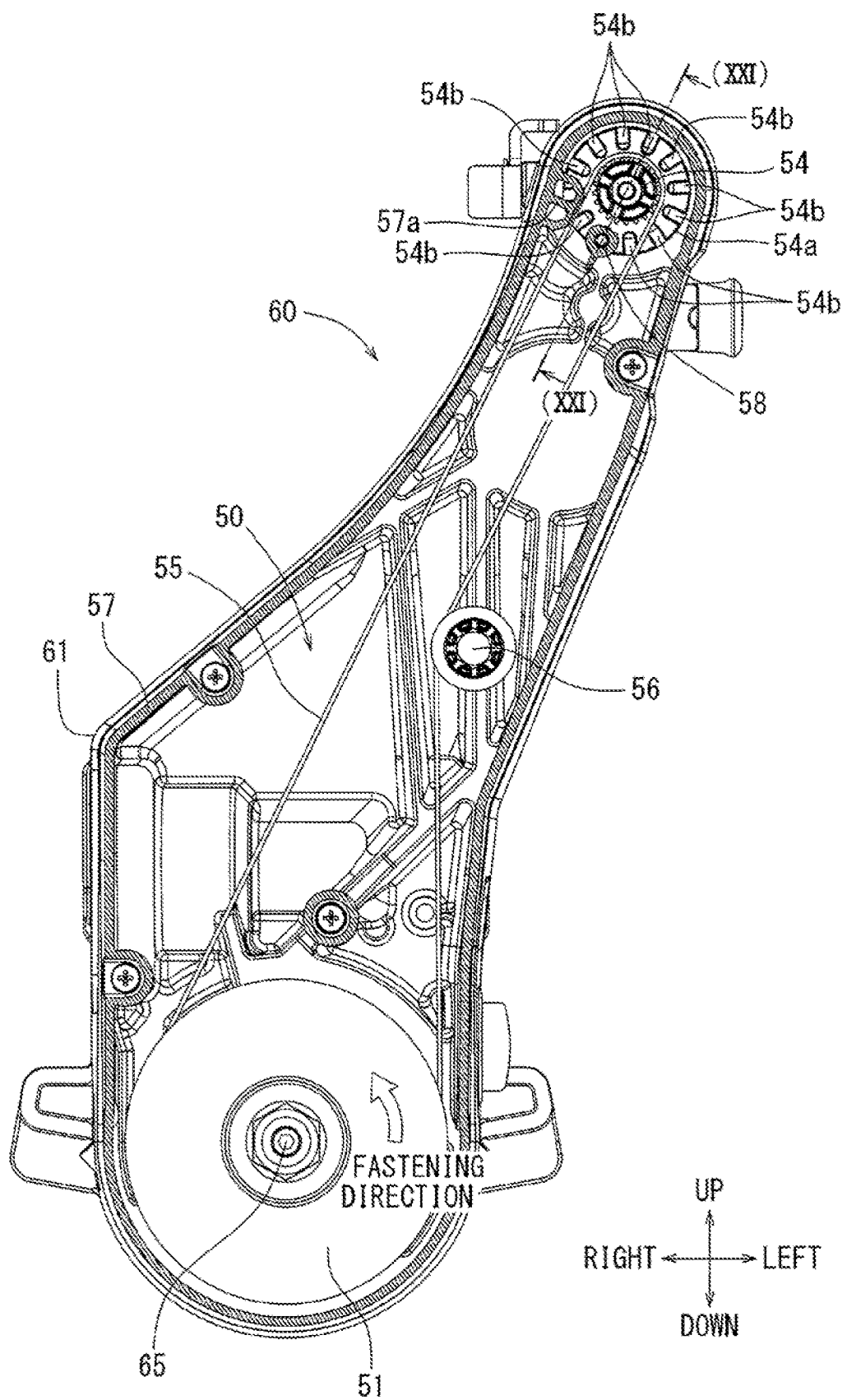
FIG. 20 is a view of the inclination fixing mechanism, which is viewed from a rear side thereof.

A tubular inclination-receiving portion 63 may be formed integrally with the table 20 at the rear of the table 20. Furthermore, an inclination-supporting portion 64 may be formed integrally with the main body supporting arm 61, which includes a tubular joining surface, on the lower front surface of the main body supporting arm 61. As shown in FIG. 17, the inclination-supporting portion 64 may be joined to the inclination-receiving portion 63 so as to be rotatable via a single left/right inclination shaft 65. FIGS. 2, 19, and 20 show the left/right inclination shaft 65. The main body supporting arm 61 and the cutting device main body 100 may be supported so as to be inclined (tilted) in the left-to-right direction about the front-to-rear longitudinal axis of the left/right inclination shaft 65. The axis of the left/right inclination shaft 65 may correspond to the upper surface of the table with respect to the up-to-down direction.

Figure 13:
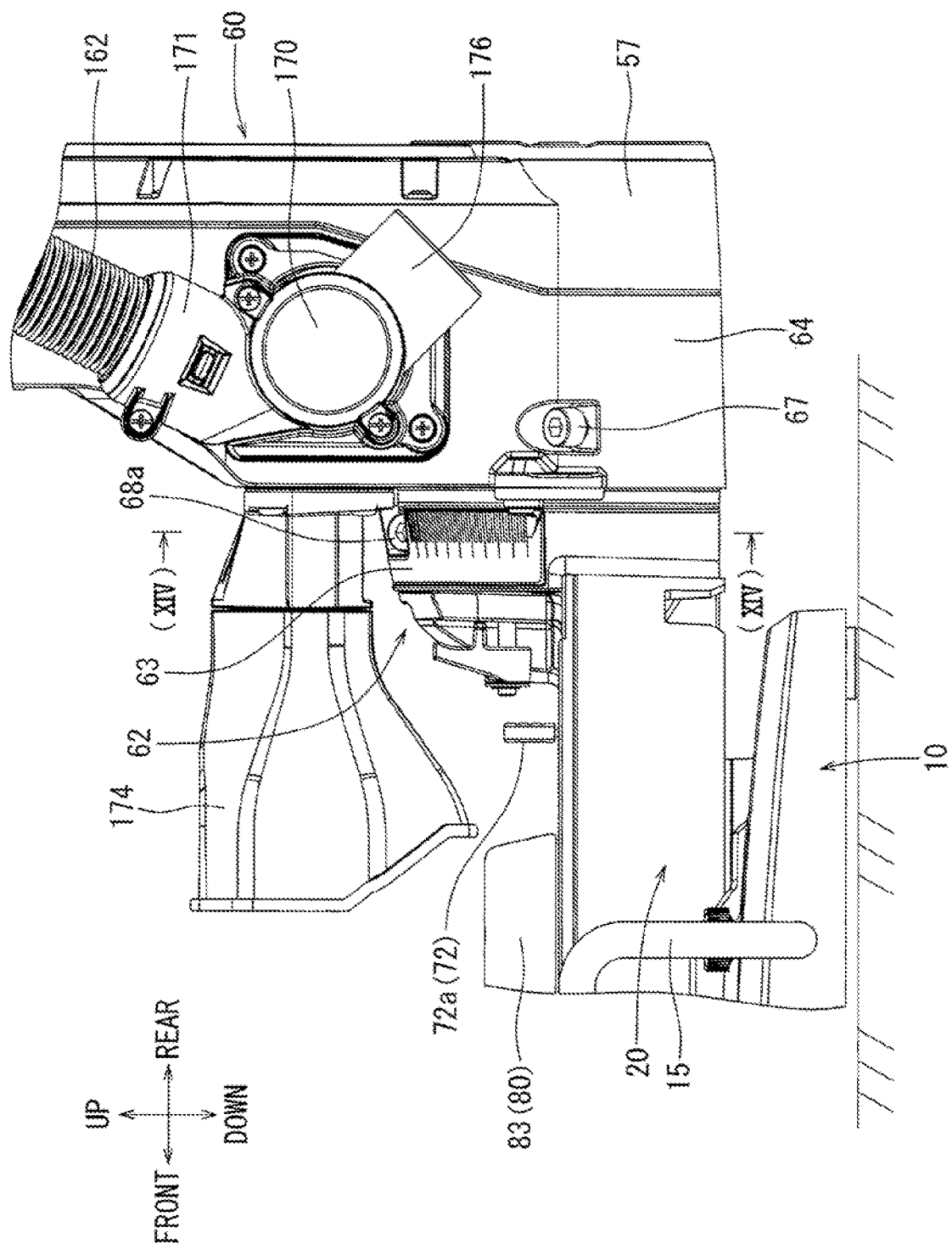
FIG. 13 is a right side view of both a rear side of the table and a lower side of a main body supporting portion.
Figure 14:
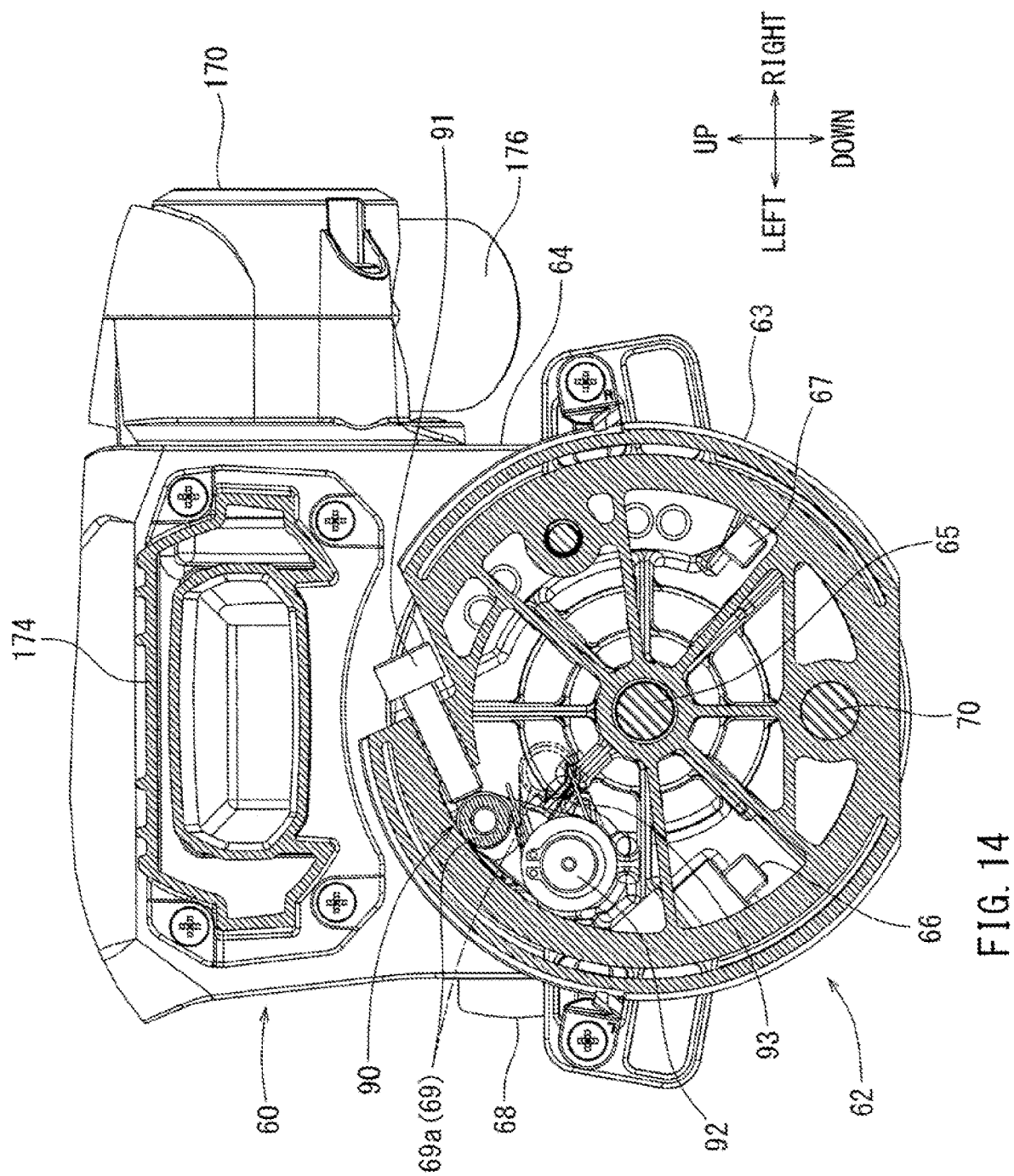
FIG. 14 is a cross-sectional view taken along line (XIV)-(XIV) of FIG. 13, showing a longitudinal sectional view of a right-angled positioning mechanism. This figure shows a longitudinal sectional view of an inclination-receiving portion.

FIGS. 13, 14 and 17 show the right-angled positioning mechanism 90 in detail. The right-angled positioning mechanism 90 may include a right-angled positioning bolt 91, a right-angled positioning release button 68 and a right-angled positioning portion 69. The right-angled positioning bolt 91 may be fastened to an upper part of the inclination-receiving portion 63. The right-angled positioning portion 69 may be arranged forward relative to the right-angled positioning bolt 91 in a fastening direction thereof. Furthermore, the right-angled positioning portion 69 may be supported on the side of the inclination-supporting portion 64. The right-angled positioning portion 69 may be supported so as to be tiltable in the up-to-down direction via a supporting shaft 92. The right-angled positioning portion 69 may be biased by a torsion spring 93 in a direction where a contact portion 69a, which is provided in a tilting tip end portion of the right-angled positioning portion 69, is biased in the upward direction (in a counterclockwise direction in FIG. 14).

As shown in FIG. 17, an engagement portion 69b may be provided on the left side of the right-angled positioning portion 69. The right-angled positioning release button 68 may be arranged on the left side of the engagement portion 69b. The right-angled positioning release button 68 may be provided on the left side of the inclination-supporting portion 64. Furthermore, the right-angled positioning release button 68 may move in the left-to-right direction. The right-angled positioning release button 68 may be biased by a compression spring 94 toward a left-side right-angled positioning position pushing outward (a position shown by a solid line in FIG. 17). In a state where the right-angled positioning release button 69 is pushed outward and positioned at the left-side right-angled positioning position by the biasing force of the compression spring 94, the right-angled positioning portion 69 may be positioned by the biasing force of the torsion spring 93 at a right-angled positioning position thereof that is shown by a solid line in FIG. 14. By moving (tilting) the main body supporting arm 61 and eventually the cutting device main body 100 from the left to the right (in a clockwise direction in FIG. 14) and contacting the contact portion 69a of the right-angled positioning portion 69, which is located at the right-angled positioning position thereof, the main body supporting arm 61 and eventually the cutting device main body 100 can be positioned at the right-angled cutting position.

When the right-angled positioning release button 68 is pressed inward to a right-side release position (a position shown by a two-dot chain line in FIG. 17) against the compression spring 94, a tip end of the right-angled positioning release button 68 may contact the engagement portion 69b and be pushed in the rightward direction. By pushing the engagement portion 69b in the rightward direction, the right-angled positioning portion 69 may move to the release position that is shown by the two-dot chain line in FIG. 14. In a state where a pressing operation of the right-angled positioning release button 68 is carried out to position the right-angled positioning portion 69 at the release position, the right-angled positioning bolt 91 may then not contact the contact portion 69a and thus the main body supporting portion 60 and eventually the cutting device main body 100 can be passed though the right-angled positioning position and tilted to the right side. When the cutting device main body 100 is tilted from the right-angled cutting position to the left side, the contact portion 69a of the right-angled positioning portion 69 may be displaced in a direction to be separated away from the right-angled positioning bolt 91 in the leftward direction, whereby moving the body 100 to the left side makes the bolt 91 move further away from contact portion 69a, and thus the release operation of the right-angled positioning mechanism 90 is not needed.

Figure 15:
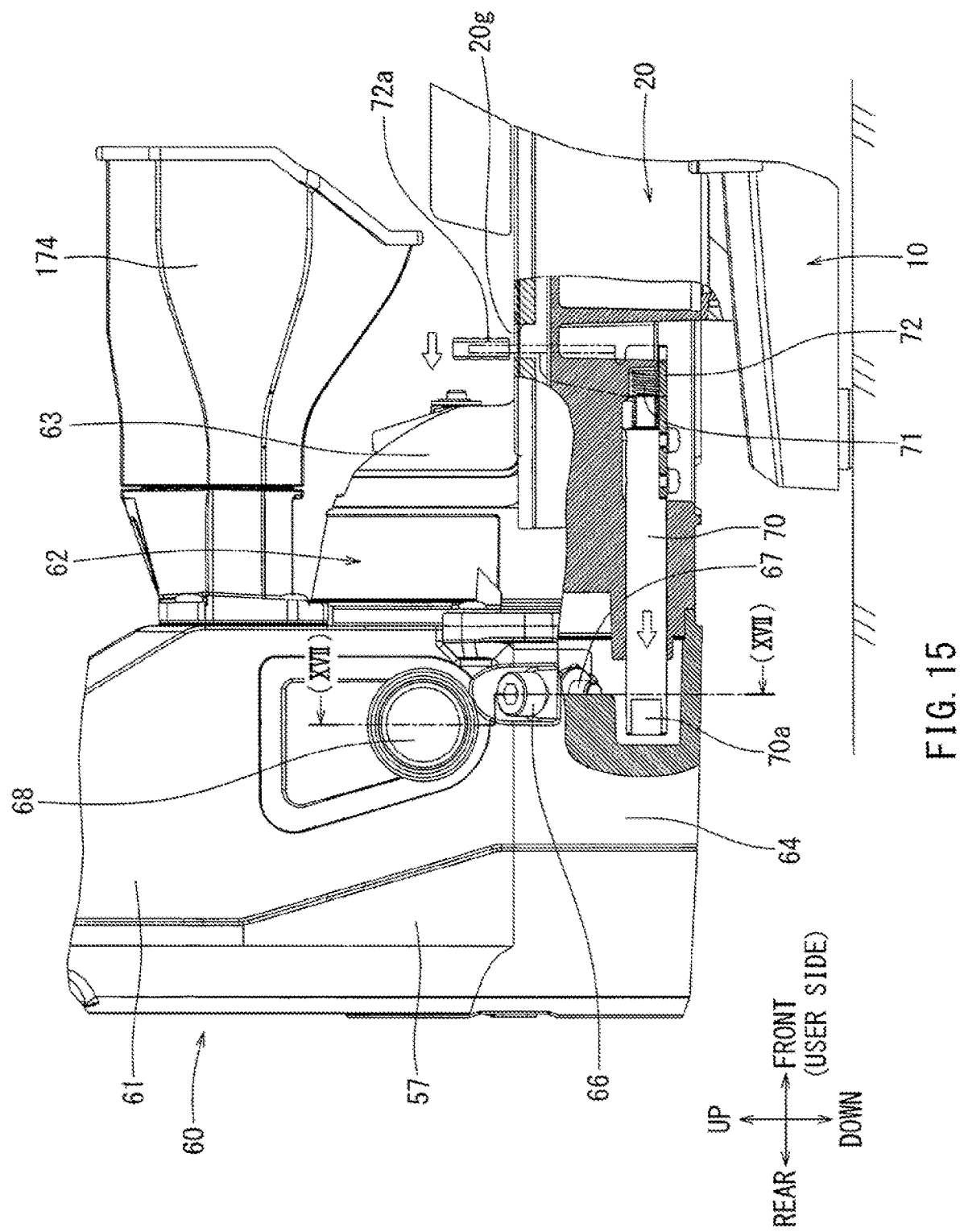
FIG. 15 is a left side view of an inclination positioning mechanism. This figure shows that an inclination positioning rod is moved to a 45° positioning point.
Figure 16:
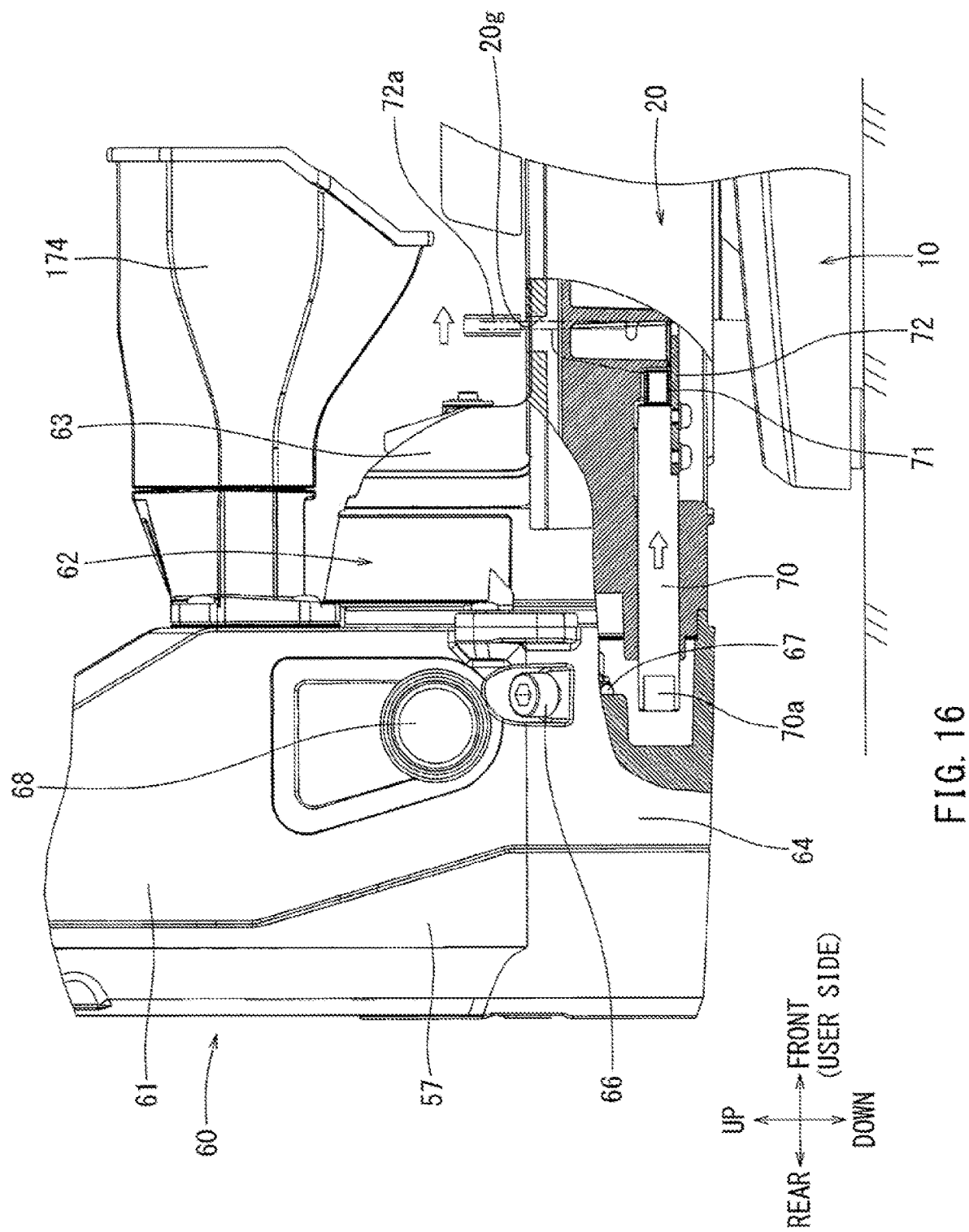
FIG. 16 is a left side view of the inclination positioning mechanism. This figure shows that the inclination positioning rod is moved to a 48° positioning point.

FIGS. 15 to 18 show a detail of the inclination (oblique) positioning mechanism 62. As shown in FIG. 17, inclination-stopper bolts 66, 67 may be provided on both the left-to-right side of the inclination-supporting portion 64. Each tip end of the inclination-stopper bolts 66, 67 may be fastened obliquely in the downward direction. An inclination-positioning rod 70 may be provided at the lower of the inclination-receiving portion 63. As shown in FIGS. 15 and 16, the inclination-positioning rod 70 may be supported by the rear portion of the table 20 so as to be displaceable in the front-to-rear axial direction. The inclination-positioning rod 70 may be biased by a compression spring 71 in a direction to move to a rear-side 45° positioning position. A rear portion of the inclination-positioning rod 70 may be located at a position that the left and right inclination-stopper bolts 66, 67 may face (in the forward direction along the axial direction of the inclination-stopper bolt 66, 67).

Figure 18:
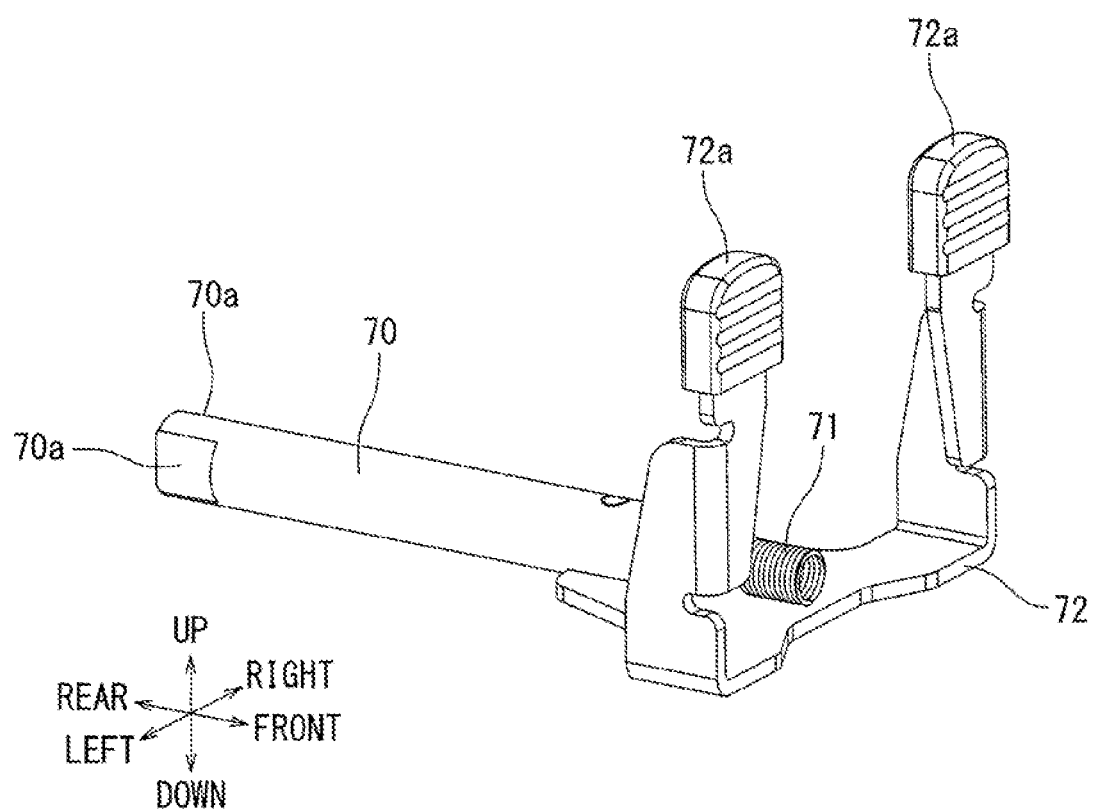
FIG. 18 is a perspective view of the inclination positioning rod.

As shown in FIG. 18, an operation bracket 72 may be attached to the front portion of the inclination-positioning rod 70. FIG. 18 shows the inclination-positioning rod 70 and the operation bracket 72, respectively as a simple component. A pair of operation knobs 72a may be integrally formed in the upper portion of the operation bracket 72, which may be used as an operation member for changing an inclination angle. As shown in, for example, FIGS. 2 and 7, each of the left and right operation knob 72a may protrude from the upper surface of the table 20 in the upward direction via an insertion window 20g provided in the rear of the table 20. Each of the left and right insertion windows 20g, respectively, may be formed in a rectangular shape for insertion of the operation knob 72a and symmetric arrangement with respect to a central line of the table 20, in the left-to-right and front-to-rear plane. A length of each insertion window 20g in the front-to-rear direction may be configured such that each operation knob 72a can be moved between a front-side 48° positioning position and a rear-side 45° positioning position. The user of the tabletop cutting device 1 can move the inclination-positioning rod 70 in the front-to-rear direction by picking the left or right operation knob 72a with his or her fingers and moving it in the front-to-rear direction.

As shown in FIG. 15, the operation knob 72a may be biased in the rearward direction due to a biasing force of the compression spring 71, and said biased position of the operation knob 72a may be an initial position. Because of this configuration, the inclination-positioning rod 70 may be retained at the rear-side 45° positioning position by the biasing force of the compression spring 71. FIG. 7 shows the initial position of the operation knob 72a, and FIG. 15 shows the corresponding 45° positioning position of the inclination-positioning rod 70. An operation, by which the inclination-positioning rod 70 is moved to the 48° positioning position and the operation knob 72a is moved in the forward direction, may be made against the compression spring 71.

As shown in FIGS. 15, 16 and 18, two contact portions 70a, each having a flat surface, may be provided at the rear of the inclination positioning rod 70, wherein the two contact portions 70a are parallel to each other. By moving the inclination-positioning rod 70 in the front-to-rear direction, the contact portions 70a may also concomitantly move in the front-to-rear direction. FIG. 15 shows that the inclination-positioning rod 70 is positioned to the rear-side 45° positioning position by the biasing force of the compression spring 71. In this state, the contact portions 70a may be offset in the rearward direction from the vertical axis line of the left and right inclination-stopper bolts 66, 67. Because of this configuration, when cutting device main body 100 is tilted (inclined) from the right-angled cutting position in the leftward or rightward direction, and eventually the main body supporting arm 61 is tilted (inclined) in the leftward or rightward direction, either one of the left and right inclination-stopper bolts 66, 67 may contact an outer circumferential surface of the inclination-positioning rod 70 in their rotational path. Through the contact of either one of the left and right inclination-stopper bolts 66, 67 with the outer circumferential surface of the inclination-positioning rod 70 due to said rotation of the cutting device body main 100, the cutting device main body 100 may be positioned at a position in which it is tilted (inclined) by 45° in the leftward or rightward direction, in the up-to-down, left-to-right directional plane.

As shown in FIG. 16, by moving the left or right operation knob 72a with a finger tip in the forward direction (in the front direction), the inclination-positioning rod 70 may be moved frontward to the 48° positioning position against the biasing force of the compression spring 71. When the inclination-positioning rod 70 is moved to the front-side 48° positioning position, the contact portion 71a, and not the outer circumferential surface of the inclination-positioning rod 70, may be positioned in the forward direction along the vertical axial direction of the left or right inclination-stopper bolts 66, 67, in the rotational path of either bolt. Because of this configuration, when the cutting device main body 100 is inclined (tilted) from the right-angled cutting position in the leftward or rightward direction and eventually the main body supporting arm 61 is tilted (inclined) in the leftward or rightward direction, the left or right inclination-stopper bolt 66, 67 may contact the respective contact portion 70a of the inclination-positioning rod 70. Through the contact of the respective contact portion 70a of the inclination-positioning rod 70 with the left or right inclination-stopper bolt 66, 67, due to said rotation of the cutting device main body 100, the cutting device main body 100 may be positioned at a position in which it is tilted (inclined) by 48° in the leftward or rightward direction, in the up-to-down, left-to-right directional plane.

As shown in FIG. 17, when the cutting device main body 100 is tilted (inclined) in the leftward direction, the left-side inclination-stopper bolt 66 may contact (abut) the inclination-positioning rod 70 positioned at the 45° or 48° inclined positions. When the cutting device main body 100 is tilted (inclined) in the rightward direction, the right-side inclination-stopper bolt 67 may contact the inclination-positioning rod 70 positioned at the 45° or 48° inclined positions. In this way, the inclination-positioning rod 70 for positioning the cutting device main body 100 at the 45° or 48° inclined angle in the leftward or rightward direction can be changed to the 45° or 48° positioning position by manipulation of the operation knobs 72a. The operation knobs 72a may be arranged in front of an outer circumferential edge of the table 20 or in front of a rear end of an imaginary circle that passes the outer circumferential edge. Furthermore, the operation knobs 72a may also be arranged on a user side (front side) relative to the inclination positioning mechanism 62. On the other hand, in the prior art such as, for example, Japanese Laid-Open Patent Publication No. 2011-41999 and Japanese Laid-Open Patent Publication No. 2014-138961, this type of change lever is arranged on the rear surface side or the side surface side of the main body supporting arm 61. In comparison with these conventional configurations, the operation knob 72a according to the present embodiment may be arranged at a position closer to the user (at a rear upper surface of the table). Because of this configuration, the user may easily operate the operation knobs 72a in a comfortable manner with added convenience. In this respect, operability of the tabletop cutting device can be improved due to better accessibility. Furthermore, the operation knobs 72a may be arranged on both the left and right sides and thus the user can operate the operation knobs 72a with the same functionality, using his or her left or right hand. Furthermore, when the cutting device main body 100 is tilted (inclined) in the leftward direction, a wide space may be created near the right-side operation knob 72a. On the other hand, when the cutting device main body 100 is tilted (inclined) in the rightward direction, another wide space may be created near the left-side operation knob 72a. Because of this configuration where either side's knob 72a can be used, the operation knobs 72a are able to be operated by the user in either case.

[Inclination Fixing Mechanism 50 of the Cutting Device Main Body 100]

Figure 21:
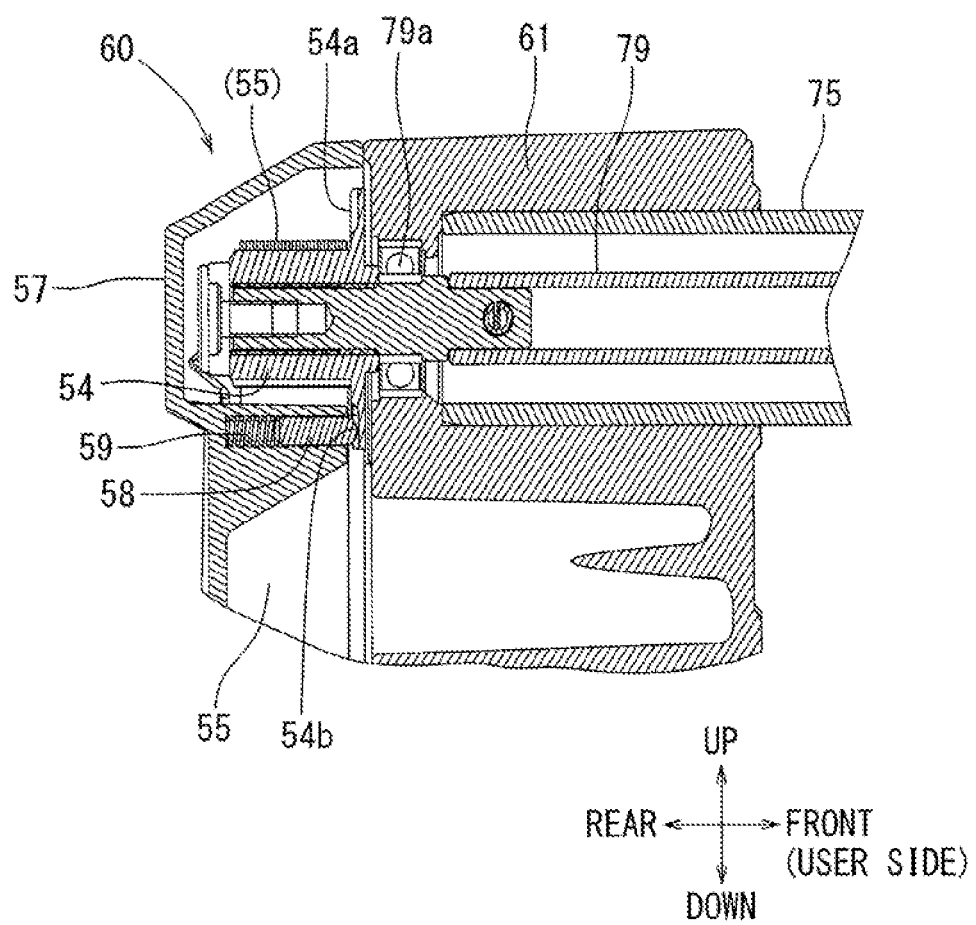
FIG. 21 is a cross-sectional view taken along line (XXI)-(XXI) of FIG. 20, showing a longitudinal cross-sectional view of a second pulley and its surroundings.

After the cutting device main body 100 is positioned by the right-angled positioning portion 69 or the inclination-positioning rod 70, the right-angled cutting position or the left-to-right inclination position of the cutting device main body 100 may be fixed by an inclination fixing mechanism 50, which will be discussed below. FIGS. 19 to 21 show the inclination fixing mechanism 50 in detail. The left/right inclination shaft 65 may be formed integrally with the inclination-receiving portion 63 protruding therefrom in the rearward direction. The left/right inclination shaft 65 may protrude from the rear surface of the inclination-supporting portion 64 via an insertion hole 64a in the rearward direction. A screw shaft portion 65a may be provided at the rear of the left/right inclination shaft 65. A first pulley 51 may be joined to the screw shaft portion 65a. When the first pulley 51 rotates with respect to the screw shaft portion 65a, the first pulley 51 may move about its rotational axis (in the front-to-rear direction). When the first pulley 51 is fastened with respect to the screw shaft portion 65a, the first pulley 51 may be pressed by a step portion 64b of the inclination-supporting portion 64 via a thrust bearing 52 and a flange 53. When the first pulley 51 is fastened to the screw shaft portion 65a and pressed by the step portion 64b, the inclination-supporting portion 64 may be fixed to the inclination-receiving portion 63 and thus a left-to-right inclination position of the main body supporting arm 61 with respect to the front-to-rear axis in the left-to-right, up-to-down directional plane may be fixed. In contrast, when fastening of the first pulley 51 is loosened with respect to the screw shaft portion 65a, the inclination-supporting portion 64 may still be rotatable with respect to the inclination-receiving portion 63 with an unfixed position and thus the main body supporting arm 61 may be tilted (inclined) in the left-to-right direction with respect to the front-to-rear axis.

As shown in FIG. 20, a second pulley 54 may be rotatably supported on the upper portion of the main body supporting arm 61. A transmission belt 55 may be fit around both the first pulley 51 and the second pulley 54. Toothed pulleys may be used for the first pulley 51 and the second pulley 54. Accordingly, a toothed belt may be used for the transmission belt 55. The first pulley 51 and the second pulley 54 may engage with the transmission belt 55, which can reliably transmit power without slipping upon contact with the pulleys. An idler 56 may be rotatably supported at an intermediate portion of the transmission path in the main body supporting arm 61. An appropriate tension of the transmission belt 55 may be retained by the positioning of the idler 56. Owing to the appropriate tension of the transmission belt 55 caused by the presence of the idler 56, tooth skipping of the first pulley 51 and the second pulley 54 with respect to contact with the transmission belt 55 can be prevented. In this respect, power can be reliably transmitted.

An arm cover 57 made from resin may be attached to the rear surface side of the main body supporting arm 61. The arm cover 57 may be attached to the main body supporting arm 61 so as to cover approximately the entirety of the rear surface of the main body supporting arm 61. The power transmission path of the transmission belt 55 between the first pulley 51 and the second pulley 54 may be covered by the arm cover 57, which can isolate said power transmission assembly, preventing interference and/or jamming of other components with respect to the first pulley 51, the second pulley 54, and the transmission belt 55. Furthermore, these members 51, 54, and 55 can be protected from dust etc. by the arm cover 57.

As shown in FIG. 20, a belt pressing portion 57a may be provided at the upper region of the main body supporting arm 61. The belt pressing portion 57a may be located on the right side of the second pulley 54. In the present embodiment, the belt pressing portion 57a may be formed integrally with the arm cover 57. The belt pressing portion 57a may protrude inwardly from the wall portion of the arm cover 57. As shown in FIG. 20, the belt pressing portion 57a may be pressed by the outward facing side of the transmission belt 55 (the side facing opposite the pulley teeth). Furthermore, the belt pressing portion 57a may be arranged to the front of, and on the right side of, the second pulley 54 in FIG. 20 in the fastening rotation direction (counterclockwise direction in FIG. 20, clockwise direction viewed from the user side) of the second pulley 54. FIG. 20 indicates the fastening rotation direction of the first pulley 51 about the screw shaft portion 65a of the left/right inclination shaft 65 with a void arrow. By rotating the second pulley 54 in the same direction as that of the void arrow, a left-to-right inclination position of the main body supporting arm 61 may be fixed with respect to inclination-receiving portion 63, and eventually a left-to-right inclination position of the cutting device main body 100 may be fixed. Because of this configuration, flexure of the transmission belt 55 may be easily occur toward the front of the fastening rotation direction of the second pulley 54, on the right side of said second pulley. Hence, the belt pressing portion 57a can prevent the flexure from occurring. By preventing said type of flexure of the transmission belt 55 with respect to the second pulley 54, tooth skipping of the transmission belt 55 with respect to the second pulley 54 can be prevented, which can help the device reliably transmit power.

According to the belt pressing portion 57a, the occurrence of the flexure of the transmission belt 55 can be prevented even in a narrow area where the idler cannot be arranged. If the belt pressing portion 57a is provided at a plurality of places, the flexure of the transmission belt 55 can be more reliably prevented. Furthermore, the belt pressing portion 57a can also be provided on the side of the main body supporting arm 61.

As shown in FIGS. 20 and 21, the second pulley 54 may be provided with a flange 54a. A plurality of engagement recesses 54b may be provided on the rear surface of the flange 54a. The plurality of engagement recesses 54b may be arranged at equally spaced radial intervals along a concentric circle having its radial center coinciding with a rotational center of the second pulley 54. A single engagement pin 58 may be provided at the upper portion of the arm cover 57 so as to be biased in a protruding direction by a compression spring 59. The engagement pin 58 that is biased in the protruding direction by the compression spring 59 may be pressed toward an engagement recess 54b of the second pulley 54. By elastically pressing the engagement pin 58 to the engagement recess 54b with the compression spring 59, a snap-fit configuration in the rotational direction of the second pulley 54 can be obtained.

As shown in FIG. 2, two slide bars 75, 76 may be supported on the upper portion of the main body supporting arm 61. The two slide bars 75, 76 may be fixed to the main body supporting arm 61 so as to extend lengthwise in a perpendicular manner from the upper front surface of the main body supporting arm 61 in the forward direction, and the front ends of the two bars thereof with respect to the front-to-rear direction may reach an upper center of the table 20. The two slide bars 75, 76 may be supported parallel to each other separated by a predetermined length in the vertical up-to-down direction. The front ends of the two slide bars 75, 76 may be joined by a connection member 78 so as to be spaced apart vertically with respect to each other by said predetermined length. A main body slider 77 may be supported so as to be slidable in the front-to-rear direction via the upper and lower slide bars 75, 76. The cutting device main body 100 may be supported by the main body slider 77. The cutting device main body 100 may be supported so as to be slidable in the front-to-rear direction via the main body slider 77, the upper slide bar 75, and the lower slide bar 76.

As shown in FIG. 2, a pipe material such as a steel pipe may be used for the upper and lower slide bars 75, 76. A transmission rod 79 may be inserted in the inner circumference of the upper slide bar 75. The transmission rod 79 may be supported so as to be rotatable around an axis thereof via a rear-side bearing 79a and a front-side bearing 79b. The rear-side bearing 79a may be supported by the main body supporting arm 61. The front-side bearing 79b may be supported by the connection member 78. The second pulley 54 may be joined to the rear portion of the transmission rod 79. The second pulley 54 may rotate together with the transmission rod 79.

An operation knob 73 may be joined to the front portion of the transmission rod 79. By rotating the operation knob 73 in the clockwise direction, the second pulley 54 can be rotated in the fastening direction (in the fastening direction of the first pulley 51 with respect to the screw shaft portion 65a) via the transmission rod 79. The user can rotate the second pulley 54, while the engagement pin 58 is pressed to engagement recess 54b in the snap-fit configuration described above, which can be obtained by the click mechanism provided in the second pulley 54, at a predetermined angle with respect to the rotation of the operation knob 73. The rotation of the second pulley 54 may be transmitted to the first pulley 51. By rotating the operation knob 73, the first pulley 51 can be rotated, and accordingly a left-to-right inclination position of the main body supporting arm 61 and eventually the cutting device main body 100 can be fixed.

According to the above-described inclination fixing mechanism 50, the inclination fixing mechanism 50 can be remotely operated by the rotation of the operation knob 73. The operation knob 73 may be located approximately at the upper center of the table 20, and thus the user can easily operate the operation knob 73 without a need to stretch his or her hand largely and take a limiting posture. Furthermore, the snap-fit configuration can be obtained with respect to the rotation by the engagement pin 58 that is spring-biased by the compression spring 59 (the click mechanism). Because of this configuration, the user can operate the operation knob 73 while the snap-fit of the pin to engagement recesses occurs at regular intervals, providing constant feedback and a finer degree of control of rotation to the user. In this respect, in comparison with the prior art such as, for example, Japanese Laid-Open Patent Publication No. 2015-150633, operability of the inclination fixing mechanism 50 is improved. Furthermore, flexure of the transmission belt 55 at the front side of the fastening rotation direction of the second pulley 54 can be prevented by the belt pressing portion 57a, which can prevent tooth skipping of the transmission belt 55 with respect to the second pulley 54.

[Cutting Device Main Body 100]

The cutting device main body 100 may be supported so as to be slidable in the front-to-rear direction via the two slide bars 75, 76 of the main body supporting portion 60. FIGS. 22 to 25 show a detail of the cutting device main body 100. The cutting device main body 100 may include the circular cutting blade 102 that rotates by an electric motor 101, which can be driven by an AC power source, as a driving force. An upper half periphery of the cutting blade 102 may be covered by a fixing cover 103. A lower half periphery of the cutting blade 102 may be covered by a movable cover 104. As shown in FIG. 23, the movable cover 104 may be supported on the left-side surface of the fixing cover 103 so as to be rotatable (so as to be able to open and close in the up-to-down direction) via a bearing (ball bearing) 104 that is attached to an outer circumference side of a boss portion 104a. The movable cover 104 may be opened and closed in accordance with the up-to-down movement of the cutting device main body 100. When the movable cover 104 is opened, a lower portion of the cutting blade 103 may be exposed. The exposed portion of the cutting blade 103 may be cut into the material to be cut (workpiece W). When the cutting device main body 100 is positioned at a top dead center (a state shown in FIGS. 1 to 5), the movable cover 104 may be completely closed. As the cutting device main body 100 moves downward from the top dead center to a bottom dead center, the movable cover 104 may be gradually opened. When the cutting device main body 100 moves to the bottom dead center (a state shown in FIG. 22), the movable cover 104 may be completely opened.

Figure 4:
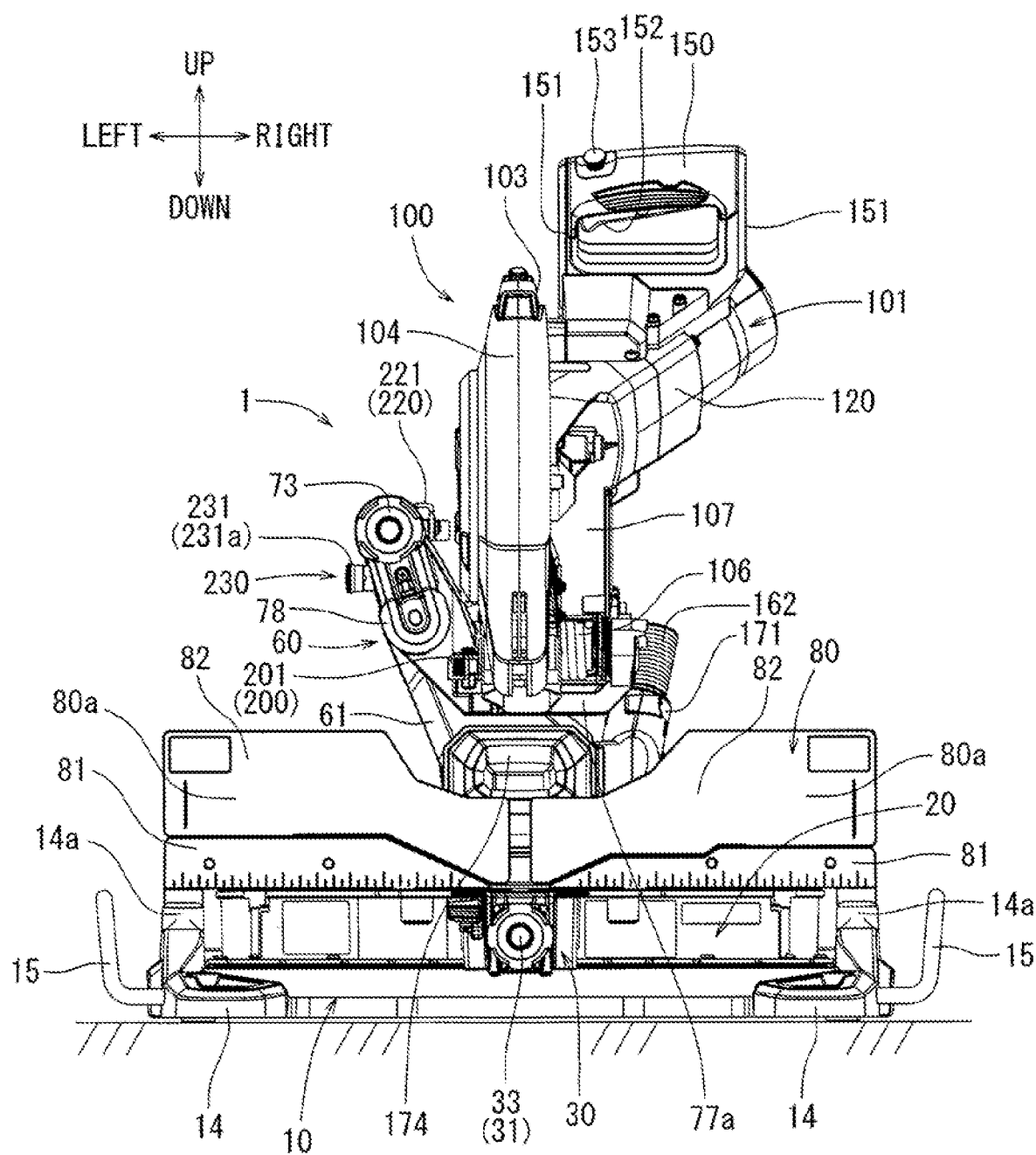
FIG. 4 is an overall view of the tabletop cutting device according to the embodiment, which is viewed from a user side (front side).
Figure 5:
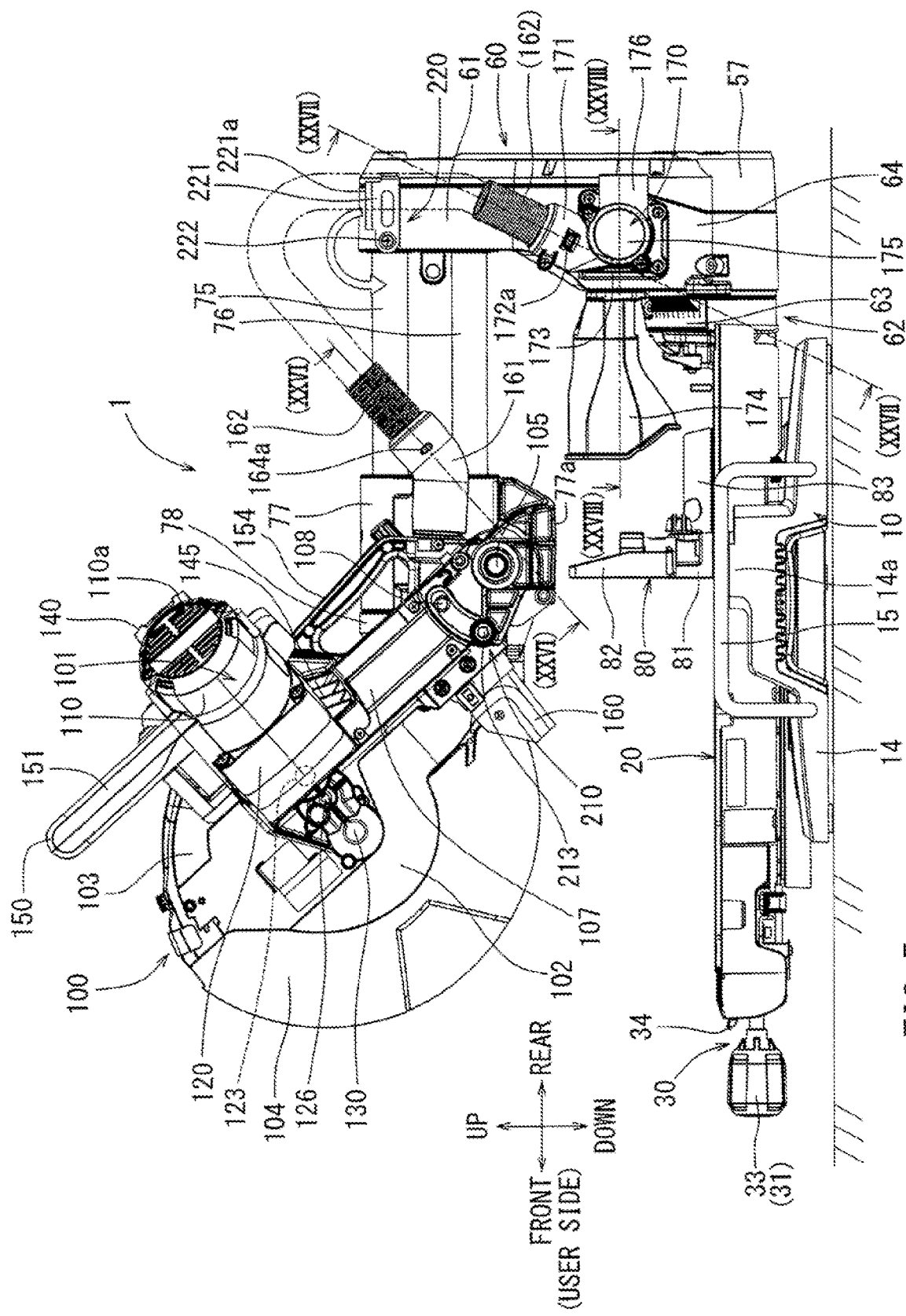
FIG. 5 is an overall side view of the tabletop cutting device according to the embodiment, which is viewed from a right side thereof.

As shown in FIGS. 4 and 5, a base 107 may be formed integrally with the fixing cover 103 at the rear thereof. The base 107 may extend in the rearward direction. Furthermore, a main body supporting portion 77a having a fork shape may be provided on the right side of the main body slider 77. The rear portion of the base 107 may be inserted into the main body supporting portion 77a and joined so as to be swung along the up-to-down direction via an up-to-down swing shaft 105. Because of this configuration, the cutting device main body 100 may be supported so as to be swung along the up-to-down direction with respect to the main body slider 77. The cutting device main body 100 may be swung along the up-to-down direction around the up-to-down swing shaft 105. The cutting device main body 100 may be biased in a direction where it can be returned to an upper-side stand-by position by a torsion spring 106 that is attached around the up-to-down swing shaft 105 (a part of the torsion spring 106 is seen in FIG. 4).

Figure 25:
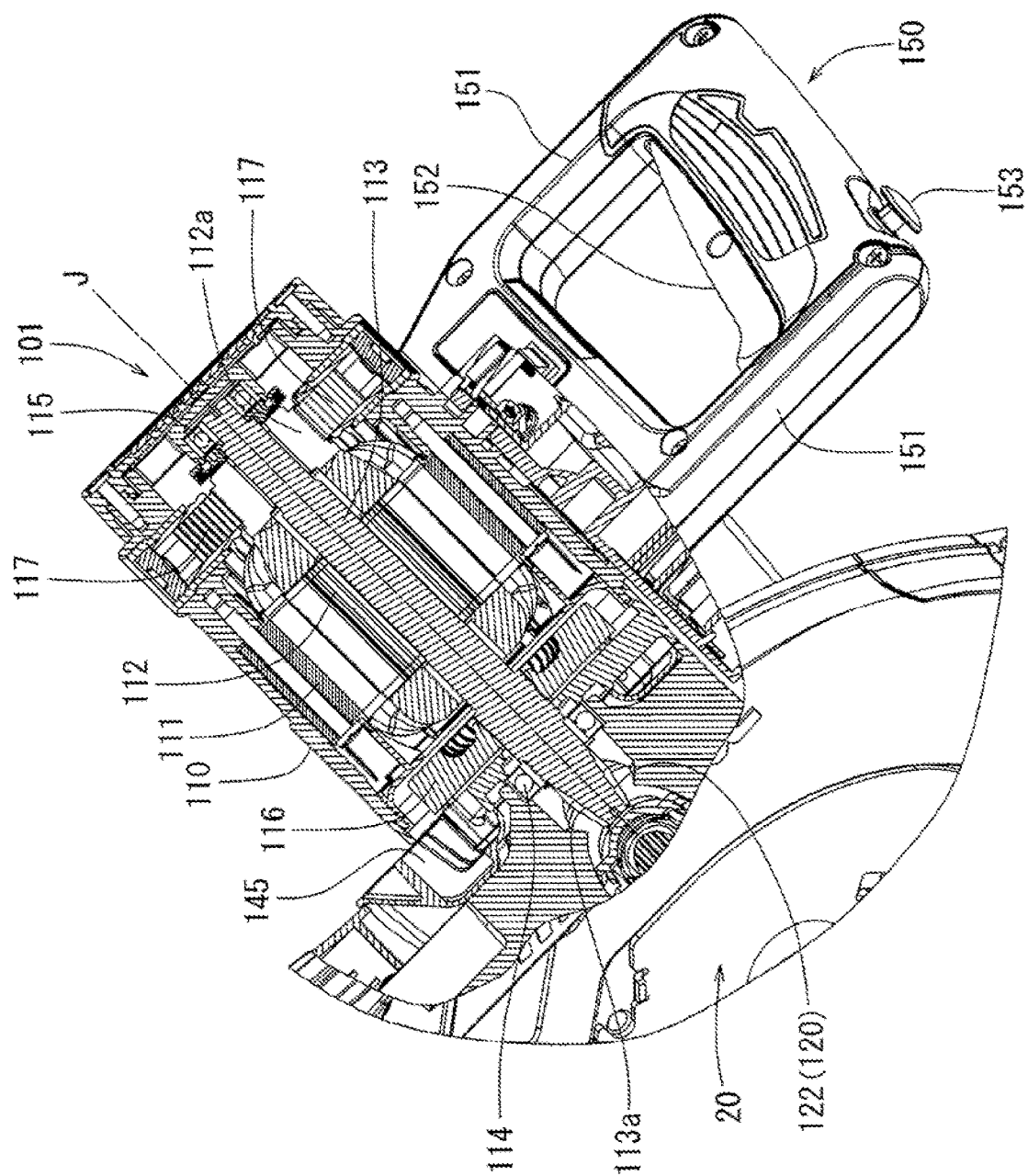
FIG. 25 is a cross-sectional view of an electric motor.

As shown in FIGS. 23 and 25, the electric motor 101 may be configured such that a stator 111 and a rotor 112 are housed in a tubular motor housing 110. The stator 111 may be fixed on the inner peripheral side of the motor housing 110. The rotor 112 may be rotatably supported on the inner peripheral side of the stator 111. The rotor 112 may be attached to a motor shaft 113. The motor shaft 113 may be rotatably supported via a front-side bearing 114 and a rear-side bearing 115 along a direction of the motor axis J. A cooling fan 116 may be attached to the motor shaft 113 on the front side in the direction of the motor axis J (lower left). As shown in FIG. 25, a commutator 112a may be located on the rear side in the direction of the motor axis J of the rotor 112 (upper right). Two carbon brushes may be brought into slidably contact with the commutator 112a from opposite sides relative each other.

Figure 22:
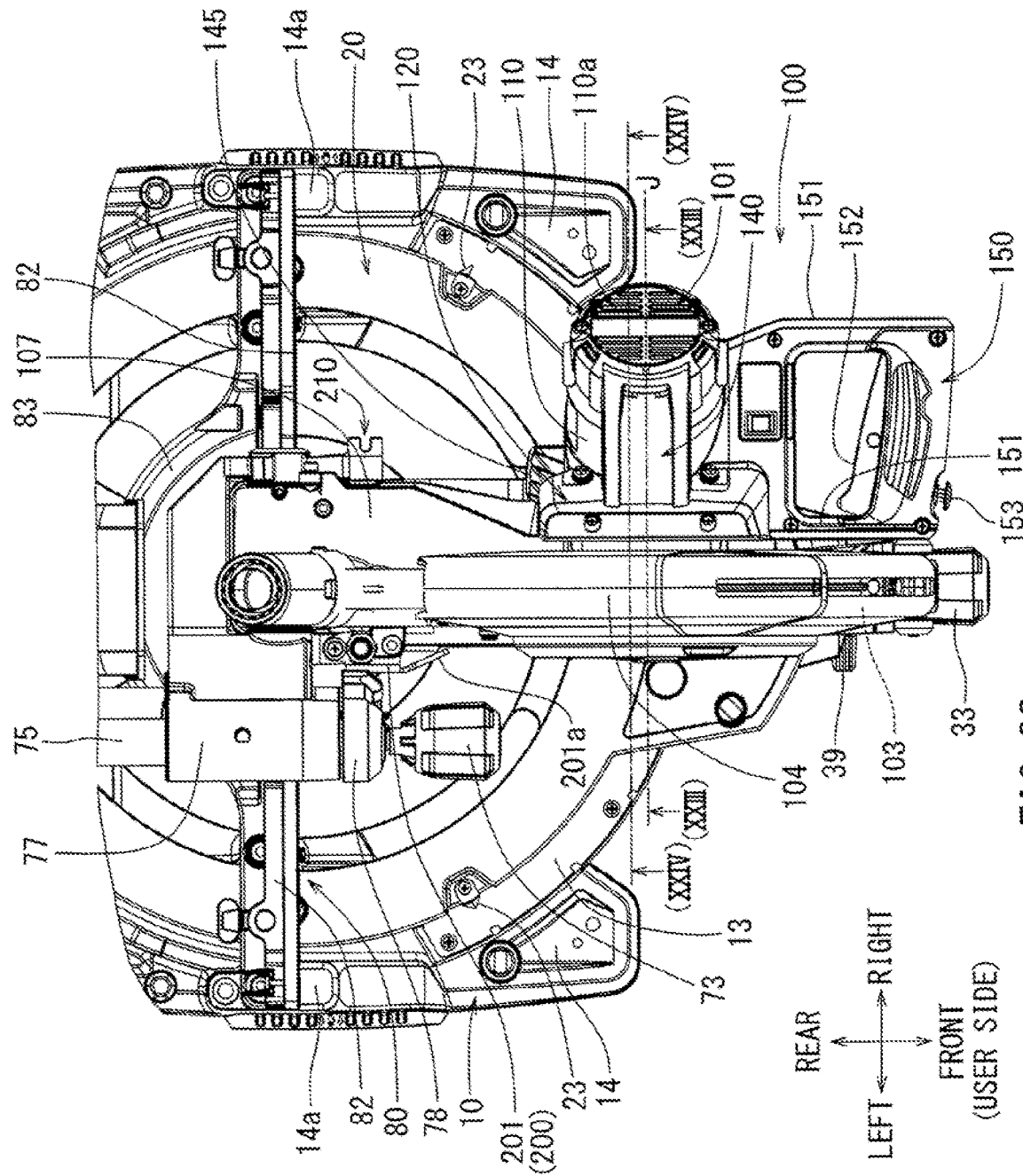
FIG. 22 is a plan view of a cutting device main body. This figure shows that the cutting device main body is swung to a lower moving end.
Figure 23:
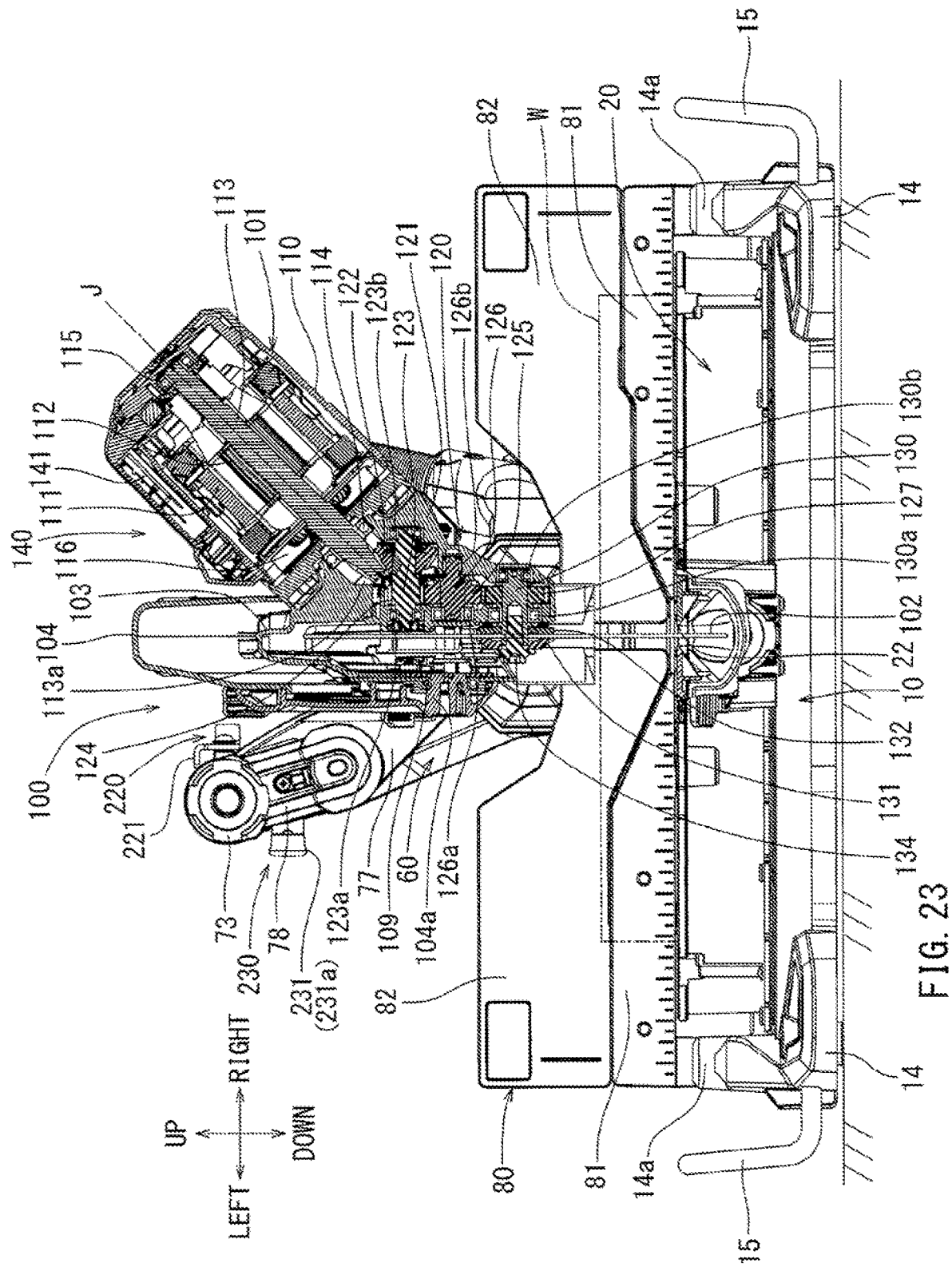
FIG. 23 is a cross-sectional view taken along line (XXIII)-(XXIII) of FIG. 22, showing a longitudinal sectional view of the cutting device main body. In this figure, the cutting main body that is swung to the lower moving end is viewed from the front side (user side).
Figure 24:
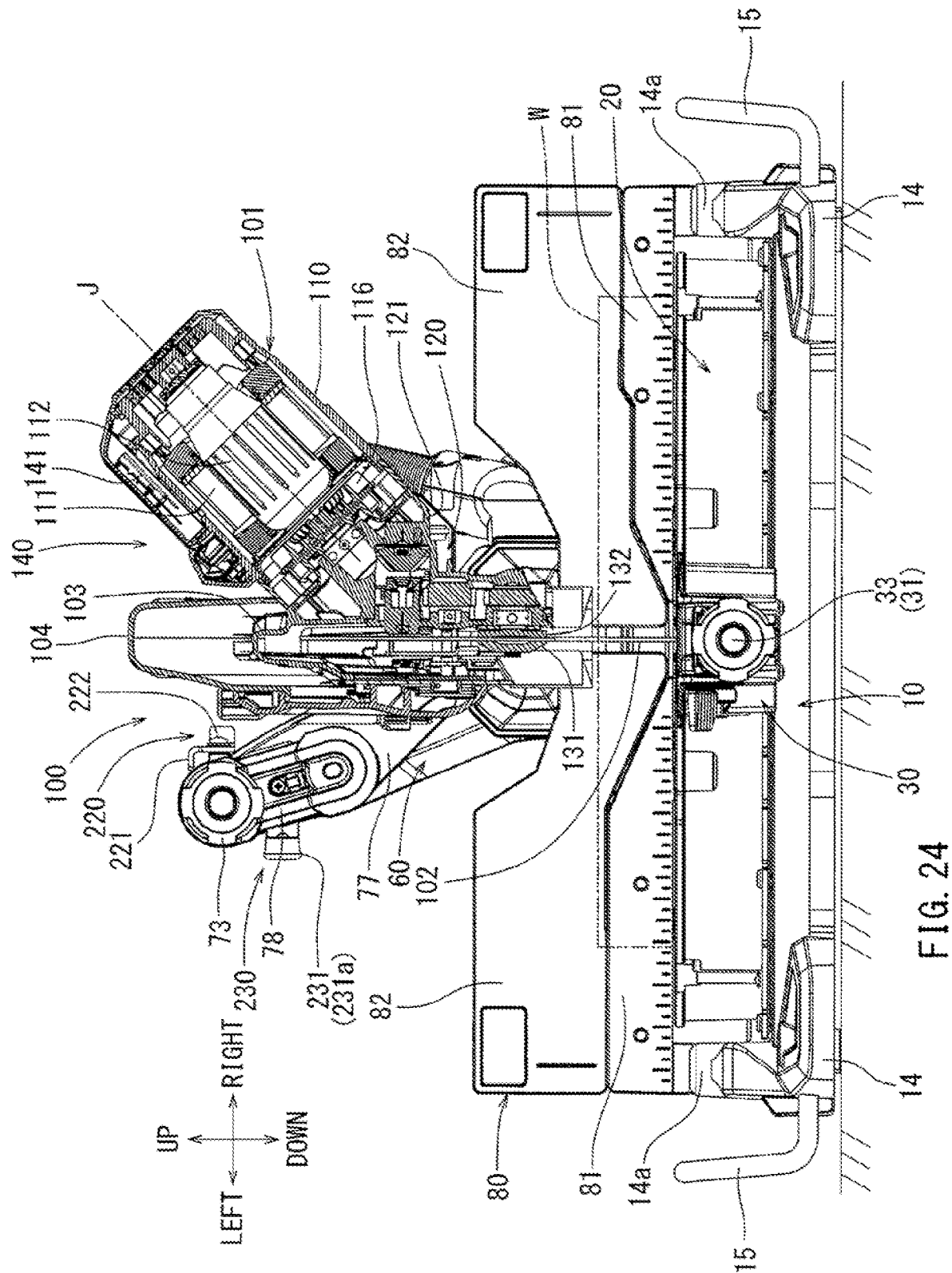
FIG. 24 is a cross-sectional view taken along line (XXIV)-(XXIV) of FIG. 22, showing a longitudinal sectional view of the cutting device main body. In this figure, the cutting main body that is swung to the lower moving end is viewed from the front side (user side).

As shown in FIG. 22, a plurality of intake ports 110a may be provided on the rear surface of the motor housing 110 in a plane perpendicular to the direction of the motor axis J. When the electric motor 101 runs and the cooling fan 116 rotates, outside air may be introduced to the inside of the motor housing 110 via the intake ports 110a. The outside air (cooling air) introduced from the intake ports 110a may flow toward the front side in the direction of the motor axis J, which can cool the stator 111 and the rotor 112 etc.

The electric motor 101 may be attached in such a manner that the rear side of the electric motor 101 is tilted (inclined) in the upward and rightward direction along the direction of the motor axis J. As shown in FIG. 23, when the cutting device main body 100 is positioned at the right-angled cutting position in which the cutting blade 102 is placed perpendicular to the upper surface of the table 20, the motor axis J of the electric motor 101 is not parallel to the upper surface of the table 20 but is rather tilted (inclined) with respect to the upper surface of the table 20. By arranging the electric motor 101 in this tilted (inclined) manner, an inclination angle of the cutting device main body 100 in the rightward direction can be configured to be large.

The electric motor 101 may be joined to a backside (right side) of the fixing cover 103 via a gear head 120. The gear head 120 may be configured such that a double reduction gear train is housed in the gear housing 121. The gear housing 121 may be formed integrally with the backside of the fixing cover 103. An output gear 113a may be provided at a tip end of the motor shaft 113 of the electric motor 101. The output gear 113a may engage with a first driven gear 122. The first driven gear 122 may be arranged on a first driven shaft 123. On the left side of the first driven gear 122, a second driven gear 124 may be arranged on the first drive shaft 123. The first driven shaft 123 may be rotatably supported by the gear housing 121 via bearings 123a and 123b.

A second driven gear 124 may be engaged with a third driven gear 125. The third driven gear 125 may be arranged on the second driven shaft 126. The second driven shaft 126 may be rotatably supported by the gear housing 121 via bearings 126a and 126b. The second driven shaft 126 may be parallel to the first driven shaft 123. The third driven gear 125 may engage with a fourth driven gear 127. The fourth driven gear 127 may be arranged on a spindle 130. The spindle 130 may be rotatably supported by a lower portion of the gear housing 121 via bearings 130a and 130b. The spindle 130 may be parallel to the first driven shaft 123 and the second driven shaft 126.

The spindle 130 may protrude inside the fixing cover 103. The cutting blade 102 may also be fixedly attached to the protruding portion of the spindle 130. The cutting blade 102 may be attached to the spindle 130 by fastening a cutting blade fixing screw 134 with its center portion being securely held by an outer flange 131 and an inner flange 132.

Figure 6:
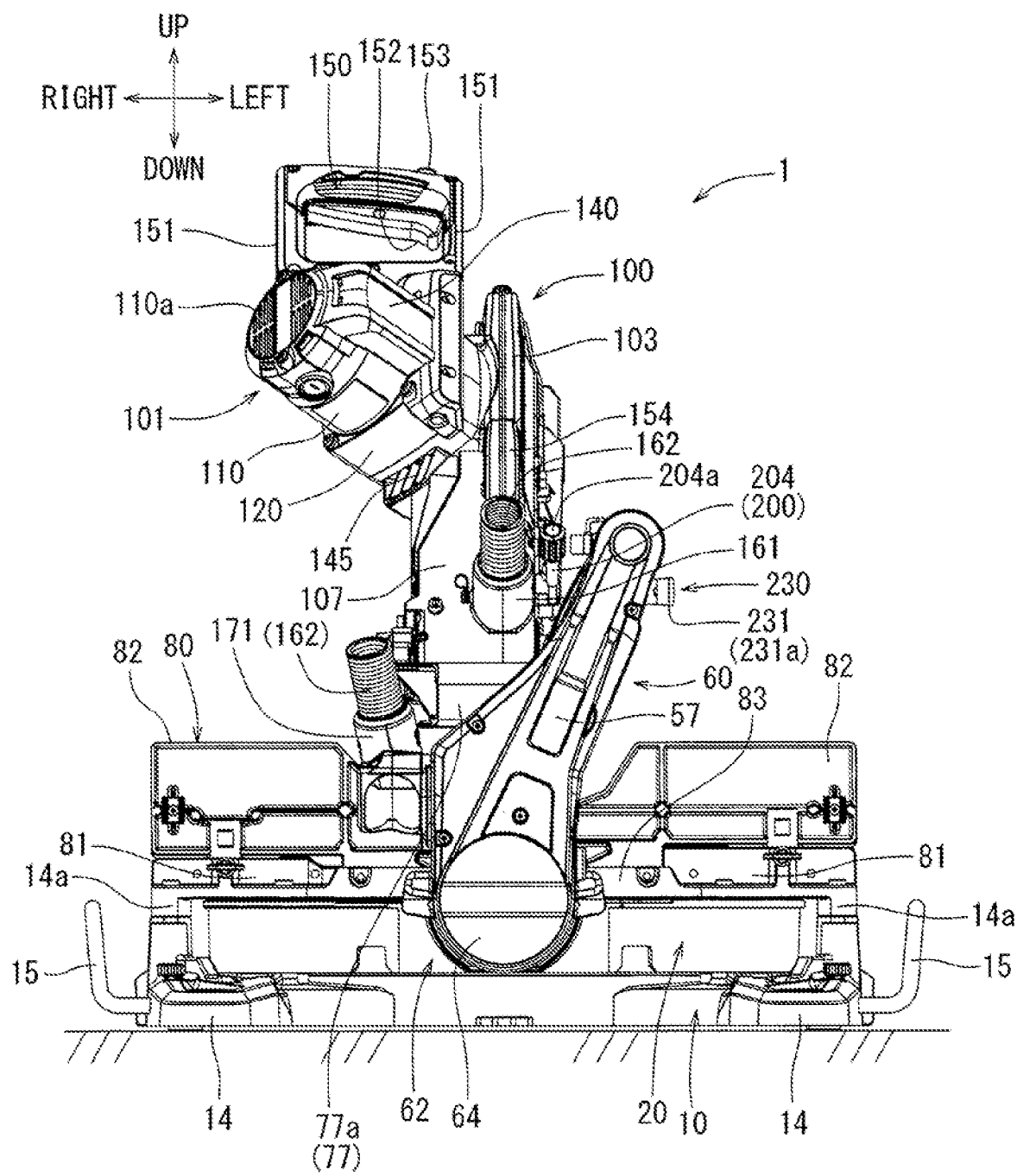
FIG. 6 is an overall view of the tabletop cutting device according to the embodiment, which is viewed from a rear side thereof.

A controller housing portion 140 may be provided at the upper portion of the electric motor 101. A controller 141 for controlling the electric motor 101 may be housed in the controller housing portion 140. The controller 141 may control the electric motor in such a manner that a constant rotation or a so-called soft-start can be performed. The controller 141 may be cooled by a portion of the outside air (motor cooling air) flowing into the motor housing 110 by the rotation of the cooling fan 116, as described earlier. As shown in FIGS. 5, 6 and 22, an exhaust port 145 for exhausting the motor cooling air may be provided on the rear side of the gear head 120.

A handle 150 that the user can hold may be provided on the front side of the electric motor 101 when viewed from the user side. The handle 150, which can be held by the user in a horizontal manner, may be arranged approximately parallel to the left-to-right axis about which the cutting blade 102 rotates (the left-to-right axis of the spindle 130). Both the left and right side of the handle 150 may be joined to the front side of the electric motor 101 via legs 151. A switch lever 152 may be arranged on the rear surface of the handle 150. By pulling the switch lever 152 forward, where the handle 150 is held by the user's hand, the electric motor may run and the cutting blade 102 may rotate. Additionally, a lock-off switch 153 may be provided on the front side of the handle 150. Only when the lock-off switch is pulled out so as to turn the lock off, the switch lever 152 can be pulled by the user.

As shown in FIG. 5, a carrying handle 154 for carrying the tabletop cutting device 1 may be provided on the rear side of fixing cover 103. The carrying handle 154 may straddle an upper rear surface of the fixing cover 103 as well as the rear of the base 107. The carrying handle 154 may be configured to extend approximately horizontally when the cutting device main body 100 is locked at the bottom dead center by a swing lock mechanism 210 that will be discussed infra. When the user configures the tabletop cutting device 1 with the cutting device main body 100 locked at the bottom dead center, the user can easily carry the tabletop cutting device 1 in a well-balanced manner without the cutting device 1 tilting in either the front-to-rear direction or in the left-to-right directions.

[Dust Collection Hose]

As shown in FIGS. 1 and 2, an arrow 103a for indicating the rotation direction of the cutting device 102 is shown on the left side of the fixing cover 103. The cutting blade 102 may rotate in a clockwise direction when viewed from the left side. Because of this rotational configuration of the cutting blade 102, cutting dust produced by the cutting work may be blown up from the upper surface of the workpiece W on the rear side of the fixing cover 103. As shown in FIG. 5, a dust guide 160 for receiving the blown-up dust may be attached to the lower rear portion of the base 107. Furthermore, a main body side connection port 161 for connecting a dust collection hose 162 may be provided on the rear of the carrying handle 154, at the upper rear portion of the base 107. The main body side connection port 161 may have a sleeve shape, and the interior of the main body side connection port 161 may communicate with the dust guide 160 via the interior of the base 107. The dust received by the dust guide 160 may be blown up toward the interior of the main body side connection port 161 via the interior of the base 107. A dust collection hose 162 may be connected to the main body side connection port 161 via the connection member 163. FIG. 5 shows a connection configuration of the dust collection hose 162 and the connection member 163 with respect to the main body side connection port 161.

Figure 26:
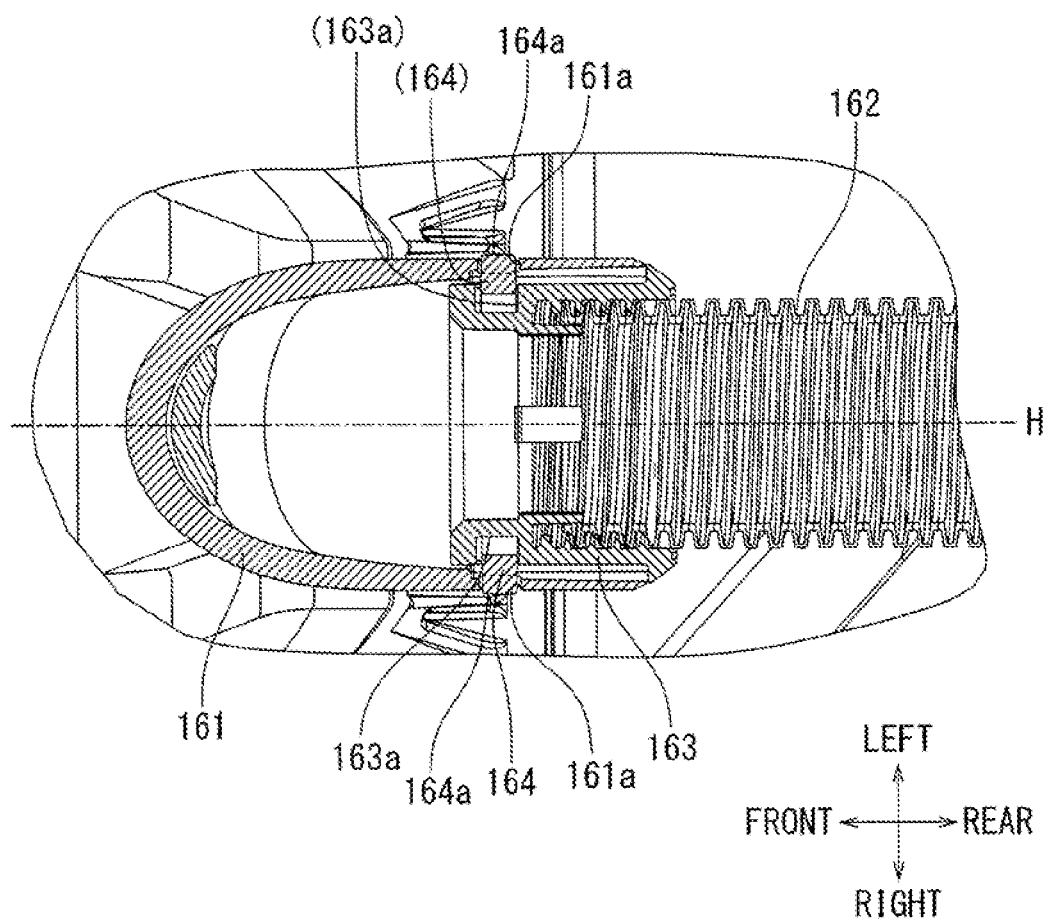
FIG. 26 is a cross-sectional view taken along line (XXVI)-(XXVI) of FIG. 5, showing a cross-sectional view of a dust collection hose connection portion that is connected to a main body side connection port.

The dust collection hose 162 may be a bellows-shaped hose having adequate expandability and flexibility. Furthermore, the dust collection hose 162 may be connected to a relay duct 170 serving as a hose intermediate connection port provided on the right side of the main body supporting portion 60. The dust collection hose 162 may be connected to the main body side connection port 161 and the relay duct 170 via an arrangement path in such a way that, for example, the main body side connection port 161 and the relay duct 170 are angled such that dust collection hose 162 is largely bent in the upward direction as shown in FIG. 5. A length of the dust collection hose 162 between the main body side connection port 161 and the relay duct 170 (the total length of the dust collection hose 162 in the present embodiment) may be configured such that the cutting device main body 100 can be moved over an entire swing range along the up-to-down direction and an entire slide range in the front-to-rear direction. FIG. 26 shows a connection configuration of the dust collection hose 162 with respect to the main body side connection port 161, and FIG. 27 with respect to the relay duct 170. As shown in FIG. 26, a tubular connection member 163 may be attached to an upstream end portion of the dust collection hose 162. The upstream end portion of the dust collection hose 162 may be connected to the inner periphery of the connection member 163. A recess 163a with a predetermined width may be provided along the entire outer radial periphery of a frontward portion of the connection member 163.

A retention member 164 may be attached to the inner periphery of the main body side connection port 161. The retention member 164 may be a resin-made annular-shaped interposition member having elasticity in a radially extension direction. An engagement protrusion 164a may be provided integrally with the retention member 164 at each of a position in which the length of the outer radial periphery of the retention member 164 is halved (i.e. on opposite sides of a circle). Each of the two engagement protrusions 164a may protrude into a corresponding engagement hole 161a that is similarly provided at a corresponding position in which the main body side connection port 161 is halved along its outer radial periphery. Through contact of the two engagement protrusions 164a with the engagement holes 161a, respectively, the retention member 164 can be retained along the inner periphery of the main body side connection port 161 so as not to be offset in a radial direction and/or axial direction relative to axis H.

The annular-shaped retention member 164 that is retained along the inner periphery of the main body side connection port 161 may engage with the recess 163a of the connection member 163, to protrude inward to an extent into the recess, as shown in FIG. 26. Because of this configuration, the dust collection hose 162 may be connected to the main body side connection port 161 so as to be rotatable around the axis H. The connection member 163 can be extracted from the inner periphery of the main body side connection port 161 by pressing the two engagement protrusions 164a deeply into the engagement holes 161a and elastically deforming the retention member 164 in the radially inward contracting direction. In this way, the dust collection hose 162 can be easily extracted from the main body side connection port 161.

Figure 27:
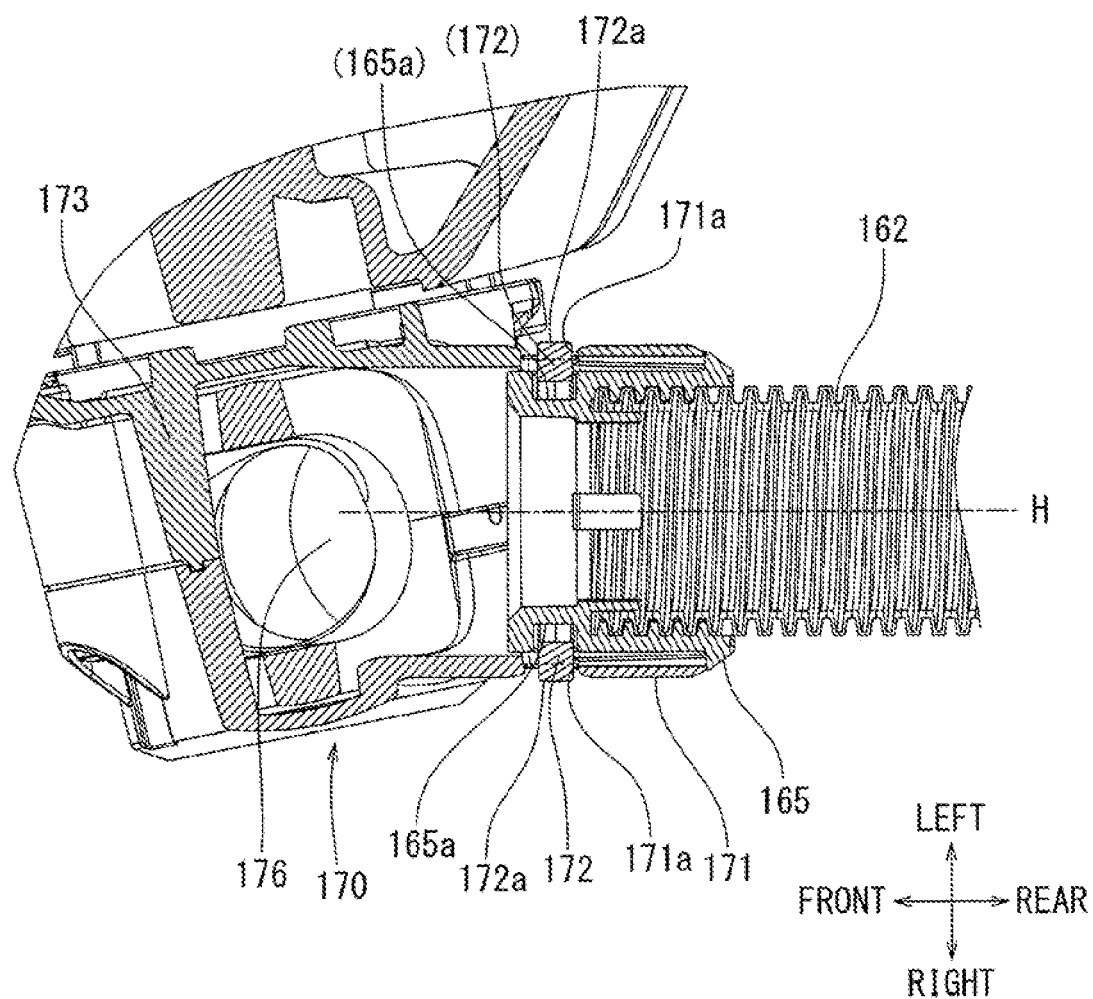
FIG. 27 is a cross-sectional view taken along line (XXVII)-(XXVII) of FIG. 5, showing a cross-sectional view of the dust collection hose connection portion that is connected to a supporting side connection port of a relay duct.

As shown in FIG. 27, a connection member 165 may be attached to a downstream end portion of the dust collection hose 162 in a similar manner. The downstream end portion of the dust collection hose 162 may be connected to a supporting side connection port 171 of the relay duct 170 via a connection member 165. A recess 165a may be provided along the entire radial outer periphery of a frontward portion connection member 165. An annular-shaped retention member 172 may be attached to the inner periphery of the supporting side connection port 171. An engagement protrusion 172a may be formed at each of a position in which the length of the outer periphery of the retention member 172 is halved (i.e. on opposite sides of a circle). Each of the two engagement protrusions 172a may protrude into a corresponding engagement hole 171a that is provided at a corresponding position in which the supporting side connection port 171 is halved along its periphery. Because of this configuration, the retention member 172 can be retained along the inner periphery of the supporting side connection port 171 so as not to be offset in a radial direction and/or axial direction relative to axis H. Accordingly, on the downstream side of the dust collection hose 162 as well as on the upstream side thereof, the dust collection hose 162 may be connected to the supporting side connection port 171 so as to be easily rotatable around the axis H with a small external force.

Figure 28:
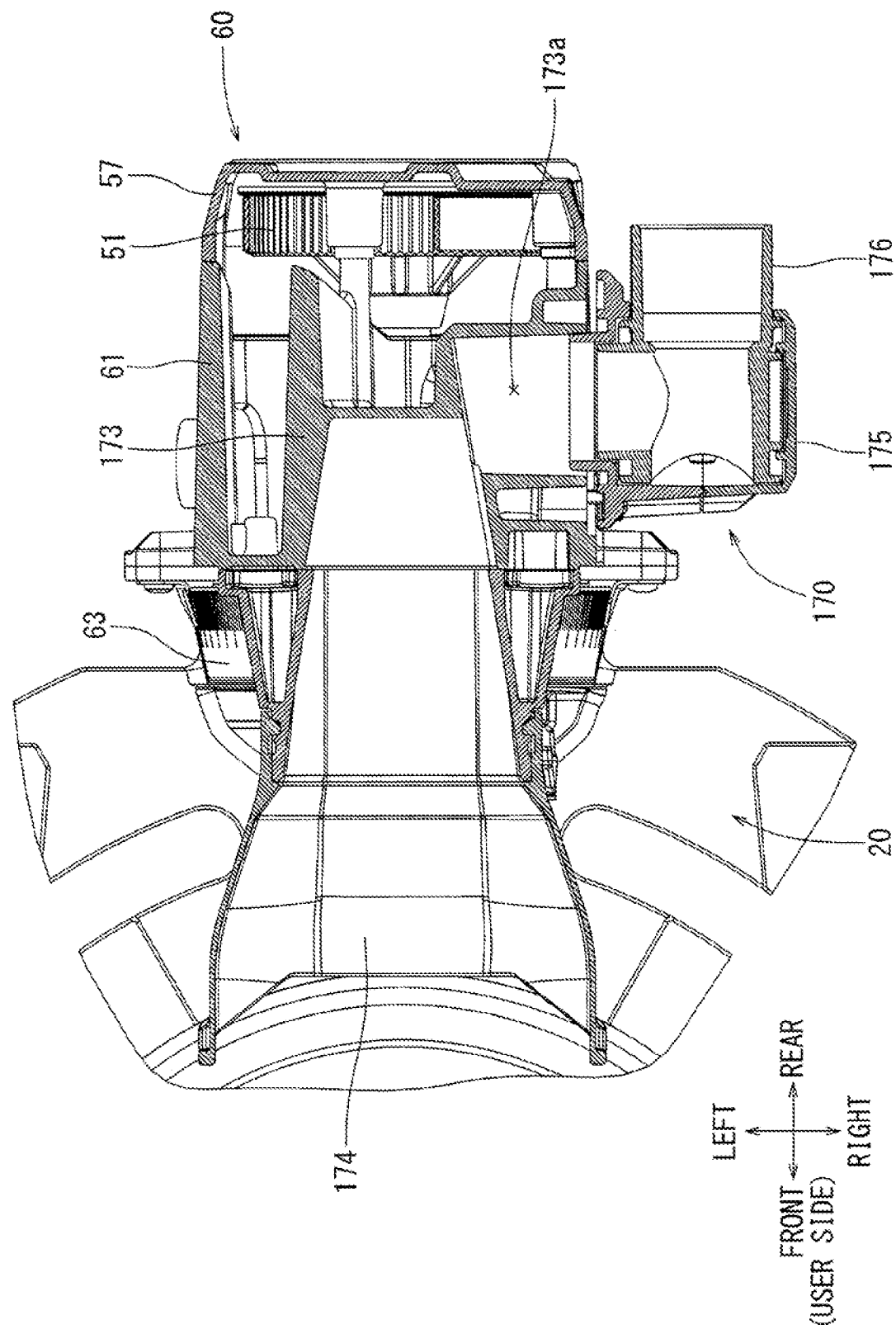
FIG. 28 is a cross-sectional view taken along line (XXVIII)-(XXVIII) of FIG. 5, showing a cross-sectional view of the relay duct.

As shown in FIG. 28, the relay duct 170 may include a base 173 that is formed integrally with the main body supporting arm 61 of the main body supporting portion 60. A large-sized dust collection duct 174 may be attached to the front portion of the base 173. The dust collection duct 174 may face the rear back side of the positioning fence 80. Hence, dust blown up in the rearward direction of the positioning fence 80 may be collected by the dust collection duct 174. An exhaustion nozzle 176 may be connected to the right-side portion of the base 173 via a joint 175. As shown in FIG. 5, the aforementioned supporting side connection port 171 may be provided on the upper side of the base 173, being slightly tilted (inclined) in the rearward direction.

As shown in FIG. 28, the dust collection duct 174 and the supporting side connection port 171 may communicate with the exhaustion nozzle 176 via an inner path 173*a* of the base 173. The exhaustion nozzle 176 may be supported so as to be rotatable in the up-to-down direction about the joint 175. Another hose, which is separately prepared in order to use a dust collector, may be connected to the exhaustion nozzle 176.

As discussed above, the upstream side (front side) of the dust collection hose 162 may be connected to the main body side connection port 161 so as to be rotatable about the axis H thereof, and also the downstream side (rear side) may be connected to the supporting side connection portion 171 so as to be rotatable about the axis H thereof. According to this connection configuration, for example, even when the cutting device main body 100 is swung in the up-to-down direction or slid in the front-to-rear direction to cause the arrangement of the dust collection hose 162 to be changed, both the upstream end portion and the downstream portion of the dust collection hose 162 may be rotated around the axis H accordingly and thus any accumulated unnatural bending or torsion due to positional changes of the cutting device main body 100, which may cause a cross-section of the dust collection hose 162 to be reduced, may not occur in the intermediate path thereof. Because of this configuration, where hose 162 is always rotatable at both ends, a smooth arrangement path of the dust collection hose 162 may be retained and thus an original cross-section thereof can be retained along the entire length of the dust collection hose 162. Thus, high efficiency of collecting the dust can be reliably obtained.

In contrast, in prior art such as, for example, Japanese Laid-Open Patent Publication No. H06-210605, an end portion of the dust collection hose is connected to the connection port in a manner to be non-rotatably fixed around its axis. Because of this configuration, when an arrangement path is changed, unnatural bending or torsion can occur in the arrangement path, which causes a collection path of the dust collection hose having a sufficiently large cross-section might not be obtained. According to the above-discussed connection configuration (rotation connection configuration) of the dust collection hose 162, this problem can be resolved. Furthermore, in the present embodiment, when the tabletop cutting device 1 is placed and retained against a wall in such a manner that the dust collection hose 162 might be interfered with the wall surface, both ends of the dust collection hose 162 can be rotated around the axis H and the arrangement path thereof can be smoothly moved along the wall surface. Because of this configuration, deformation or damage of the dust collection hose 162 can be prevented and durability thereof can be improved.

Instead of retention members 164, 172, a rolling bearing such as a ball bearing or a needle bearing may be used such that the upstream and downstream side portions of the dust collection hose 162 can be configured to rotate around the axis H. Furthermore, it may be possible to remove the main body side connection port 161 and to attach a dust bag or a dust box to the removed tubular port 161, instead of the dust collection hose 162, where port 161 can then be reattached to the device.

[Housing Configuration of an Auxiliary Fence 82]

The positioning fence 80 for positioning the workpiece W on the surface of the table 20 may be provided on the upper surface side of the table 20. A front surface of the positioning fence 80 (positioning surface 80*a*) may be located so as to include a rotation center of the table 20 (axis of the rotation shaft 21). By bringing the rear surface of the workpiece W into contact with the positioning surface 80*a* of the front surface of the positioning fence 80 and positioning said workpiece W in the left-to-right direction, an adequate position for cutting on the upper surface of the table 20 (in the surface direction of the table 20) can be obtained.

The positioning fence 80 may be provided with an up-to-down double stage configuration that includes a pair of base portions 81 and a pair of corresponding auxiliary fences 82 connected to the base portions 81, with regard to the cutting blade 102. The pair of base portions 81 may be formed integrally on the side of their rear surface via a semi-circular shaped connection member 83. The left and right side portions of the base 10 may extend from the lower surface of the table 20 in the leftward and rightward direction. The left and right extension portions 14 may each be provided with a seat portion 14*a* that rises in the upward direction, respectively. The base portions 81 may be supported along the upper surface of the table 20 straddling the left seat portion 14*a* as well as the right set portion 14*a*. FIG. 7 shows a state where the positioning fence 80 is removed. Two auxiliary seat portions 14*a* may be provided on the surface of the base 10. FIG. 7 shows the two auxiliary seat portions 14*b* that are located along arc-shaped insertion recesses 24 provided in the table 20. The base portions 81 may also be supported along the upper surface of the table 20 also by a supporting column (not shown) that is attached to the auxiliary seat portions 14*b*.

Figure 29:
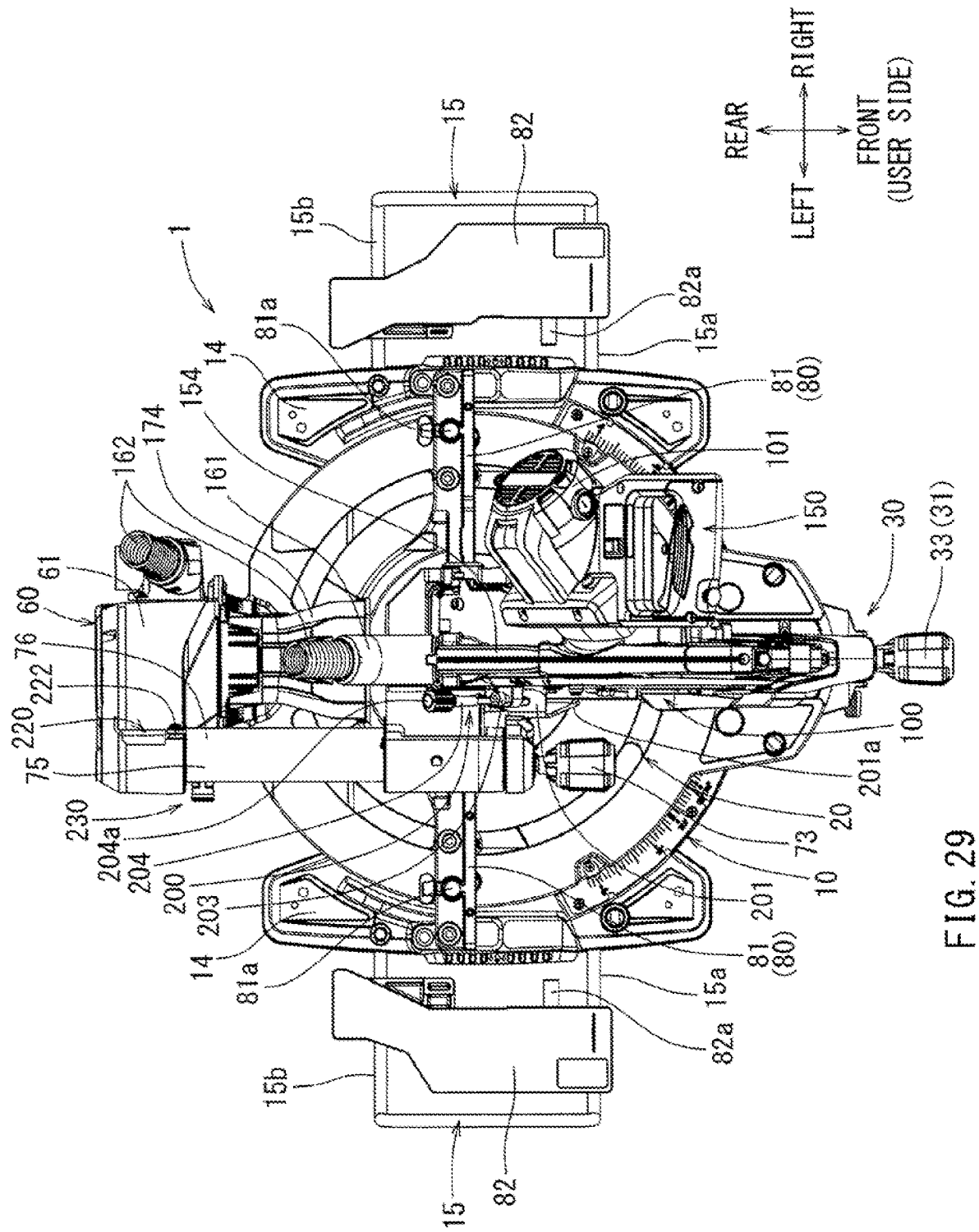
FIG. 29 is an overall plan view of the tabletop cutting device, showing a state in which auxiliary fences are received by holder fittings.

The auxiliary fences 82 may be supported flush with the upper side of the base portions 81 (so as to precisely form the front positioning surface 80*a* of the positioning fence 80). Attaching the auxiliary fences 82 to the upper side of the left-to-right base portions 81 increases the height of the positioning surface 80*a*, where a workpiece W having a large height can still be precisely positioned, and furthermore enables cutting work to be made in a manner such that the workpiece W is obliquely placed between the upper surface of the table 20 and the positioning surface 80*a*. The left and right auxiliary fences 82 can be removed from the base portions 81, respectively. When the auxiliary fences 82 are removed, the cutting device main body 100 can be tilted (inclined) in the left-to-right direction at a larger angle than possible without such removal. FIG. 29 shows that the left and right auxiliary fences 82 are removed from the base portions 81. As shown in FIG. 29, the left and right auxiliary fences 82 that are removed from the base portions 81 may be placed (housed) on holder metal fittings 15. The left and right holder metal fittings 15 may comprise frame-like members that are formed by bending a bar steel to have an upside-down U shape. As shown in FIG. 8, the holder metals 15 may be supported by the extensions 14 of the base 10 so as to be slid in the left-to-right direction. FIG. 8 shows a state where the left and right holder metals 15 are received. As shown in FIG. 29, by pulling the left and right holder metals 15 outward in the left-to-right directions, respectively, the auxiliary fences 82 can be placed (housed) on the upper surface side of the holder metals 15.

Figure 30:
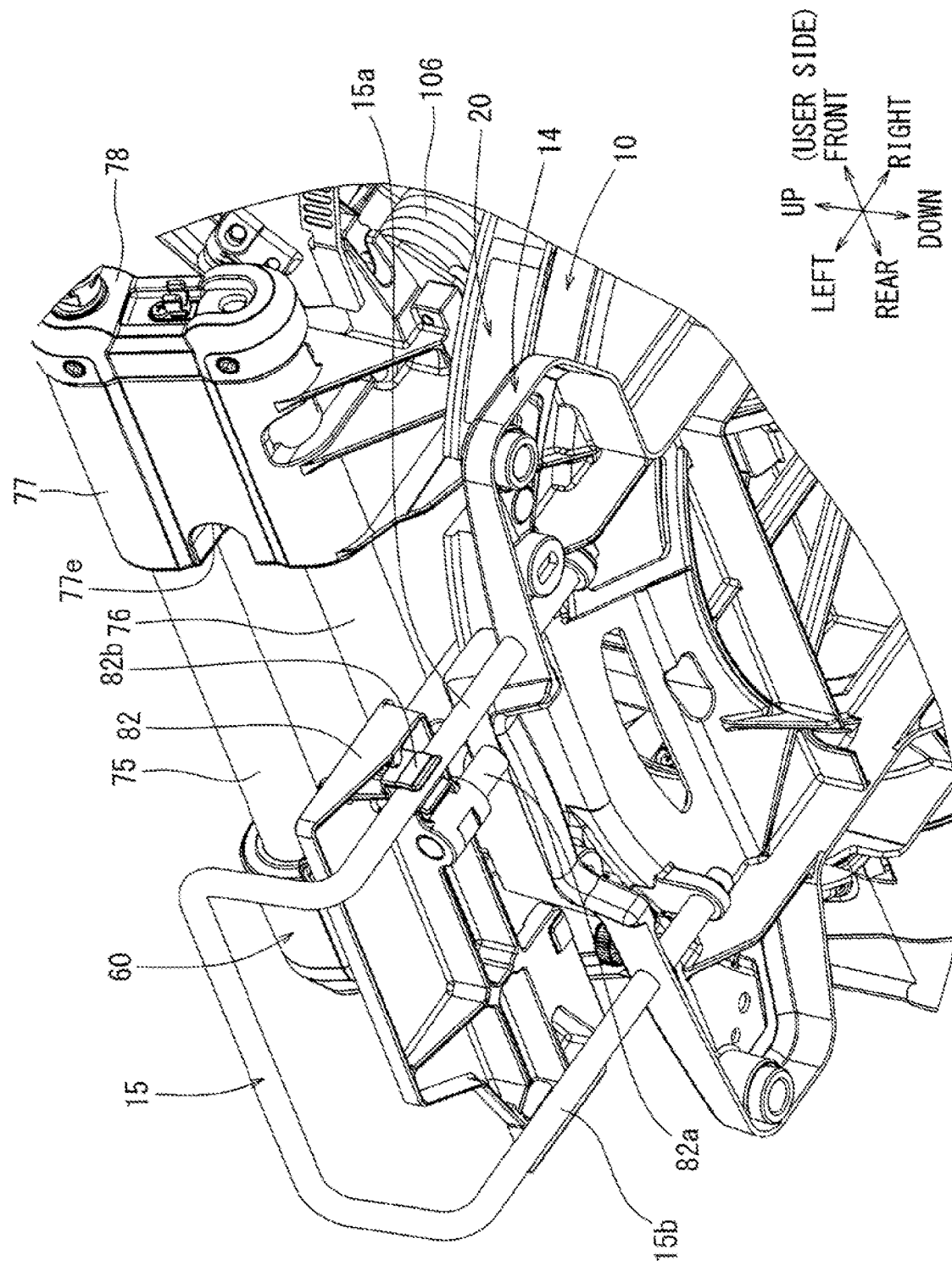
FIG. 30 is a perspective view of the auxiliary fence received by the holder fitting, which is obliquely viewed from below thereof.
Figure 31:
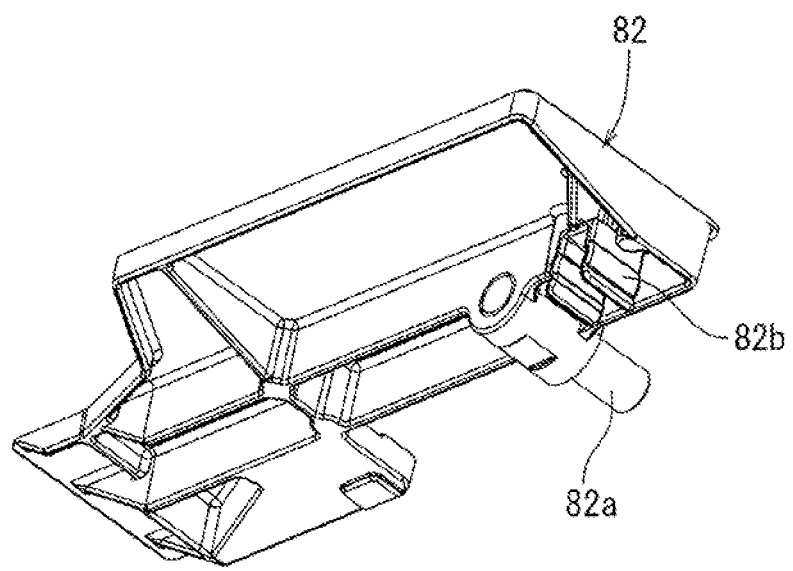
FIG. 31 is a perspective view of the auxiliary fence received by the holder fitting.

As shown in FIG. 31, the auxiliary fence 82 may include a positioning pin 82*a* and a grip 82*b*. The positioning pin 82*a* may be inserted into a positioning hole 81*a* that is provided in the base portion 81 in order to place the auxiliary fence 82 flush with the base portion 81 in the front-to-rear direction. When the auxiliary fence 82 is removed from the base portion 81 and housed (placed) in the holder metal 15, the grip 82*b* may be used. As shown in FIG. 30, by elastically clasping the grip 82*b* on a cylindrical rail of the holder metal 15, the auxiliary fence 82 may be retained in the holder metal 15. FIG. 30 shows a state where the auxiliary fence 82 is housed by clasping the grip 82*b* on a front-side supporting cylindrical rail of the holder metal 15. However, if the auxiliary fence 82 is placed in an inverted state in the front-to-rear direction, then it may be housed by retaining the grip 82*b* on a rear-side cylindrical rail of the holder metal 15.

In prior art such as, for example, Japanese Laid-Open Patent Publication No. 2010-280013, it is not considered where to house the removed auxiliary fence in this type of tabletop cutting device. Because of this circumstance, it will take some time to retrieve the removed auxiliary fence, or if the removed auxiliary fence is lost, the workpiece W may have to be positioned under a positioning surface having a low height. As a result, cutting accuracy may be substantially decreased and operability may be impaired. In contrast, however, according to the above-discussed housing configurations of the auxiliary fences of the present embodiment, the auxiliary fences 82 can be housed in the left and right holder metals 15 of the base 10. Thus, it may not be necessary to waste operating time to find the auxiliary fences 82, or there is no fear that the auxiliary fences 82 may be lost. Because of this, operability and ease of use is enhanced.

Figure 32:
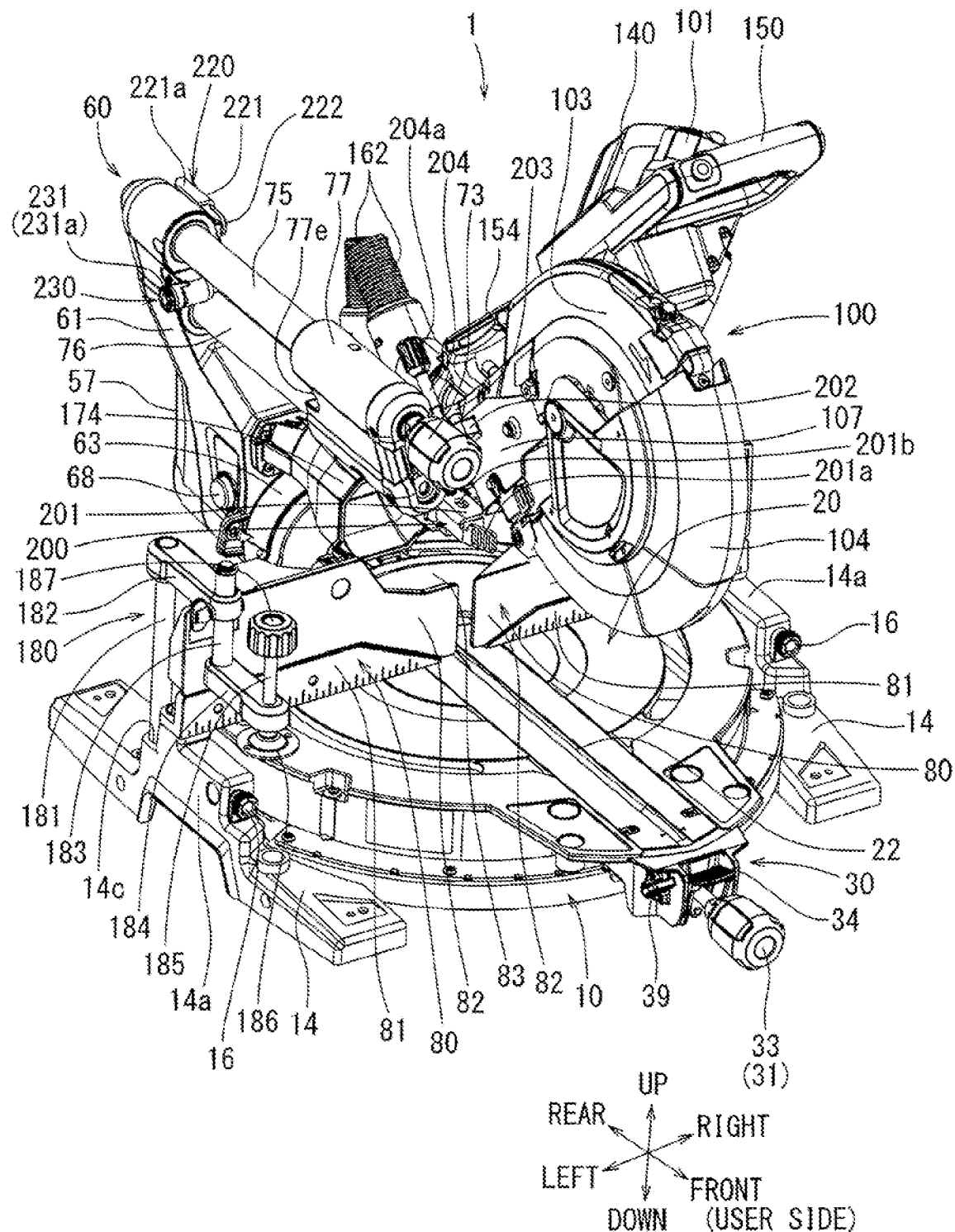
FIG. 32 is an overall perspective view of the tabletop cutting device, which is obliquely viewed from a forward left. This figure shows a state in which a vertical vise is attached to the cutting device.

As shown in FIG. 32, a vertical vise 180 for fixing the workpiece W may be attached to the left and right extension portions 14 of the base 10. The workpiece W may be pressed down toward the upper surface of the table 20 from above by the vertical vise 180 and the workpiece W may be held in the up-to-down direction thereof so as to be fixed to the table 20. The vertical vise 180 may include a first support pole 181, a first arm 182 that is joined to an upper portion of the first support pole 181, a second support pole 183 that is supported by a tip end of the first arm 182, a second arm 184 that is joined to a lower portion of the second support pole 183, and a screw shaft 185 that is supported by a tip end of the second arm 184. The first support pole 181 may be inserted into a supporting hole 14*c* that is provided on the rear side of the seat portion 14*a* so as to be inserted and extracted without rattling. The first support pole 181 may be fastened by a fixing screw (not shown in FIG. 32) that is provided at the rear of the seat portion 14*a* into the supporting hole 14*c* so as to be fixed in the inserted state of the first support pole 181. The first arm 182 may be supported so as to be rotatable in the left-to-right direction about the first support pole 181. The second support pole 183 may be supported by a tip end portion of the rotatable first arm 182 so as to be adjustable in the up-to-down direction along the vertical length of said second support pole 183. The second arm 184 may be supported so as to be rotatable in the left-to-right direction about the second support pole 183. The screw shaft 185 may be fastened to a tip end side of the rotatable second arm 184. Furthermore, a knob 187 that the user holds when pressing the workpiece W downward may be provided at an upper end portion of the screw shaft 185. A circular pressing plate 186 that is pressed to the upper surface of the workpiece W may be supported at a lower end portion of the screw shaft 185.

When the screw shaft 185 is rotated in the fastening direction while the pressing plate 186 contacts the upper surface of the workpiece W that is placed on the table 20, the pressing plate 185 may press the upper surface of the workpiece W by the screw force and the workpiece W may subsequently be firmly affixed downward onto the upper surface of table 20. FIG. 32 shows a state where the left and right auxiliary fences 82 are supported on the upper surface side of the base portions 81 and a positioning surface 80*a* with substantial height may be created. The vertical vise 180 may be supported straddling behind the positioning fence 80 as well as in front of the positioning fence 80. In this embodiment, the vertical vise 180 is supported using the supporting hole 14*c* of the seat portion 14*a*. Instead, the vertical vise 180 may also be supported using the removed auxiliary fence 82 that is housed in the seat portion 14*a*, which will be discussed below.

Figure 33:
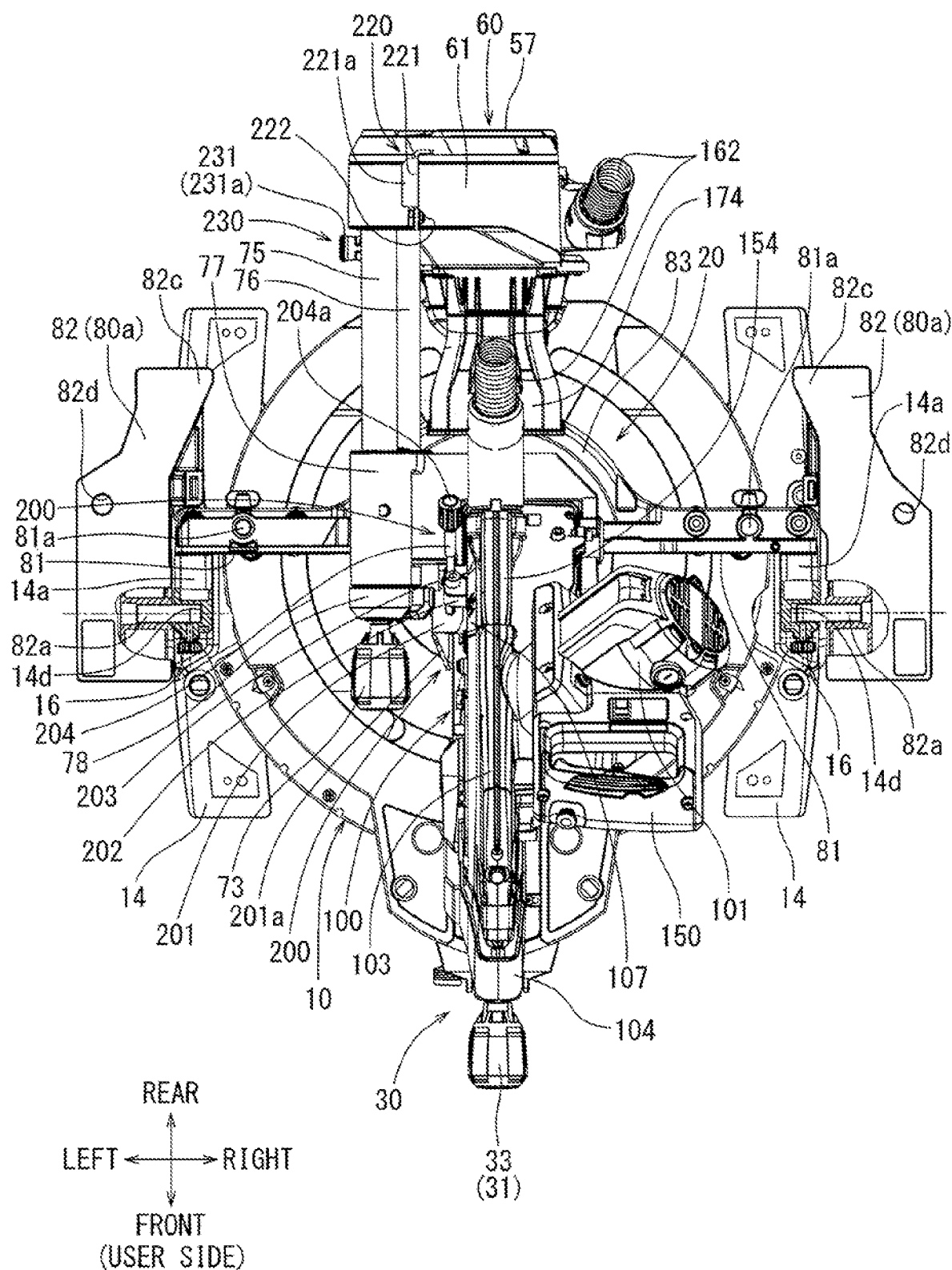
FIG. 33 is a modification of the embodiment shown in FIGS. 29 to 32. This figure shows a state in which the auxiliary fences are retained in flush with a seat portion of the base.

As shown in FIG. 33, the auxiliary fence 82 that is removed from the base portion 81 may be retained on the seat portion 14*a* so as to extend in the left- and right direction of the seat portion 14*a* by insertion of the positioning pin 82*a* of the auxiliary fence 82 into a retaining hole 14*d* that is provided at the lateral portion of the seat portion 14*a*. The insertion state of the positioning pin 82*a* with respect to the retaining hole 14*d* may be locked by fastening a fixing screw 16. A rear portion 82*c* of the auxiliary fence 82 can be retainably placed on the upper surface of extension portion 14. In this way, the positioning surface 80*a* of the auxiliary fence 82 may be retainably placed downwardly flush with the upper surface of the table 20. Because of this configuration, a workpiece W having a wide length in the left-to-right direction may be placed on the table 20, and eventually a cutting work of such a workpiece W can be precisely performed.

Figure 34:
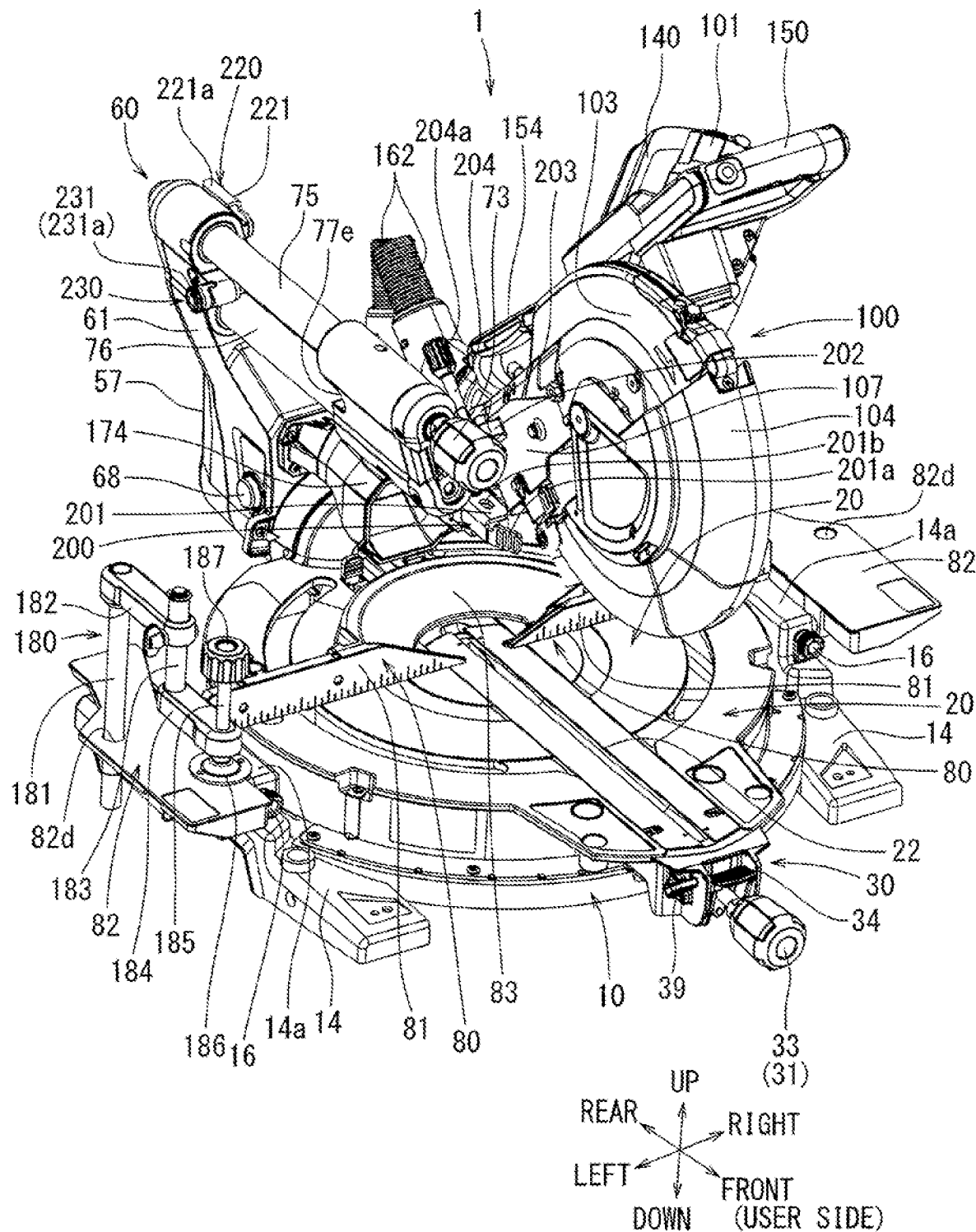
FIG. 34 is an overall perspective view of the tabletop cutting device, showing that the vertical vise is supported by the auxiliary fence that is retained in flush with the seat portion of the base.

Furthermore, as shown in FIG. 34, the vertical vise 180 may also further be supported using the auxiliary fence 82 that is retained as discussed above. FIG. 34 shows that the vertical vise 180 is supported only on the left side, but it may also be supported on the right side using the auxiliary fence 82 retained on the right-side seat portion 14*a* in the same manner as described infra. The auxiliary fence 82 may be provided with a supporting hole 82*d*. The vertical vise 180 may be supported by inserting the first support post 181 of the vertical vise 180 into the supporting hole 82*d*. Though this is not shown in FIG. 34, a fixing screw may be provided at the immediate rear of the supporting hole 82*d*. By fastening the fixing screw in the front-to-rear direction, the first support post 181 may be fixedly be inserted into the supporting hole 82*d*. By supporting the vertical vise 180 using the supporting hole 82*d* of the auxiliary fence 82, the vertical vise 180 may be retained in a position to be offset in the leftward direction or in the rightward direction with regard to the seat portion 14*a*. Because of this configuration, the workpiece W having a large length in the left-to-right direction can still be firmly fixed downward onto the upper surface of table 20.

[Lower Limit Position Changeover Mechanism 200]

The tabletop cutting device 1 according to the present embodiment may be provided with a lower limit position change mechanism 200, a swing lock mechanism 210, a slide intermediate stopper mechanism 220, and a slide rear end position lock mechanism 230. The lower limit position change mechanism 200 may be a mechanism for changing a lower limit position of the cutting device main body 100 within its swing range in the up-to-down direction. This mechanism 200 may include a function of adjusting or changing a cutting depth of the cutting blade 102 with respect to the workpiece W. As shown in FIGS. 22, 29, 32, and 35, a stopper receiving base (a reference number is not applied) may be formed integrally with the main body slider 77 at the lower portion thereof. A stopper plate 201 may be provided so as to be displaceable in the left-to-right direction on the upper surface of the stopper receiving base. The stopper plate 201 may be provided with a knob 201a. The user may pinch the knob 201a and move it in the left-to-right direction (horizontally) between a right-side first position and a left-side second position. When the stopper plate 201 is positioned at the right-side first position, a long-hole shaped relief hole 201b that is provided in the stopper plate 201 and an insertion hole (not shown in the figures) that is provided in the stopper receiving base passing through the base may align with each other in the up-to-down direction (vertically). On the other hand, when the stopper plate 201 is positioned at the left-side second position, the relief hole 201b may be disposed offset in the leftward direction with respect to the insertion hole of the stopper receiving base. As a result, the insertion hole of the stopper receiving base may be blocked by the stopper plate 201.

Figure 35:
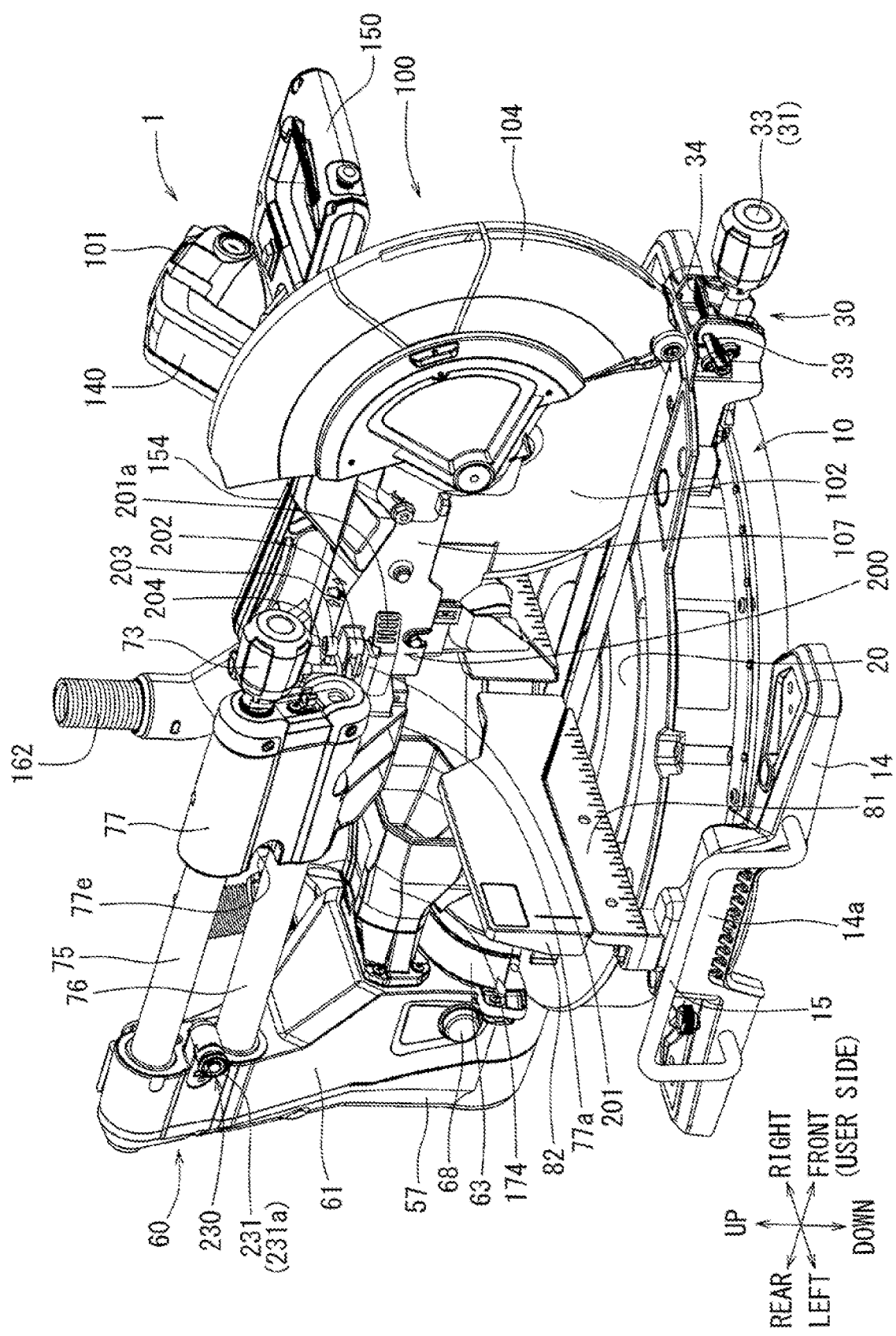
FIG. 35 is an overall perspective view of the tabletop cutting device, showing a state in which the cutting device main body is moved to the lower moving end position.

As shown in FIG. 35, a stopper supporting portion 202 may be formed integrally with the base 107 on the left side portion of the base 107 of the cutting device main body 100 in the lateral direction (in the leftward direction). A front-side stopper screw 203 and a rear-side stopper screw 204 may be fastened to the stopper supporting portion 202. A knob 204a that the user operates when fastening may be provided at the upper portion of the rear-side second stopper screw 204. The lower portions of the stopper screws 203, 204 may protrude in the downward direction from the lower surface of the stopper supporting portion 202. The rear-side stopper screw 204 may protrude farther downward vertically than the front-side stopper screw 203 from the lower surface of the stopper supporting portion 202. By rotating the stopper screw 203, 204, respectively, a protruding length thereof from the lower surface of the stopper supporting portion 202 may be adjusted. When the cutting device main body 100 is moved in the downward direction as shown in FIG. 35, the rear-side second stopper screw 204 may enter into the aforementioned relief hole 201b and the insertion hole when they are vertically aligned with each other to be released (idle movement) in a state where the stopper plate 201 is positioned at the right-side first position. In this case, the front-side first stopper screw 203 abuts against the stopper plate 201 and the lower limit position of the cutting device main body 100 is restricted in this manner.

Though not shown in the figures, when the cutting device main body 100 is moved in the downward direction in a state when the stopper plate 201 is moved to the left-side second position, the relief hole 201b may be disposed offset in the leftward direction with respect to the insertion hole and thus the rear-side second stopper screw 204 that extends longer than the first stopper screw 203 in the downward direction abuts against the stopper plate 201 and cannot protrude further downward, which restricts the lower limit position of the cutting device main body 100. According to the above-discussed lower limit position change mechanism 200, by changing between a first state where the stopper plate 201 is positioned to the right-side first position to overlap the relief hole 201b with the insertion hole and a second state where the stopper plate 201 is positioned to the left-side second position offset from the relief hole 201b with respect to the insertion hole, a state where the first stopper screw 203 abuts against the stopper plate 201 and a state where the second stopper screw 204 abuts against the stopper plate 201 can be selected. As a result, the lower limit position of the cutting device main body 100 may be changed at the two positions in the up-to-down direction. The lower limit position of the cutting device main body 100 that is restricted by the first stopper screw 203 in a first state may be configured to be the lowest possible position that is set according to a positional relationship between the cutting blade 102 and the cutting edge plate 22. When the second state lower limit position that is restricted by the second stopper screw 204, which may be disposed at a position relatively higher than the position restricted by the first stopper screw 203, for example, a groove cutting may be rapidly performed. These two lower limit positions in the up-to-down direction can be separately adjusted by rotating the first stopper screw 203 and the second stopper screw 204 and adjusting fastening amounts with respect to the stopper supporting portion 202, respectively.

[Swing Lock Mechanism 210]

Figure 36:
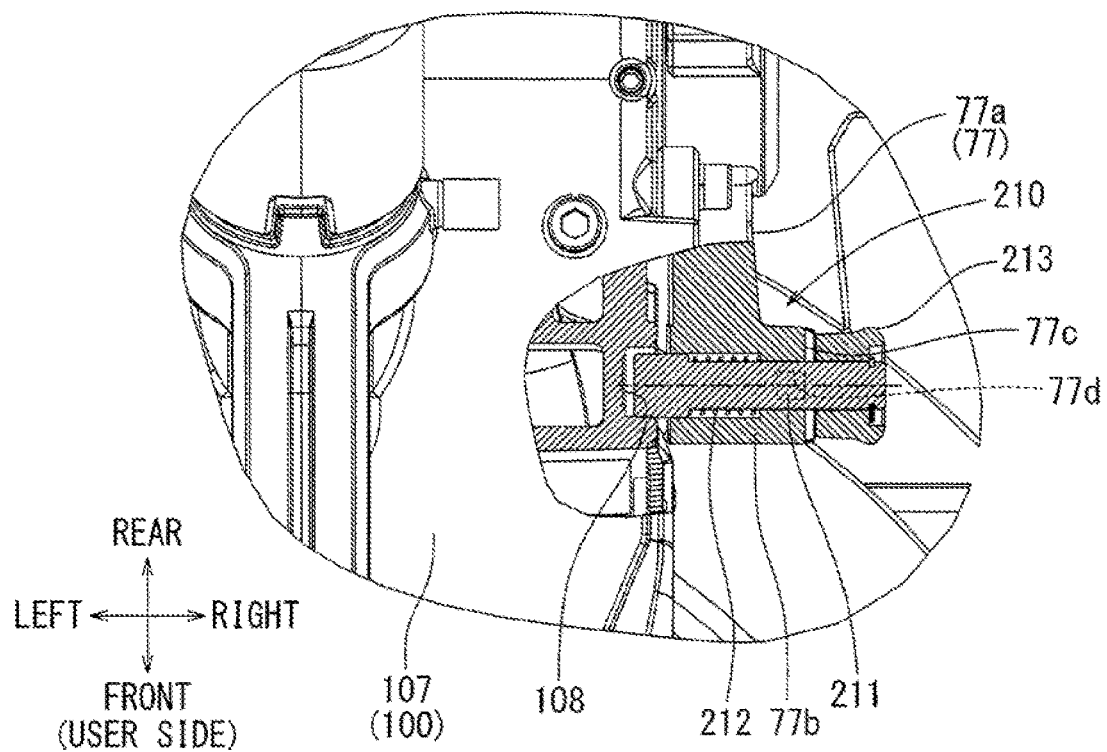
FIG. 36 is a cross-sectional view of a swing lock mechanism, showing a locked state.
Figure 37:
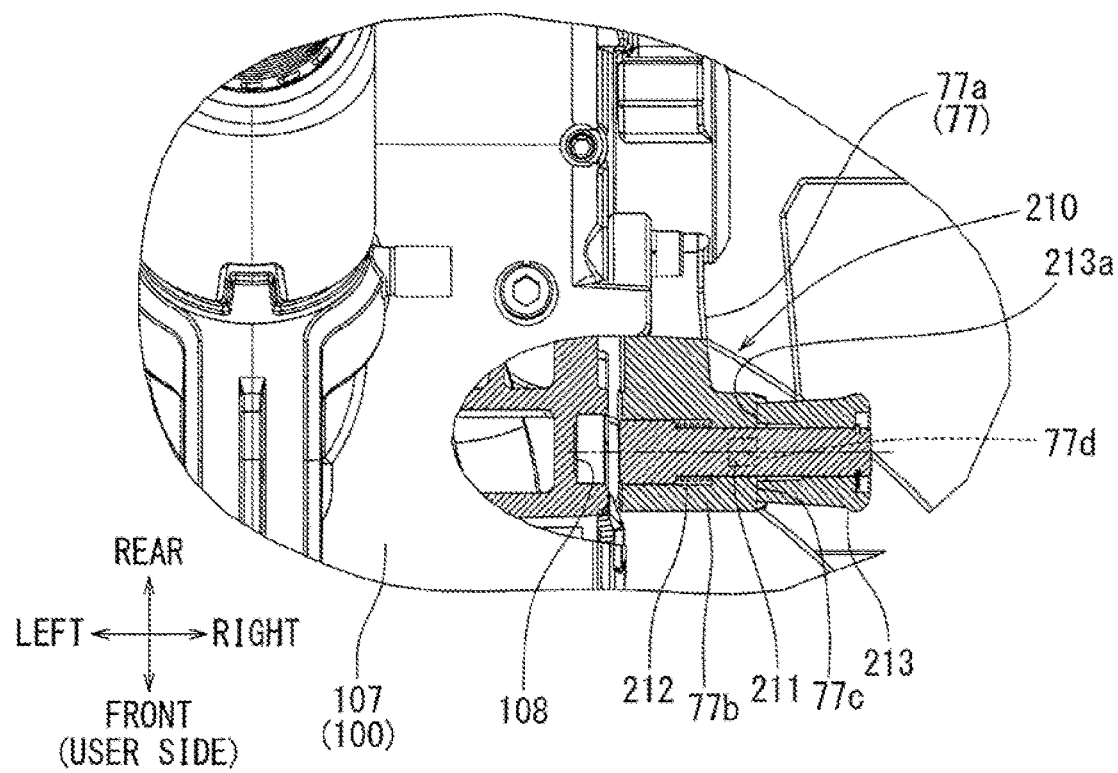
FIG. 37 is a cross-sectional view of the swing lock mechanism, showing an unlocked state.

The lower limit position of the cutting device main body 100 may be restricted by the swing lock mechanism 210 as well as the above discussed first stopper screw 203 and second stopper screw 204. By the swing lock mechanism 210, the cutting device main body 100 can be restricted to a locked position after the cutting device main body 100 is swung in the downward direction as shown in FIG. 35. FIGS. 36 and 37 show a detail of the swing lock mechanism 210. The swing lock mechanism 210 may be provided on the main body supporting portion 77a of the main body slider 77. A supporting tube 77b may be provided on the right side tip end of the main body supporting portion 77a. A lock pin 211 may be provided inside the inner peripheral circumferential surface of the supporting tube 77b so as to be rotatable about its longitudinal axis and displaceable in the left-to-right direction. The lock pin 211 may be biased to move in the leftward direction (lock side) by a compression spring 212 that is interposed between the supporting tube 77b and the lock pin 211. A knob 213 that the user pinches when operating may be attached to a right tip end (head portion) of the lock pin 211. An engagement protrusion 213a may be provided on a left end portion of the knob 213 along an axial direction.

A shallow groove 77c and a deep groove 77d that are orthogonally crossed to each other may be provided on the right end portion of the supporting tube 77b. When the knob 213 is rotated and the engagement protrusion 213a is inserted into the shallow engagement groove 77c as shown in FIG. 37, the lock pin 211 may be displaced in the rightward direction and retained at an unlock position. When the knob 213 is rotated by approximately 90° from the unlock position and the engagement protrusion 213a is inserted into the deep groove 77d, the lock pin 211 can be displaced to the left-side lock position.

Figure 38:
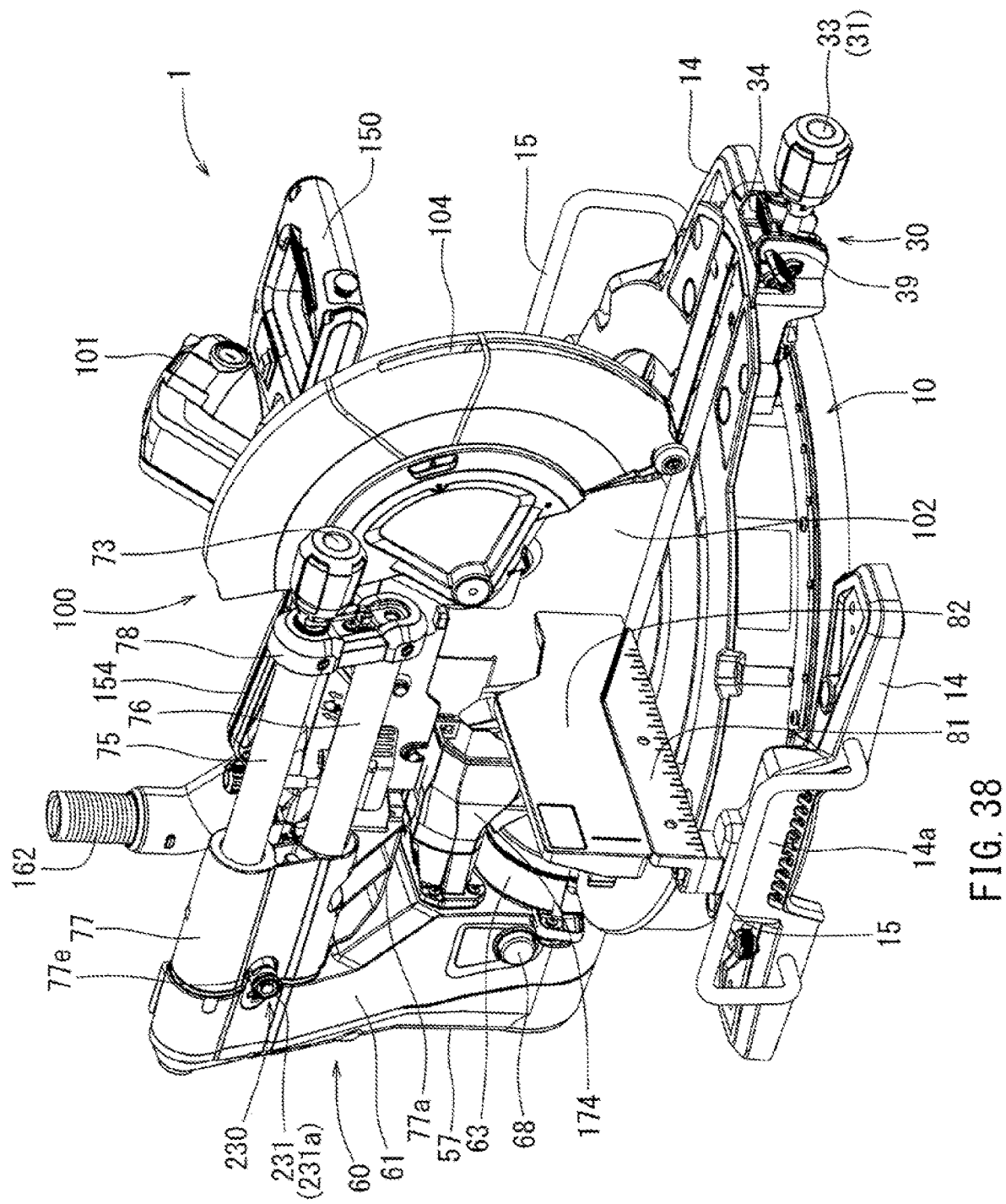
FIG. 38 is an overall perspective view of the tabletop cutting device, showing that the cutting device main body that is swung to the lower moving end position is slid to a slide retreat end position.

A lock hole 108 may be provided on the right side of the base 107 of the cutting device main body 100. The lock hole 108 is also shown in FIG. 5. When the cutting device main body 100 is swung in the downward lock position and the lock pin 211 is displaced to the leftward lock position, the tip end of the lock pin 211 may be inserted into the lock hole 108. By inserting the lock pin 211 into the lock hole 108, the cutting device main body 100 may be locked to the downward lock position. As discussed earlier, in a state where the cutting device main body 100 is locked in the lock position, the carrying handle 154 may be approximately horizontally positioned. By locking the cutting device main body 100 to the downward lock position by use of the swing lock mechanism 210 as shown in FIG. 38 and by also locking the cutting device main body 100 to a slide rear end position by use of the slide rear end position lock mechanism 230, which is discussed infra, the user can hold the carrying handle 154 and easily carry the tabletop cutting device 1 in a well-balanced manner.

[Slide Intermediate Stopper Mechanism 220]

As shown in FIGS. 3, 5, 32 to 34, the slide intermediate stopper mechanism 220 may be provided on the upper right side of the main body supporting portion 60. The slide intermediate stopper mechanism 220 may be configured such that a stopper plate 221 may be supported so as to be rotatable in the up-to-down direction via a support shaft 222. Furthermore, the stopper plate 221 may be bent at the upper periphery to form a stopper portion 221a which extends in the leftward direction as shown in, for example, FIG. 32. By rotating the stopper plate 221 around a support shaft 222 in the forward direction as indicated by the void arrow of FIG. 5 from a retracted position (as shown in the figures), in which the stopper plate 221 is initially disposed along the right side portion of the main body supporting portion 60, the stopper plate 221 may then be displaced post-rotation to a stopper position (not shown in the figures) in which the stopper plate 221 extends in the forward direction along a lateral side (right side) of the upper slide bar 75. When the stopper plate 221 is displaced to said stopper position, the stopper portion 221a may be positioned in (entered) the front-to-rear moving path of the main body slider 77. Because of this configuration, when the cutting device main body 100 is slid in the rearward direction, in a state where the stopper plate 221 is already present in the stopper position, then a rear end surface of the main body slider 77 may contact and abut the stopper portion 221a, thus inhibiting a further rearward slide movement of the cutting device main body 100.

In contrast, when the stopper plate 221 is positioned in the retracted position, the main body slider 77 can slide to a position where the rear end surface of the main body slider 77 contacts the front surface of the main body supporting portion 60 (entire slide range). When the stopper plate 221 is displaced to the front-side stopper position, however, a maximal rear end position of the main body slider 77 within a slidable range is cut short by the length of the stopper portion 221a (that is, the slidable range of the main body slider 77 may be shortened by a length of the stopper portion 221a). Because of this configuration, by restricting the slide rearward (retracted) end position of the main body slider 77 by use of the slide intermediate stopper mechanism 220, for example, when the workpiece W such as a so-called crown-shaped molding material is obliquely leaned to the positioning fence 80 to perform a cutting work, a slide movement of the cutting device main body 100 can be restricted before the members, such as the outer flange 131, the inner flange 132, and the head of the cutting blade fixing screw 134 by which the cutting blade 102 is attached, interfere with the workpiece W. As a result, damage to the workpiece itself can be prevented.

[Slide Rear End Position Lock Mechanism 230]

The cutting device main body 100 can be locked at a rearward (retracted) end position (slide rear end position) of the entire slide range by use of the slide rear end position lock mechanism 230. The slide rear end position lock mechanism 230 may be provided on the upper left side of the main body supporting portion 60. The slide rear end position lock mechanism 230 may be provided with a lock pin 231 with a knob 231a that is spring-biased toward a lock direction, which is similar to the above-discussed swing lock mechanism 210. A relief recess 77e for receiving the slide rear end position lock mechanism 230 may be provided on the upper left side of the main body slider 77. As shown in FIG. 2, a lock hole 77f may be provided at the bottom of the relief recess 77e. As shown in FIG. 38, by sliding the main body slider 77 to the slide rear end position and inserting the lock pin 231 into the lock hole 77f, the main body slider 77 and eventually the cutting device main body 100 may be locked to the slide rear end position. (FIG. 38 shows a state where the cutting device main body 100 is locked to the downward lock position by the above-discussed swing lock mechanism 210.) By pinching the knob 231 and rotating the lock pin 231 90° to move the lock pin 231 to the unlock position against the spring biasing force, the lock pin 231 can then be retained at the unlock position. In this state, the main body slider 77 and eventually the cutting device main body 100 can be freely slid in the front-to-rear direction.

According to the tabletop cutting device 1 of the present embodiment as configured above, in the first rotation lock mechanism 31 of the table 20, the lock member 42 may be displaced by the screw force in the screw axis direction that is generated by the rotation of the operation member 33 and the rotation position of the table 20 may be locked. Because of this configuration, a satisfactory ease of use with respect to the operation member 33 can be achieved, making it easier for the user to securely lock the horizontal rotation of the table.

Furthermore, the first rotation lock mechanism 31 may be configured such that the screw force is transmitted to the lock member 42 via the transmission bracket 36 and the transmission rod 40 as the transmission members. Because of this configuration, the position of the screw shaft 35 that is directly pressed by the transmission bracket 36 may be arranged to be closer to the user by the length of the transmission members in comparison with the conventional prior art. In contrast, in the prior art such as, for example, Japanese Laid-Open Patent Publication No. H09-131701, a long screw shaft is configured to directly press a lock member. In this configuration, a position of the screw shaft that is pressed by the lock member may be arranged apart from the user, and thus a transmission loss of the screw force with respect to the lock member may be large and it may be difficult to obtain a sufficient rotation lock force. According to the above-discussed first rotation lock mechanism 31, the position of the screw shaft 35 (the contact portion of the screw shaft 35 with respect to the upper contact portion 36a of the transmission rod 36) that is directly pressed by the transmission bracket 36 may be arranged to be closer to the user. Because of this configuration, a transmission loss of the screw force can be reduced and thus a sufficient pressing force of the lock member 42 can be obtained and a rotation position of the table 20 can be firmly and reliably locked.

Furthermore, the first rotation lock mechanism 31 may be configured such that the lock plate 11 provided in the base 10 may be held between the holding rib 20f of the table 20 and the output portion 42b of the lock member 42, to lock the horizontal rotation position of the table 20 with respect to the table 20. In this way, the first rotation lock mechanism 31 may not be configured such that the table 20 is pressed only in one direction. Because of this configuration, a relative displacement such as, for example, a lift of the table 20 may not occur and a cutting work with high accuracy can be performed.

Furthermore, the first rotation lock mechanism 31 may be configured such that by the rearward movement of the screw shaft 35, the lock plate 11 is held by the output portion 42b of the lock member 42 being displaced in the upward direction, which is different from the rearward axial movement of the screw shaft 35. Because of this configuration, a downward reaction (caused by pressing force of the output portion 42b) from the base 10, which may be applied to the lock member 42, may be dispersed in a plurality of directions and may not be directly applied to the screw shaft 35 and eventually the operation member 33. As a result, disturbance is minimized, and a satisfactory operability of the operation member 33 can be obtained.

Furthermore, the first rotation lock mechanism 31 may be configured such that the lock plate 11 is held by the output portion 42b of the lock member 42 being displaced in the upward direction, which is caused by the screw force caused by the displacement of the screw shaft 35 in the rearward direction. Because of this configuration, the displacement direction (holding direction) of the output portion 42b may be the upward direction, and thus a lift of the table 20 and an offset of the axis of the screw shaft may not occur. In this respect, a cutting work with high accuracy can be performed.

Furthermore, the first rotation lock mechanism 31 may be configured such that the applying direction (rearward direction) of the screw force caused by the rear movement of the screw shaft 35 is converted to the upper direction via rotational movement of the lock member 42 and the then converted upward-applied force is applied to the lock plate 11 to lock the rotation position of the table 20. Because of this configuration, a ease of use for the user with respect to the operation of the operation member 33 can be obtained and also a relative displacement of the table 20 such as, for example a lift of the table 20 when locked, can be prevented, enabling a cutting work to be performed with high accuracy.

Furthermore, according to the above-discussed rotation lock mechanism, in addition to the first rotation lock mechanism 31 in which a rotation position of the table 20 can be locked by holding the lock plate 11 by the output portion 42b of the lock member 42, the positive-lock type second rotation lock mechanism 32, in which the lock pin 47 is moved in the radial direction of the table 20 and engaged with the lock recess 12 provided on the peripheral edge of the base 10 to lock a rotation position of the table 20, may be provided. In a planar view, i.e., viewed from a direction perpendicular to the upper surface of the table 20, the screw shaft 35 of the first rotation lock mechanism 31 may be arranged coaxially with the lock pin 47 of the second rotation lock mechanism 32. In contrast, the transmission rod 40 of the first rotation lock mechanism 31 may be arranged parallel to and offset in the left-to-right direction with respect to the lock pin 47 of the second rotation lock mechanism 32.

In this way, the operation member 33 of the first rotation lock mechanism 31 and the operation member 34 of the second rotation lock mechanism 32 may be vertically disposed, and also operability of the operation members 33, 34 may be secured. Furthermore, the transmission rod 40 and the rock member 42 of the first rotation lock mechanism 31, which are members of the engagement side with respect to the base 10, may be arranged offset in the lateral left-to-right direction with respect to the second rotation lock mechanism 32 in a planar view. Because of this configuration, the first rotation lock mechanism 31 and the second rotation lock mechanism 32 may be mounted compactly in the up-to-down direction, and consequently the height of the upper surface of the table 20 may be lowered, which can improve operability of the tabletop cutting device 1.

The embodiments discussed above may be further modified without departing from the scope and spirit of the present teachings. In the embodiment discussed above, the two rotation lock mechanisms, i.e., the first rotation lock mechanism 31 and the second rotation lock mechanism 32 may be exemplified as the configuration for locking the rotation position of the table 20. However, it can be configured such that the rotation position of the table 20 is locked by only the first rotation lock mechanism 31.

Furthermore, in the first rotation lock mechanism 31, the transmission rod 40 may be arranged offset in the left-to-right direction with respect to the screw shaft 35 in order to obtain a sufficient space used for arranging the lock pin 47 of the second rotation lock mechanism 32. As a result, the table 20 can be configured to be compact in the height direction. However, if compactness in the height direction needs not to be considered, the transmission rod 40 may not need to be offset in the lateral direction with respect to the screw shaft 35 and may be configured to be coaxial with the screw shaft 35 in a planar view (that is, coaxial in the left-to-right direction).

Furthermore, in the first rotation lock mechanism 31 of the above-discussed embodiment, a columnar-shaped (knob-shaped) operation member 33 may be exemplified. However, a lever-type operation member that extends from the screw shaft 35 in the lateral direction may be used.

Furthermore, the tabletop cutting device 1 may be exemplified such that the cutting device main body 100 can be slid in the front-to-rear direction. The above-discussed first rotation lock mechanism 31 can be applied to a tabletop cutting device that does not include the sliding mechanism. Furthermore, the tabletop cutting device 1 that can be driven by an AC power source is exemplified. However, the present embodiment can be applied to a battery-type tabletop cutting device that is driven by a battery repeatedly used by charging.

What is claimed is:
1. A cutting device, comprising:
a table on which a material to be cut is placed; and
a base that supports the table so as to be horizontally rotatable, wherein:
a rotation lock mechanism that locks a rotation position of the table with respect to the base is provided between the table and the base;
the rotation lock mechanism includes an operation member having a screw shaft, a lock member for pressing a member to be locked provided on the base, and a transmission member that is interposed between the operation member and the lock member;
a screw force of the screw shaft in an axial direction of the screw shaft that is produced by a rotation operation of the operation member rotating about said axial direction is transferred to the lock member via the transmission member;

the lock member converts a direction of the transferred force from the transmission member via rotation of the lock member;

the lock member presses the member to be locked by the converted force to lock a rotation position of the table with respect to the base;

the member to be locked is a lock plate that is provided on a lower part of the base;

the screw shaft is displaced in the rearward direction in a direction away from a user by the rotation operation of the operation member in a lock direction; and the lock member is displaced in the upward direction by the screw force produced by the rearward displacement of the screw shaft to cause the lock plate to be held by the lock member.

2. The cutting device according to claim 1, wherein the lock member includes an input portion that extends in the upward direction and an output portion that extends in the forward direction, further wherein the lock member is supported so as to be swung along the up-to-down direction via a support shaft that is disposed at an lower part of the input portion and at a rear part of the output portion, further wherein the input portion is pressed by the rearward displacement of the screw shaft to cause the output portion to displace in the upward direction, and further wherein the member to be locked is held by the upward displacement of the output portion.

3. The cutting device according to claim 1, wherein:

a positive-lock-type second rotation lock mechanism is provided in addition to a first rotation lock mechanism in which a rotation position of the table is locked by pressing the member to be locked by use of the lock member, the second rotation lock mechanism being configured such that the table is locked by moving a protrusion in a radial direction of the table to engage with a recess provided in the base;

the screw shaft of the first rotation lock mechanism is arranged to be coaxial with the protrusion of the second rotation lock mechanism in the left-to-right direction when viewed from a direction perpendicular to the upper surface of the table; and the transmission member of the first rotation lock mechanism is arranged parallel to and offset in the left-to-right direction from the protrusion of the second rotation lock mechanism.

4. A cutting device, comprising:

a circular table with projections on front, left and right sides on which a material to be cut is placed; and a base that supports the table so as to be rotatable in a horizontal plane comprising front-to-rear and left-to-right directions, wherein:

a rotation lock mechanism that locks a rotation position of the table with respect to the base is provided vertically between the table and the base, below the table and above a lowermost end of the base;

the rotation lock mechanism includes an operation member having a screw shaft, a lock member for pressing a member to be locked provided on the base, and a transmission member that is interposed between the operation member and the lock member;

a screw force of the screw shaft in an axial direction of the screw shaft that is produced by a rotation operation of the operation member around the axial direction is transferred to the lock member via the transmission member;

the lock member converts a direction of the transferred force from the transmission member via rotation of the lock member;

due to said rotation of the lock member, the lock member presses the member to be locked by the transferred force to securely lock a rotation position of the table with respect to the base;

the member to be locked is a lock plate that is provided on a lower part of the base;

the screw shaft is displaced in the rearward direction in a direction away from a user by the rotation operation of the operation member in a lock direction;

the lock member is displaced in the upward direction by the screw force produced by the rearward displacement of the screw shaft to cause the lock plate to be held by the lock member; and the lock plate is pressed upward by the lock member against a holding rib.

5. The cutting device according to claim 4, wherein the lock member includes an input portion that extends in the upward direction and an output portion that extends in the forward direction, further wherein the lock member is supported so as to be move in the up-to-down direction via rotation about a support shaft at the intersection of the input portion and the output portion in the left-to-right direction, further wherein the input portion is pressed by the rearward displacement of the screw shaft to cause the output portion to be displaced by said rotation about the support shaft in the upward direction, and further wherein the member to be locked is held by the upward displacement of the output portion against a holding rib.

6. The cutting device according to claim 5, wherein the support shaft is disposed at a lower part of the input portion and at a rear part of the output portion.

7. The cutting device according to claim 6, wherein the input portion and the output portion collectively form an L shape.

8. The cutting device according to claim 5, wherein when the input portion is pressed by the rearward movement of the screw shaft, this results in clockwise movement of the lock member in the plane comprising the front-to-rear and up-to-down directions, resulting in upward movement of the outward portion to lock a rotational position of the table.

9. The cutting device according to claim 4, wherein the operation member comprises a knob rotated by the user, which is directly connected to the screw shaft which rotates in the same direction as the knob.

10. The cutting device according to claim 4, wherein the transmission member comprises a transmission bracket and a transmission rod which collectively function to transmit screw force produced by the rotation of the operation member to the lock member.

11. The cutting device according to claim 10, wherein the transmission rod is parallel to and offset from the screw shaft in the left-to-right direction wherein upon rearwards movement of the screw shaft, the transmission bracket, which is bent in a crank shape forming an S shape cross section which extends into the left-to-right direction, rotates to push the transmission rod rearward against the lock member.

12. A cutting device, comprising:

a circular table with projections on front, left and right sides on which a material to be cut is placed;

a base that supports the table so as to be rotatable in a horizontal plane comprising front-to-rear and left-to-right directions; and a rotation lock mechanism that (1) locks a rotation position of the table with respect to the base, (2) is provided vertically between the table and the base, below the table and above a lowermost end of the base and (3) includes a first rotation lock mechanism and a positive-lock-type second rotation lock mechanism; wherein:

the first rotation lock mechanism includes an operation member having a screw shaft, a lock member for pressing a member to be locked provided on the base, and a transmission member that is interposed between the operation member and the lock member;

a screw force of the screw shaft in an axial direction of the screw shaft that is produced by a rotation operation of the operation member around the axial direction is transferred to the lock member via the transmission member;

the lock member converts a direction of the transferred force from the transmission member via rotation of the lock member;

due to said rotation of the lock member, the lock member presses the member to be locked by the transferred force to securely lock a rotation position of the table with respect to the base;

the member to be locked is a lock plate that is provided on a lower part of the base;

the screw shaft is displaced in the rearward direction in a direction away from a user by the rotation operation of the operation member in a lock direction;

the lock member is displaced in the upward direction by the screw force produced by the rearward displacement of the screw shaft to cause the lock plate to be held by the lock member;

the lock plate is pressed upward by the lock member against a holding rib;

the positive-lock-type second rotation lock mechanism locks the rotation position of the table by pressing the member to be locked by use of the lock member; and the second rotation lock mechanism is configured such that the table is locked by moving a protrusion in a radial direction of the table to engage with a recess provided in the base.

13. The cutting device according to claim 12, wherein:

the screw shaft of the first rotation lock mechanism is arranged to be coaxial with a lock pin comprising a protrusion of the second rotation lock mechanism in the left-to-right direction when viewed from a direction perpendicular to the upper surface of the table; and the transmission member of the first rotation lock mechanism is arranged to be parallel to and offset in the left-to-right direction from the protrusion of the second rotation lock mechanism.

14. The cutting device according to claim 12, wherein by using the second rotation lock mechanism the rotational position of the table can be locked at equally spaced intervals of every 10 degrees with excellent repeating accuracy.

15. The cutting device according to claim 12, wherein the second rotation lock mechanism may be operated by an operation member comprising a lever, wherein a user turns an operation knob to retain a pressed-down position of the operation member, wherein the operation member is linked to the protrusion via an engagement shaft which is brought into contact with the protrusion on an inclined surface wherein said surface changes configuration depending on whether the lever is in a pressed-down position.

16. The cutting device according to claim 15, wherein the protrusion is biased in the rearward direction via a compressed spring, interposed between the engagement shaft and a supporting wall.

* * * * *